United States Patent
Bridges et al.

(10) Patent No.: US 12,282,548 B2
(45) Date of Patent: Apr. 22, 2025

(54) UNIVERSALLY APPLICABLE SIGNAL-BASED CONTROLLER AREA NETWORK (CAN) INTRUSION DETECTION SYSTEM

(71) Applicant: UT-Battelle, LLC, Oak Ridge, TN (US)

(72) Inventors: Robert A. Bridges, Oak Ridge, TN (US); Kiren E. Verma, Oak Ridge, TN (US); Michael Iannacone, Oak Ridge, TN (US); Samuel C. Hollifield, Oak Ridge, TN (US); Pablo Moriano, Oak Ridge, TN (US); Jordan Sosnowski, Oak Ridge, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 313 days.

(21) Appl. No.: 17/725,774

(22) Filed: Apr. 21, 2022

(65) Prior Publication Data

US 2022/0374515 A1 Nov. 24, 2022

Related U.S. Application Data

(60) Provisional application No. 63/178,586, filed on Apr. 23, 2021.

(51) Int. Cl.
*G06F 21/55* (2013.01)
*H04L 12/40* (2006.01)

(52) U.S. Cl.
CPC .......... *G06F 21/556* (2013.01); *G06F 21/552* (2013.01); *G06F 21/554* (2013.01);
(Continued)

(58) Field of Classification Search
CPC .... G06F 21/556; G06F 21/552; G06F 21/554; H04L 12/40026; H04L 2012/40215
See application file for complete search history.

(56) References Cited

U.S. PATENT DOCUMENTS 8,923,607 B1 * 12/2014 Kwatra ............... G06V 10/40 382/159
10,892,911 B2 * 1/2021 Wojciechowski .... H04L 7/0331
(Continued)

FOREIGN PATENT DOCUMENTS

WO WO-2022040360 A1 * 2/2022 ........ B60W 50/0205
WO WO-2022110444 A1 * 6/2022 ......... G06F 9/45558

OTHER PUBLICATIONS

Miki Verma, ACTT: Automotive CAN Tokenization and Translation, 2018, IEEE (Year: 2018).*
(Continued)

*Primary Examiner* — Catherine Thiaw
*Assistant Examiner* — Daniel Elahian
(74) *Attorney, Agent, or Firm* — Warner Norcross + Judd LLP

(57) ABSTRACT

A system and method for intrusion detection on automotive controller area networks. The system and method can detect various CAN attacks, such as attacks that cause unintended acceleration, deactivation of vehicle's brakes, or steering the vehicle. The system and method detects changes in nuanced correlations of CAN timeseries signals and how they cluster together. The system reverse engineers CAN signals and detect masquerade attacks by analyzing timeseries extracted from raw CAN frames. Specifically, anomalies in the CAN data can be detected by computing timeseries clustering similarity using hierarchical clustering on the vehicle's CAN signals and comparing the clustering similarity across CAN captures with and without attacks.

7 Claims, 24 Drawing Sheets

(52) U.S. Cl.
CPC ............... *H04L 12/40026* (2013.01); *H04L 2012/40215* (2013.01)

(56) References Cited

U.S. PATENT DOCUMENTS

| | | | | |
|---|---|---|---|---|
| 11,423,145 | B2* | 8/2022 | Gutierrez | G06F 21/566 |
| 11,423,162 | B2* | 8/2022 | Juliato | G06F 13/38 |
| 11,789,886 | B2* | 10/2023 | Muth | H04L 63/14 |
| | | | | 710/106 |
| 11,985,150 | B2* | 5/2024 | Bajpai | H04L 67/12 |
| 12,013,935 | B2* | 6/2024 | Davidovich | G06F 21/554 |
| 2019/0312892 | A1* | 10/2019 | Chung | G06F 21/554 |
| 2021/0044600 | A1* | 2/2021 | Elend | H04L 1/0061 |
| 2021/0178996 | A1 | 6/2021 | Verma et al. | |

OTHER PUBLICATIONS

Gedare Bloom, Reverse Engineering Controller Area Network Messages Using Unsupervised Machine Learning, 2020, IEEE (Year: 2020).*

Miro Marchetti, READ: Reverse Engineering of Automotive Data Frames, IEEE, 2018 (Year: 2018).*

Cho, Kyong-Tak et al., "Fingerprinting Electronic Control Units for Vehicle Intrusion Detection", Proceedings of the 25th USENIX Security Symposium, Aug. 2016, pp. 1-18.

Flach, Tobias et al., "CARMA: Towards Personalized Automotive Tuning", SenSys'11, Nov. 2011, pp. 135-148.

Gmiden, Mabrouka et al., "An Intrusion Detection Method for Security In-Vehicle CAN bus", 17th International Conference on Sciences and Techniques of Automatic Control & Computer Engineering, Dec. 2016, pp. 176-180.

Li, Huaxin et al., "POSTER: Intrusion Detection System for In-vehicle Networks using Sensor Correlation and Integration", CCS'17, Nov. 2017, pp. 2531-2533.

Tyree, Zachariah et al., "Exploiting the Shape of CAN Data for In-Vehicle Intrusion Detection", downloaded at arXiv:1808.10840v1, Aug. 28, 2018, pp. 106.

Narayanan, Sandeep Nair et al., "Using Data Analytics to Detect Anomalous States in Vehicles", downloaded at arXiv:1512.08048v1; Dec. 25, 2015, pp. 1-10.

Wasicek, Armin R. et al., "Context-aware Intrusion Detection in Automotive Control Systems", available at least as of Dec. 13, 2019, pp. 1-14.

Miller, Charlie Dr. et al., "Adventures in Automotive Networks and Control Units", available at least as of Dec. 13, 2019, pp. 1-101.

Checkoway, Stephen, et al., "Comprehensive Experimental Analyses of Automotive Attack Surfaces", available at least as of Dec. 13, 2019, pp. 1-16.

Choi, Wonsuk, et al., "Identifying ECUs Using Inimitable Characteristics of Signals in Controller Area Networks", downloaded at arXiv:1607.00497v1; Jul. 2, 2016, pp. 1-12.

Enev, Miro, et al., "Automobile Driver Fingerprinting", De Gruyter Open, Proceedings on Privacy Enhancing Technologies; 2016 (1):34-51.

Hanselmann, Markus, et al., "CANet: An Unsupervised Intrusion Detection System for High Dimensional CAN Bus Data", downloaded at arXiv:1906.02492v1; Jun. 6, 2019, pp. 1-9.

Huybrechts, Thomas, et al., "Automatic Reverse Engineering of CAN Bus Data Using Machine Learning Techniques", Copyright Springer International Publishing AG 2018, pp. 751-761.

Jaynes, Michael, et al., "Automating ECU Identification for Vehicle Security", 2016 15th IEEE International Conference on Machine Learning and Applications, pp. 632-635.

Koscher, Karl, et al., "Experimental Security Analysis of a Modern Automobile", 2010 IEEE Symposium on Security and Privacy, pp. 447-462.

Lee, Hyunsung, et al., "OTIDS: A Novel Intrusion Detection System for In-vehicle Network by using Remote Frame", 2017 15th Annual Conference on Privacy, Security and Trust, pp. 57-66.

Lestyan, Szilvia, et al., "Extracting vehicle sensor signals from CAN logs for driver re-identification", downloaded at arXiv:1902.08956v1; Feb. 24, 2019, pp. 1-11.

Lokman, Siti-Farhana, et al., Intrusion detection system for automotive Controller Area Network (CAN) bus system: a review, EURASIP Journal on Wireless Communications and Networking (2019) 2019:184, 17 pp.

Marchetti, Micro, et al., "READ: Reverse engineering of automotive data frames", 1556-6013(c) 2018 IEEE, 15 pp.

Markovitz, Moti, et al., "Vehicular Communications", Vehicular Communication 9 (2017) 43-52.

Moore, Michael R., et al., "Modeling inter-signal arrival times for accurate detection of CAN bus signal injection attacks* A data-driven approach to in-vehicle intrusion detection", Proceedings of Cyber & Information Security Research Conference, Oak Ridge, TN, USA, Apr. 4-6, 2017 (CISRC '17), 4 pp.

Narayanan, Sandeep Nair, et al., "OBD_SecureAlert: An Anomaly Detection System for Vehicles", Conference Paper May 2016, publication at https://www.researchgate.net/publication/305674115, 7 pp.

Nolan, Brent C., et al., "Unsupervised Time Series Extraction from Controller Area Network Payloads", available at least as of Dec. 13, 2019, 5 pp.

Pawelec, Krzysztof, et al., "Towards a CAN IDS Based on a neural Network Data Field Predictor*", Session: Anaomaly Detection for Controller Area Network, AutoSec '19, Mar. 27, 2019, Richardson, TX, USA, pp. 31-34.

Pese, Mert D., et al., "LibreCAN: Automated CAN Message Translator", 2019 ACM SIGSAC Conference on Computer and Communications Security (CCS ' 19), Nov. 11-15, 2019, London, United Kingdom. ACM, New York, NY, USA, 18 pp.

Bosch, Robert GmbH, "CAN Specification Version 2.0", 1991, 72 pp.

Provencher, Hugo, "Controller Area Networks for Vehicles", Directed Studies, ENGR 5004G, Faculty of Engineering and Applied Science, University of Ontario Institute of Technology, Apr. 2012, 67 pp.

Miller, Charlie, Dr., et al., "Remote Exploitation of an Unaltered Passenger Vehicle", Aug. 10, 2015, 91 pp.

Taylor, Adrian, et al., "Anomaly Detection in Automobile Control Network Data with Long Short-Term Memory Networks", 2016 IEEE International Conference on Data Science and Advanced Analytics, pp. 130-139.

Smith, Craig, et al., "Car Hacker's Handbook, A Guide for the Penetration Tester", no starch press, San Francisco, Copyright 2016, 306 pp.

Tyree, Zachariah, et al., "Exploiting the Shape of CAN Data for In-Vehicle Intrusion Detection", downloaded at arXiv:1808.10840v1; Aug. 28, 2018, pp. 1-6.

Wakita, Toshihiro, et al., "Driver Identification Using Driving Behavior Signals", IEICE Trans. Inf. & Syst., vol. E89-D, No. 3 Mar. 2006, pp. 1188-1194.

Wu, Wufei, et al., "A Survey of Intrusion Detection for In-Vehicle Networks", IEEE Transaction on Intelligent Transportation Systems, 1624-9050 Copyright 2019 IEEE, pp. 1-15.

Young, Clinton, et al., "Towards Reverse Engineering Controller Area Network Messages Using Machine Learning", available at least as of Dec. 13, 2019, 6 pp.

Verma, Miki E., et al., "ACTT: Automative CAN Tokenization and Translation", downloaded at arXiv:1811.07897v1; Nov. 19, 2018, 6 pp.

Website https://github.com/commaai/opendbc, available at least as of Nov. 30, 2018.

Website https://github.com/linux-can/can-utils, available at least as of Oct. 26, 2019.

Website https://en.wikipedia.org/wiki/Unified_Diagnostic_Services, available at least as of Jul. 18, 2017.

Website https://en.wikipedia.org/wiki/OBD-II_PIDs, available at least as of Aug. 27, 2019.

Website https://en.wikipedia.org/wiki/Endianness, available at least as of Dec. 11, 2019.

Website https://en.wikipedia.org/wiki/Two%27s_complement, available at least as of Dec. 10, 2019.

(56) References Cited

OTHER PUBLICATIONS

Website http://www.industrialberry.com/canberrydual-v2-1/, available at least as of Dec. 13, 2019.
Website https://www.sae.org/standards/content/j1939_201308/, Abstract available at least as of Jun. 12, 2018.
Website https://training.dewesoft.com/online/course/automotive-buses-can-measurement, available at least as of Dec. 13, 2019.
Website https://hackaday.com/2013/10/22/can-hacking-the-in-vehicle-network/, available at least as of Jul. 12, 2019.
Website http://hooovahh.blogspot.com/2017/05/can-part-5-signal-api.html, available at least as of Apr. 15, 2019.
Website https://courses.cs.washington.edu/courses/cse521/13wi/slides/06dp-sched.pdf, available at least as of Dec. 13, 2019.
Gates, A.J., "CluSim: a python package for calculating clustering similarity", The Journal of Open Source Software, published Mar. 21, 2019, 4(35), 1264, pp. 1-5.
Blevins, D.H., "Time-Based CAN Intrusion Detection Benchmark", Workshop on Automotive and Autonomous Vehicle Security (AutoSec), Feb. 21, 2021, pp. 1-7.

\* cited by examiner

Fig. 5

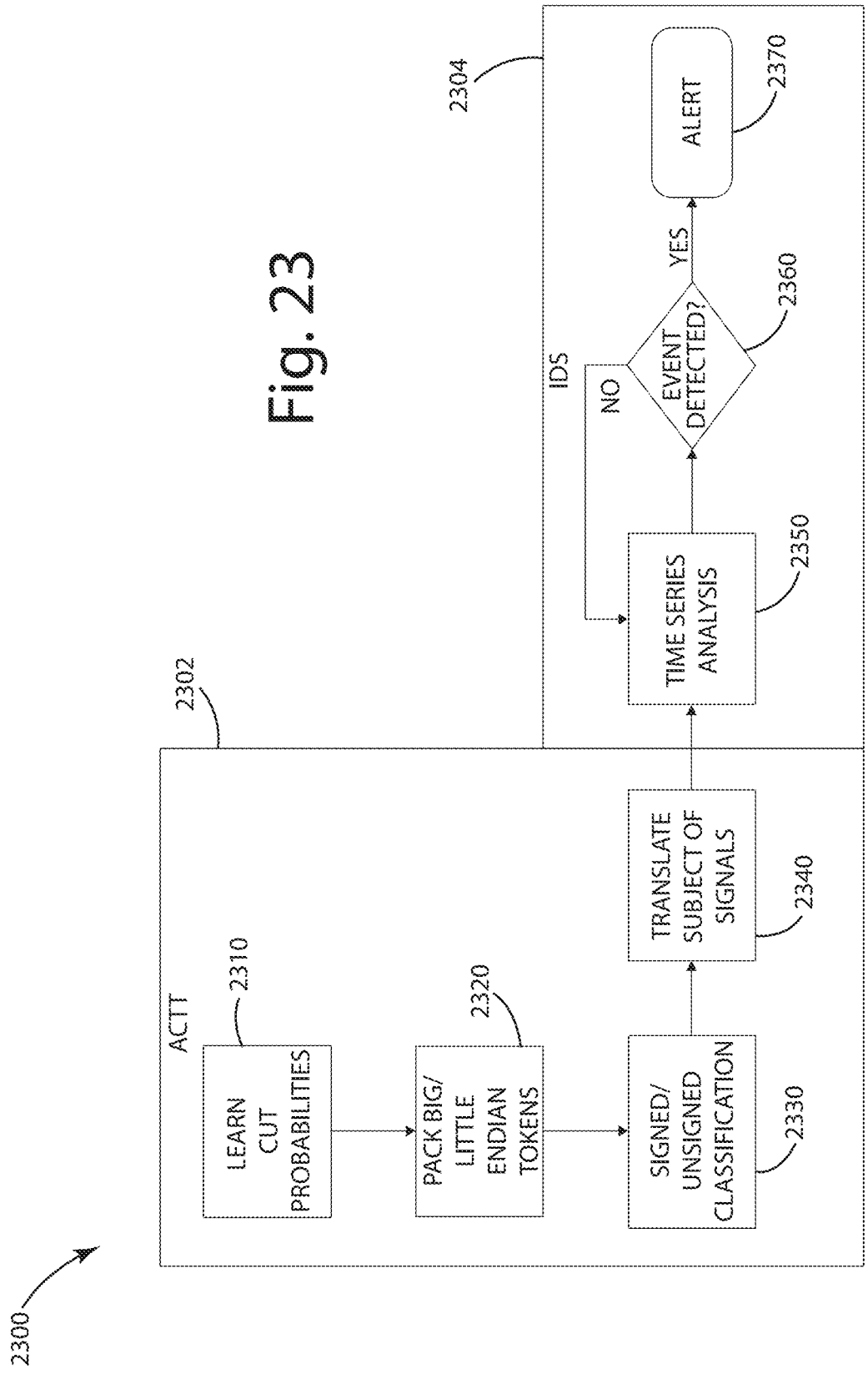

UNIVERSALLY APPLICABLE SIGNAL-BASED CONTROLLER AREA NETWORK (CAN) INTRUSION DETECTION SYSTEM

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present disclosure relates to automotive controller area networks (CANs) for real-time communication as well as decoding CAN communication without access to the CAN data mapping and intrusion detection based on the decoded CAN communication.

Modern automobiles rely on communication among internal computers, sometimes referred to as electronic control units, over one or more controller area networks (CANs). The communication generally adheres to a CAN communication protocol. Although the CAN protocol is generally fixed, the CAN data payload is typically encoded in a proprietary (i.e., secret) format according to a particular CAN data mapping.

Original equipment manufacturers (OEMs) of passenger vehicles generally choose and hold their mappings of CAN data to vehicle signals secret (the CAN mapping can be referred to interchangeably as CAN data signal definitions, a CAN data mapping, a CAN data encoding scheme, or some variation thereof). These mappings vary per make, model, and year. Without these mappings, the wealth of real-time vehicle information hidden in the CAN communication is uninterpretable—severely impeding vehicle-related research including at least CAN cybersecurity and privacy studies, after-market tuning, efficiency and performance monitoring, and fault diagnosis.

Each CAN frame (utilized interchangeably throughout this disclosure with CAN packet) has a structure defined by the applicable CAN protocol specification. Each CAN frame includes a CAN arbitration ID and CAN data field. The CAN data mapping provides developers with a breakdown of how and where vehicle data signals are encoded and stored in the CAN data field for each CAN frame arbitration ID. These different vehicle signals (sometimes referred to as data channels) can include signals such as engine RPM, vehicle speed, current gear, battery voltage, anti-lock brake status, GPS latitude, GPS longitude, cabin temperature, engine temperature, tire pressure, accelerator pedal angle, brake application status, fuel injection timing, radio settings, lane assist, and collision avoidance, to name a few examples, and describes how they are organized in the CAN data field.

Each CAN data field, typically up to 64-bits, may contain many different channels of varying length, with various encodings. Often the CAN mapping for each arbitration ID is stored in a CAN database in a standard .DBC file format. Without knowledge of the pertinent CAN bus specification (e.g., access to the pertinent .DBC file) it is generally difficult to discern where certain signals begin and end within the CAN data field (i.e., tokenization) let alone convert the sequence of bits to an integer (translation) and to understand the meaning of the value of each signal (i.e., interpretation).

As vehicles are increasingly reliant on electronic communication, it follows that adversarial manipulation of CAN signals have potentially severe consequences. While lightweight, the CAN protocol is bereft of basic security features, e.g., encryption and authentication. Moreover, vehicle CANs are exposed to exploitation by virtue of a mandated on-board diagnostics computer and access port. That is, in many countries, vehicles are required to comply with a diagnostic standard that requires a diagnostic on-board computer (e.g., OBD-II) and port (e.g., OBD-II port) that provides access to the CAN bus. The current paradigm for passenger vehicle CANs is "security by obscurity"—OEMs hold the CAN signal definitions secret, and vary them across years and models.

If access to the proprietary CAN mapping (e.g., via documentation or .DBC file) is unavailable, then reverse engineering the signal definitions is the only practical solution. Unfortunately, reverse engineering the CAN mapping is currently a non-automated, tedious, flawed, per-vehicle effort. CAN data is sent at a rapid rate and carries a wide variety of real-time vehicle information, an automated or semi-automated vehicle agnostic solution for decoding CAN data promises a vast resource of streaming, up-to-date information for analytics and technology development.

CAN reverse engineering is possible on a per-vehicle basis with ample effort and expertise, and generally is not a meaningful impediment to a determined adversary. The obscurity of CAN data does however hinder various forms of research and development, such as vulnerability analysis for hardening vehicle systems.

Defensive in-vehicle CAN research is a burgeoning subfield. CAN security literature is dominated by intrusion detection systems (IDS) research for in-vehicle CANs. The inability to translate CAN data has pigeon-holed CAN IDS development into a few areas. Early works implemented rules akin to signature-based detection, followed by algorithms leveraging packet header information (e.g., message frequency anomalies, as well as side-channel detection using physical or other timing based observables).

Other developments include "payload-inspection" IDSs, those that leverage the actual message carried in the CAN packet. Most of these have a naive approach, applying black-box techniques to learn patterns in the bits and identify anomalies, and generally are unable to reliably translate CAN payloads into constituent signals. However, a subset of payload inspection methods are "signal-based" in which real-time translated CAN data informs detectors. Although, these solutions are either vehicle-specific—requiring pairing with an OEM who shares the CAN mapping, manually reverse engineering signals, or use "chipping tools" to extract some CAN signals. Alternative approaches have been used to acquire real-time vehicle data that attempt to circumvent the obstacle of decoding CAN data altogether, namely by using external sensors (e.g., an accelerometer), however, these approaches not only require supplementary, often expensive hardware, but exogenous data cannot be used as a proxy for translated in-vehicle data in use cases that involve reading and writing intra-vehicle messages over CAN, e.g., cybersecurity monitoring and aftermarket tuning, among other vehicle technologies.

Obtaining translated, real-time, CAN data, without access to the original CAN signal definitions used to encode that data, has the potential to accelerate vulnerability discovery and open, novel avenues for intrusion detection. Further, unveiling CAN signals provides access to real-time measurements of vehicle subsystems, from which many other research areas stand to benefit greatly, including: aftermarket tuning tools for enhanced efficiency and performance, fuel efficiency monitoring and guidance, and driver identification and privacy technologies (e.g., fleet management, vehicle fault diagnosis, forensics technologies, and insurance applications), to name a few.

Modern vehicles are complex cyber-physical systems containing up to hundreds of electronic control units (ECUs). ECUs are embedded computers that communicate over one or more Controller Area Networks (CANs) to help control vehicle functionality, including acceleration, braking, steering, and engine status, among others. CANs are generally vulnerable to cyber exploitation, both by adversaries with direct physical access (e.g., through the standard on-board diagnostic [OBD] II port) and remote access (e.g., Bluetooth, 5G). This increasing connectivity enables more advanced vehicle features at the expense of expanding the attack surface. By hijacking ECUs, attackers may stealthily manipulate CAN frames resulting in life threatening incidents. For example, malicious frame injection through cellular networks has resulted in unintended acceleration, vehicle brake deactivation, and rogue steering wheel turning.

CAN attacks are commonly classified using a three-tiered taxonomy that includes fabrication, suspension, and masquerade attacks. Fabrication attacks inject extra frames, whereas suspension attacks remove benign frames; consequently, both categories usually disturb regular frame timing on the bus and can be accurately detected using time-based methods. Masquerade attacks require the adversary to send frames in lieu of (and therefore at the expected time of) benign frames but with malicious payloads. In masquerade attacks, adversaries first suspend frames of a specific ID and then inject spoofed frames that modify the content of the frames instead of their timing patterns. Hence, masquerade attacks are generally considered the stealthiest CAN attacks.

Masquerade attacks may still be detectable because they alter the regular relationships of a vehicle's subsystems. For example, an adversary that gains control of the ECU(s) that communicate the wheel speed signals (four nearly identical signals) can modify the frames to break the near perfect correlation, which will stop the vehicle (regardless of the driver's actions) in some vehicle models. By understating the regular relationships of the vehicle's CAN signals, this condition can be flagged as anomalous, even if the modified signals are not abnormal when considered individually.

The widespread dependence of modern vehicles on CANs, combined with the security vulnerabilities has been meet with a push to develop intrusion detection systems (IDSs) for CAN. Generally, there are two types of IDS methods: signature and machine learning (ML). Signature-based methods rely on a predefined set of rules for attack conditions. Behavior that matches the expected signature is regarded as an attack. However, given the heterogeneous nature of the CAN bus in terms of transmission rates and broadcasting, effective rules for detecting attacks are difficult to design, which contributes to high rates of false negatives. In contrast, ML-based methods profile benign behavior to identify anomalies or generalized attack patterns when the traffic does not behave as expected.

In doing this, many ML-based methods leverage the CAN's frame payloads. Note that in passenger vehicles, signals (sensor values communicated in CAN frames) are encoded into the frame payloads via proprietary (nonpublic, original equipment manufacturer-specified) mappings. Some IDSs operate on the binary payload (raw bits), whereas others operate on the timeseries of signal values. Processing the binary payload has a set of associated challenges. First, there is a semantic gap with respect to the signals encoded in the payload. This means that a single CAN frame's payload usually contains several signals encoded in different formats, including byte ordering, signedness, label and units, and scale and offset. Second, detecting subtle masquerade attacks generally requires analyzing the payload content because the correlation between certain signals may change when the frame content is modified during an attack. Thus, considering the relationship between signals may allow for a more effective defense against advanced masquerade attacks.

Some conventional approaches to intrusion detect use pair-wise correlations of vehicular sensor readings (e.g., speed, acceleration, steering) to characterize behavioral context. They use it for cluster analysis to identify distinct driver behaviors and detect potential attacks. Other conventional approaches leverage correlations from multiple sensors to train a regression model that estimates a targeted sensor value. They use the difference between the estimated and observed sensor values as an anomaly signature. Some other conventional approaches compute Pearson correlation matrices of geolocation-related signals (e.g., latitude, longitude, elevation, speed, heading) to estimate the state of neighboring vehicles and detect location forging misbehavior based on correlation matrices' distance. Yet other conventional approaches propose Edge Computing Based Vehicle Anomaly Detection, which focuses on analyzing the time and frequency domains of sensor data to detect anomalies. In the first step, they flag abrupt changes in the correlations of sensor readings in the time domain as an indication of anomalies. For more accurate anomaly detection in the second step, they further analyze the sudden change in sensor readings by computing the change in power spectral density (PSD) of sensor data in the frequency domain. Under anomalous circumstances, the PSD is expected to be higher in the high-frequency band. Yet other conventional approaches explore using correlations between heterogeneous sensors to identify consistency among sensor data (e.g., acceleration, engine RPM, vehicle speed, GPS) and then utilize the data to detect anomalous sensor measurements. They accomplish this by embedding the relationship of multiple sensors into an autoencoder and pinpointing anomalies based on the magnitude of the reconstruction loss.

The desire for access to translated vehicle CAN data has driven a new and promising sub-field. Accordingly, improvements to systems and methods for decoding vehicle CAN data and intrusion detection are desirable.

SUMMARY OF THE INVENTION

The present disclosure provides a detection and forensics framework for the detection of attacks on a controller area network (CAN) bus. One aspect of the present disclosure is directed to an apparatus for intrusion detection of vehicle controller area network (CAN) data. The apparatus includes a vehicle CAN interface configured to receive vehicle CAN frames. The vehicle CAN frames each have an identifier (ID) and a payload of CAN data. The apparatus can include memory configured to store an ID trace including CAN data from different vehicle CAN frames associated with a particular vehicle CAN frame ID. The apparatus can also include a processor configured to generate a vehicle CAN signal definition for CAN data associated with the particular vehicle CAN frame ID based on the ID trace. The processor can be configured to predict signal boundaries within the CAN data based on the CAN data in the ID trace and generate signal boundary probabilities. The processor can be configured to predict endianness of signals within the CAN data based on the signal boundary probabilities and generate tokenized signals. The processor can be configured to predict signedness of the tokenized signals and generate translated signals. The processor can be configured to generate a vehicle CAN signal definition and store the signal definition in memory.

The processor of the intrusion detection system can be configured to decode CAN test data, i.e., CAN data to be checked for attacks, in CAN data frames with the particular vehicle CAN frame ID received by the vehicle CAN interface according to the signal definition stored in memory. The processor can be configured to identify inherent relationships between timeseries signals in the decoded CAN test data. The processor can be configured to compare the identified inherent relationships between the timeseries signals in the decoded CAN test data and inherent relationships between timeseries signals from CAN training data stored in memory to detect intrusion of the vehicle CAN based on the comparison.

In one exemplary embodiment of the present disclosure, the intrusion detection system can be configured to detect masquerade attacks based on timeseries clustering similarity. That is, the framework of the intrusion detection apparatus can be configured to operate based on (1) clustering timeseries using agglomerative hierarchical clustering (AHC); (2) computing a clustering similarity; and (3) performing hypothesis testing using the clustering similarity distributions to predict whether a CAN signal is a benign signal or an attack signal. The forensic framework can be integrated into a real-time intrusion detection system and/or a short-time-to-detection intrusion detection system.

Intrusion detection systems in accordance with the present disclosure can model temporal and signal-wise dependencies between CAN signals using timeseries clustering. AHC can generate a hierarchical relationship between signals in the form of clusterings, which can be represented by dendrograms. Using a hypothesis test, masquerade attacks are detectable by the resultant distribution of clustering similarities. In addition, the intrusion detection system can detect intrusion from real CAN data containing hundreds of signals.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 5 illustrates probabilities of CAN data signal boundaries according to big endian ordering, little endian ordering, and an exemplary tokenization.

FIG. 23 illustrates an exemplary CAN-D intrusion detection pipeline.

DESCRIPTION OF THE CURRENT EMBODIMENT

Figure 1:
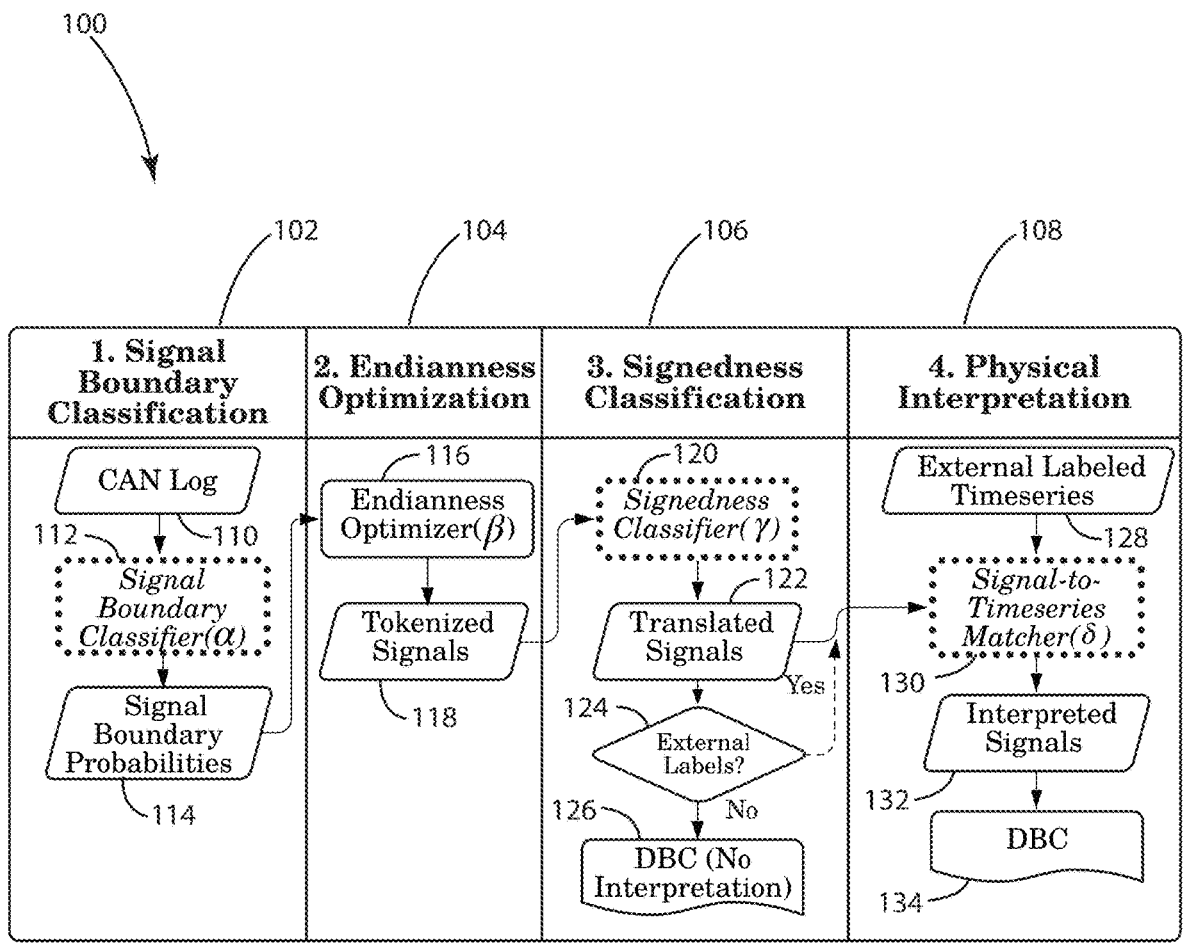
FIG. 1 illustrates one embodiment of a CAN decoder reverse engineering pipeline.

The present disclosure is generally directed to apparatuses, systems, and methods for CAN intrusion detection. Intrusion detection systems in accordance with the present disclosure can be configured to decide if CAN traffic contains masquerade attacks. The framework operates at the signal-level and leverages timeseries clustering similarity to arrive at statistical conclusions. The intrusion detection system can use available and readable signal-level CAN traffic in benign and attack conditions to test the framework.

Intrusion detection systems of the present disclosure can detect masquerade attacks based on timeseries clustering similarity. In general, they operate based on (1) clustering timeseries using agglomerative hierarchical clustering (AHC); (2) computing a clustering similarity; and (3) performing hypothesis testing using the clustering similarity distributions to decide between benign and attack conditions. The intrusion detection systems of the present disclosure can be near real-time intrusion detection systems and/or post-drive intrusion detection systems.

Intrusion detection systems in accordance with the present disclosure can model temporal and signal-wise dependencies between CAN signals using timeseries clustering. AHC can generate a hierarchical relationship between signals in the form of a dendrogram. Using a hypothesis test, masquerade attacks are detectable by the resultant distribution of clustering similarities. In addition, the intrusion detection system can detect intrusion from real CAN data containing hundreds of signals.

CAN-D

The CAN intrusion detection systems of the present disclosure can leverage CAN decoding (CAN-D). In general, CAN-D emphasizes automatic reverse engineering of CAN mappings and use of those CAN mappings to decode CAN signals in real time. The present disclosure provides apparatuses, systems, and methods for tokenization and translation of vehicle controller area network data (CAN) that are vehicle agnostic. The systems and methods of the present disclosure include an algorithmic reverse engineering pipeline that exhibits state-of-the-art CAN signal extraction, and a lightweight hardware integration allowing OBD-II plugin for real-time CAN decoding.

One problem with CANs is that the encodings of signals into CAN packets are proprietary secrets that vary per make, model, year, even trim. Hence, without an automatic or semi-automatic decoding system and method, decoding efforts are generally per-vehicle endeavors that are manual, tedious, and inadequate for many signals, especially signals that encode latent sensor data (e.g., engine temperature or load, both of which cannot be easily observed).

Vehicles are increasingly becoming "drive-by-wire", meaning once-mechanical functions are now controlled by algorithms and computers translating inputs between user and subcomponent, yet, in general, no third party can currently make sense of the vehicle's network data without access to the underlying signal definitions used to encode the signals. Consequently, many automotive-interest areas, e.g., performance tuning, emissions research, automotive security, are severely limited because they operate blind to the meaning of the CAN data. The current approach is to reverse engineer single signals by manually manipulating inputs (e.g., turning on the lights), then looking through CAN data for changes in bits.

One aspect of the present disclosure relates to apparatuses, systems, and methods for understanding how to tokenize (i.e., cut a CAN data field into message- or signal-sized chunks), and at least partially translate (i.e., convert these subsequences of bits, which constitute a signal, into integers) these signals. In short, systems and methods of the present disclosure convert streaming bit data into a multivariate timeseries. Embodiments of the present disclosure can be performed on any CAN data, in particular, any vehicle's CAN data. Another aspect relates to a subset of vehicles (specifically, those admitting the Unified Diagnostic Services, generally, any modern combustion-engine vehicle in the US) and a subset of signals. This aspect relates to determining and providing to a user, an interpretation of the multivariate time-series. For example, systems and methods of the present disclosure can identify what physical measurement of the vehicle was reported (e.g., speed, accelerator pedal position, etc.) and linearly scale their values to a known unit (e.g., miles per hour, percent, etc.). In short, diagnostic signals and CAN data collected over a fixed period of ambient driving can be utilized to tokenize and translate CAN data into measurement values that describe a vehicle function in terms of a defined unit. Potentially other/external sensor data can be used in addition or replacement for the diagnostic signals to interpret translated signals.

Currently, CAN signals are reverse engineered through a painstaking manual process of initiating/observing a change in the vehicle then looking into what changed in the CAN data, and finally retesting this to gain confidence. Further, current systems and methods do not provide a framework to learn and understand certain CAN signals that cannot be physically observed or manipulated, e.g., intake temperatures.

Embodiments of the present disclosure enable reverse engineering vehicle signals from CAN data that accommodates both little and big endian byte orderings. That is, the embodiments of the present disclosure are capable of tokenizing and translating, with strong accuracy, vehicle CAN data that has been encoded with both little endian byte orderings and big endian byte orderings into a subset of individual values that represent measurements of vehicle characteristics being communicated in real-time on the CAN bus. Further, embodiments of the present disclosure enable reverse engineering vehicle signals from CAN data accommodating signedness (i.e., both "normal" base-2 bit-to-integer encoding and two's complement encoding).

Understanding the mapping for a CAN protocol instance (or portion thereof) can be an asset because technologies can be built upon the mapping. That is, if access to real-time tokenized and translated vehicle CAN data is available for at least a subset of signals, then additional features can be controlled, in real-time, based on those signals. For example, performance tuning for a variety of functions can be done by reprograming ECUs to change the data they send based on the real-time CAN messages. However, unless the ECU developer holds the CAN mapping or can reverse engineer the CAN mapping, such performance tuning is not possible. Because CAN mappings are kept proprietary in order to attempt to increase vehicle network security through obscurity, reverse engineering the CAN mappings may be the only practical way to gain access to the underlying CAN messages being communicated in the CAN data over the vehicle CAN bus.

Referring to FIG. 1, one embodiment of a flowchart 100 depicting how CAN-D operates is illustrated. The flowchart depicts how CAN-D provides a modular, four-step pipeline for identifying each CAN data signal's boundaries (e.g., start bit and length, or start and end bits) 102, endianness or byte ordering (e.g., little endian or big endian) 104, signedness or bit-to-integer encoding (e.g., normal or two's complement) 106, and augmenting extracted signals with meaningful, physical interpretation (e.g., by leveraging additional sensors or standards) to convert the signals to a labeled timeseries 108.

Put simply, one embodiment of the CAN-D pipeline is a four-step process to reverse engineer signal definitions for CAN data arbitration IDs.

The first part of the process includes learning cut or bit gap probabilities (i.e., the probability of a signal boundary occurring between two bits in the CAN data for each bit in a CAN data field associated with a particular arbitration ID). The probabilities can be determined by a processor operating on an ID trace (i.e., a sample of CAN data that shares the same arbitration ID) utilizing a signal boundary classification method. The output from the signal boundary classification method can be processed by a processor to optimize endianness by packing big endian tokens and little endian tokens (i.e., conducting a token packing optimization algorithm). The output from the endianness optimizer can be processed to determine signedness with a signedness classification method (i.e., each token can be classified as signed or unsigned). The tokens can be compared to known timeseries data and labeled in response (e.g., a processor can determine if any tokens are linearly related to any diagnostic signals or other timeseries sensor data available to the CAN-D pipeline). The output of the CAN-D pipeline can be signal definitions for a particular arbitration ID that enable near real time decoding of CAN signals.

The CAN-D pipeline can operate on a CAN log (i.e., essentially any capture of CAN data) as an input, and output a CAN database (e.g., DBC file) that includes signal definitions. Thus, providing vehicle agnostic CAN signal reverse engineering. The italicized sub-processes in dashed lines in FIG. 1 indicate modular portions that can be fulfilled by essentially any algorithm that satisfies the inputs and outputs of that modular block. Examples and descriptions of current embodiments of these different sub-processes are provided herein. Greek letters denote examples of various tuning parameters for each of these sub-processes. In particular, alpha α represents one or more tuning parameters for the signal boundary classifier, beta β represents one or more tuning parameters for the endianness optimizer, gamma γ represents one or more tuning parameters for the signedness classifier, and delta δ represents one or more tuning parameters for the signal-to timeseries matcher sub-process.

Some preprocessing may be done in order to prepare the CAN data or ID trace for the pipeline. This can include obtaining a CAN log file 110 or other form of CAN data (e.g., obtaining can include receiving, downloading, storing in memory, opening, filtering, processing, or any other operation or set of operations to obtain the subject CAN data that shares an ID) that can be fed to the CAN-D pipeline for decoding.

Figure 5:
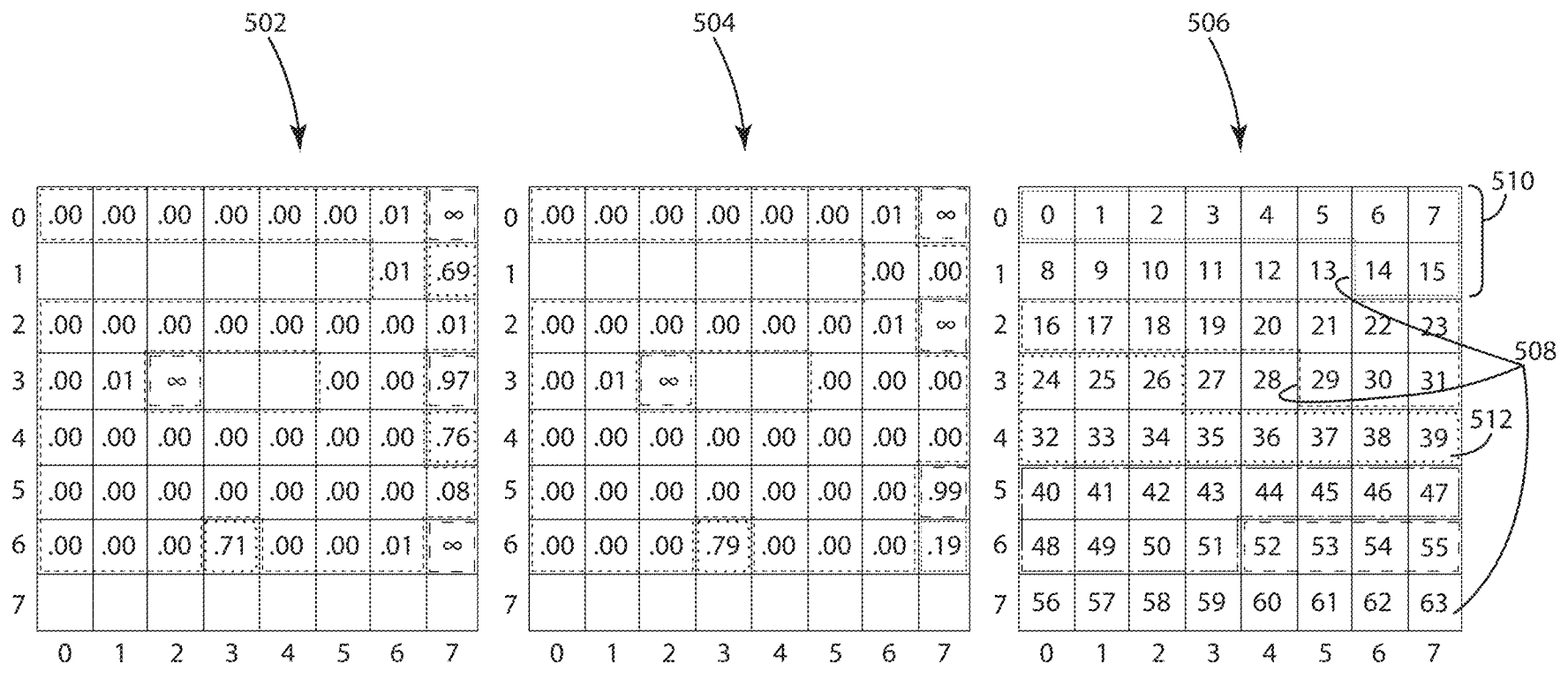

Identifying each CAN data signal's boundaries can be referred to as signal boundary classification 102 and can entail two steps: 1) applying a signal boundary classifier (α) to a CAN ID trace 112; and 2) outputting signal boundary probabilities 114. The output may or may not include processing steps to prepare for the next step. Put simply, for each CAN data arbitration ID in a CAN log, a signal boundary classifier outputs the likelihood of a signal boundary at each bit gap (i.e., between each set of two bits). Perhaps as best shown in FIG. 5, in the current embodiment, the signal boundary classifier outputs one set of probabilities assuming a little endian byte ordering 502 and one set of probabilities assuming a big endian byte ordering 504. The signal boundary classifier can be configured to predict the likelihood of signal boundaries within CAN data as a function of bits local to a bit gap. For example, in FIG. 5, the signal boundary predictions are represented by values between zero and one (or infinity). A low value indicates a low likelihood of a bit gap (i.e., that the border between two bits represents a signal border) while a high value indicates a high likelihood of a bit gap. Infinity is used where the algorithm is certain a bit gap exists. Although FIG. 5 depicts a visual representation of the probabilities with each probability associated with a particular bit, the visual depiction is being presented to aid in explanation. In actuality, the probabilities can be conveyed or accessed within the pipeline within essentially any data structure, such as an array. Further, it is worth noting that in FIG. 5, the values represent the likelihood of a bit gap between the bit and the bit to the right of that bit (in alternative embodiments, the value could present the probability of a bit gap between the bit and the bit to the left of that bit). For example, using the bit numbers shown in chart 506, the probability of a bit gap between bit 6 and 7 in both charts 502, 504 is 0.01. While the probability of a bit gap between bit 15 and bit 0 in chart 502 (assumed big endian) is 0.69 while in chart 504 (assumed little endian) is 0.00.

The signal boundary classifier methodology can vary depending on the embodiment. Essentially any heuristic or machine learning algorithm (e.g., supervised or unsupervised) can be utilized as a signal boundary classifier. Several examples of different signal boundary classifiers are discussed herein. For example, a bit flip heuristic and a supervised machine learning bit flip model two examples of signal boundary classifiers that can be utilized in the CAN-D pipeline.

The steps associated with endianness optimization 104 can include determining tokenization (i.e., signals' positions and endianness's) based on the boundary probabilities output by the signal boundary classification. In particular, the signal boundary probabilities 114 are fed as input to an endianness optimizer (β) 116. This sub-process outputs tokenized signals 118, on which signedness classification 106 can be conducted.

The Endianness optimizer 116 can accept the signal boundary probabilities 114 and output a set of tokenized signals 118. In the current embodiment, the Endianness Optimizer 116 accepts two sets of probabilities—one set represents the likelihood of a bit gap for each bit of the CAN data assuming little endian byte ordering and another set representing the likelihood of a bit gap for each bit of the CAN data assuming big endian byte ordering. The Endianness Optimizer is configured to select one of the signal boundary probabilities and output a set of tokenized signals based on that selection. Examples of the Endianness Optimization process are discussed below.

Signedness classification 106 involves accepting the tokenized signals as input and outputting translated signals. The signedness classifier methodology can vary depending on the embodiment. Essentially any heuristic or machine learning algorithm (e.g., supervised or unsupervised) can be utilized as a signedness classifier. An example of a signedness classifier is discussed below. In the current embodiment, signedness classification is performed using a binary signedness classifier 120, which determines each tokenized signal's signedness. The signedness classifier translates the CAN data bits for each tokenized signal provided to numeric values represented by a set of translated signals 122. One example embodiment of a signedness classifier 120 is a heuristic, which is described in more detail below. Another example of a signedness classifier is a supervised machine learning algorithm.

The translated signals 122 output by the signedness classifier 120 can undergo physical interpretation 108. External labels 124 can be added to the translated signals 122 before undergoing physical interpretation 108. Further, the translated signals 122 can be output can to a DBC file 126 (or other format) without being interpretation instead of, or in addition to, being physically interpreted.

If externally labeled translated signals (e.g., diagnostic standard signals or signals from an external sensor) 124 are present, the translated CAN signals 122 can be subject to physical interpretation 108, that is, they can be input to a physical interpretation sub-process for interpretation. In particular, the physical interpretation 108 can include a supplemental signal-to-timeseries matcher 130 that compares or matches input signals to externally collected and labeled timeseries data 128. That is, the signal-to-timeseries matcher 130 compares the external labeled timeseries to the translated signals and outputs a set of interpreted signals 132. For example, this comparison can be accomplished by regression of translated signals onto concurrently collected diagnostics. The interpreted signals 132 can be stored in a DBC file 134 or otherwise communicated to a user.

Figure 2:
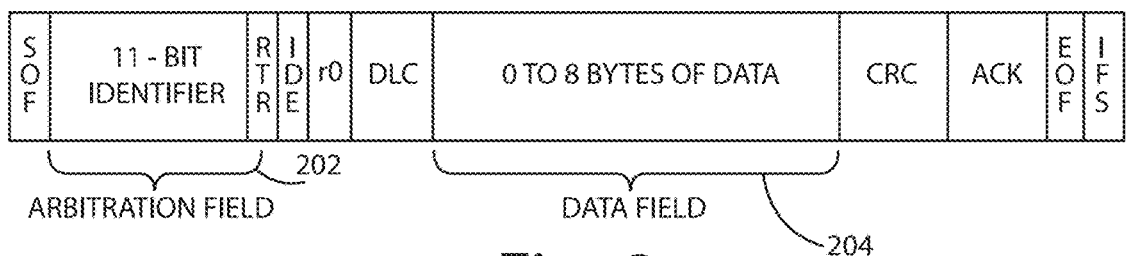
FIG. 2 illustrates an exemplary CAN 2.0 frame including an arbitration ID and data field.

Referring to FIG. 2, the CAN 2.0 frame 200 is depicted. The frame includes an Arbitration ID (AID or ID) field 202 used for indexing the frame, and a data field 204, which carries message content up to 64 bits. CAN 2.0 defines the physical and data link layers (OSI layers one and two) of a broadcast protocol. In particular, it specifies the standardized CAN frame (or packet) format represented in FIG. 2. Semantic understanding of a CAN frame can be achieved with the AID field and Data field and without knowledge of the contents of the other fields. For purposes of this disclosure, the terms "CAN frame" and "CAN packet" can be utilized interchangeably.

The Arbitration ID 202 (AID) is an 11-bit header used to identify the frame, and, at the physical layer, for arbitration (determining frame priority when multiple nodes concurrently transmit). The data field 204 contains up to 64 bits of content, and is also called the "payload" or "message". While the format of the CAN frame is well-established by protocol, the content (including format generally, endianness, and signal boundaries) of the data field varies depending on the message and is not standardized.

Each ID's data field can be comprised of signals of varying lengths and encoding schemes packed into the 64 bits. A CAN data field may or may not utilize all 64 bits. For example, the CAN data field may include multiple signals spread out across the 64 bits with some bits being unused and remaining static. The CAN data field for some arbitration IDs is only up to 64 bits long, meaning that the CAN data field may in practice be shorter than 64 bits. As an example, one CAN data field may only by 7 bytes (i.e., 56 bits). The CAN-D algorithm can pad the CAN data with leading or trailing zeroes, or can be adapted to account for different length signals. Other information in a CAN frame or the CAN signal definition can indicate the CAN data field length. A .DBC file provides the definitions of signals in the data field for each ID, thus defining each CAN message.

CAN frames with the same ID (message header/index) are usually sent with a fixed frequency to communicate updated signal values, although some are aperiodic (e.g., triggered by an event). For example, ID 0x3A2 may occur every 0.1 s, ID 0x45D may occur every 0.25 s, etc. CAN-D partitions CAN logs into ID traces, the timeseries of 64-bit messages for each ID. An ID trace can be denoted by notation such as: $[B_0(t), \ldots, B_{63}(t)]_I$, a time-varying binary vector of length 64. Note that without loss of generality, each message can be assumed to be 64 bits by passing padding with 0 bits if appropriate.

Byte Order (Endianness) & Bit Order

The significance of a signal's bits within a byte (contiguous 8-bit subsequences) decreases from left to right, i.e., the first bit transmitted is the most significant bit (MSB), and the last (eighth) bit, the least significant bit (LSB). This is defined in the CAN Specification but has been misrepresented and misunderstood by previous signal reverse engineering systems and methods. The confusion results from use of both big endian and little endian byte orderings in CAN messages. Big endian (B.E.) indicates that the significance of bytes decreases from left to right, whereas little endian (L.E.) reverses the order of the bytes (but maintains the order of the bits in each byte). A notation for conveying bit orderings for a 64-bit data field under both endiannesses is shown in Equation 1, with parenthesis demarcating bytes:

$$B.E.:(B_0, \ldots, B_7),(B_8, \ldots, B_{15}), \ldots, (B_{56}, \ldots, B_{63})$$

$$L.E.:(B_{56}, \ldots, B_{63}),(B_{48}, \ldots, B_{55}), \ldots, (B_0, \ldots, B_7) \quad \text{Equation 1}$$

Examples of signals contained within the CAN data field 204 of a CAN frame are discussed below, which explain how the endianness affects signal definitions.

CAN Signals

Specifications for decoding each arbitration ID's message into a set of signal values is typically defined by an original equipment manufacturer (OEM) and held secret, usually stored in a CAN database file (.DBC or DBC file). Signal definitions typically include the properties that enable a device to automatically process the CAN data field format for each arbitration ID in order to provide 1) tokenization (i.e., demarcate sequences of bits in the data field into discrete signals); translation (i.e., convert each of those sequences of bits to integers): and 3) interpretation (i.e., scale, typically linearly, raw translated signal values to physically meaningful and human-interpretable information) a CAN data field associated with a particular AID. Some examples of the types of signal definition properties that fall within these three broad categories (tokenize, translate, and interpret) are listed below:

Tokenize
  Find start bits and lengths of signals, which gives signal positions within in the CAN data field 204;

Find order of bits (and therefore bytes) of each signal:
   Endianness (byte order): If the signal crosses a byte boundary, little endian signals reverse the order of the bytes while big endian signals retain byte order (see Equation 1);
Translate
   Determine the signedness (bit-to-integer mapping): Unsigned, the usual base two encoding vs. signed, two's complement encoding;
Interpret—provides physical meaning of the signal and scale translated value to appropriate units
   Semantics
      Name/Label (e.g., speed, coolant temperature)
      Units (e.g., miles per hour, degrees Fahrenheit)
      Conversion—linear mapping of the signal's tokenized values to the appropriate value given the units
      Offset
      Scale Factor In general, it is implicit in a DBC signal definition that (non-constant) signals are contiguous sequences of non-constant bits.

Figure 3A:
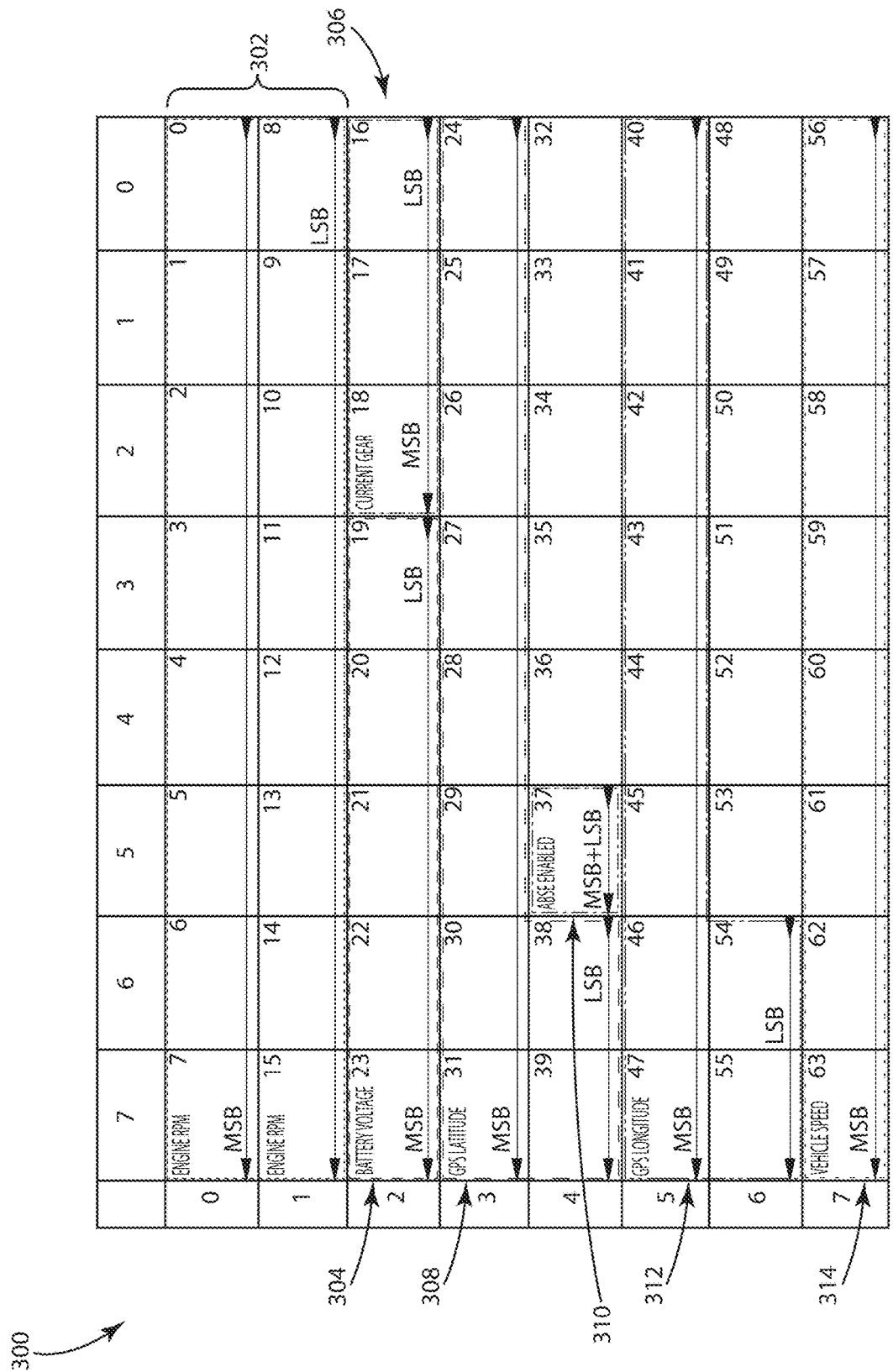
FIG. 3A illustrates a screenshot of a DBC file visualized through a DBC editor graphical user interface.
Figure 3B:
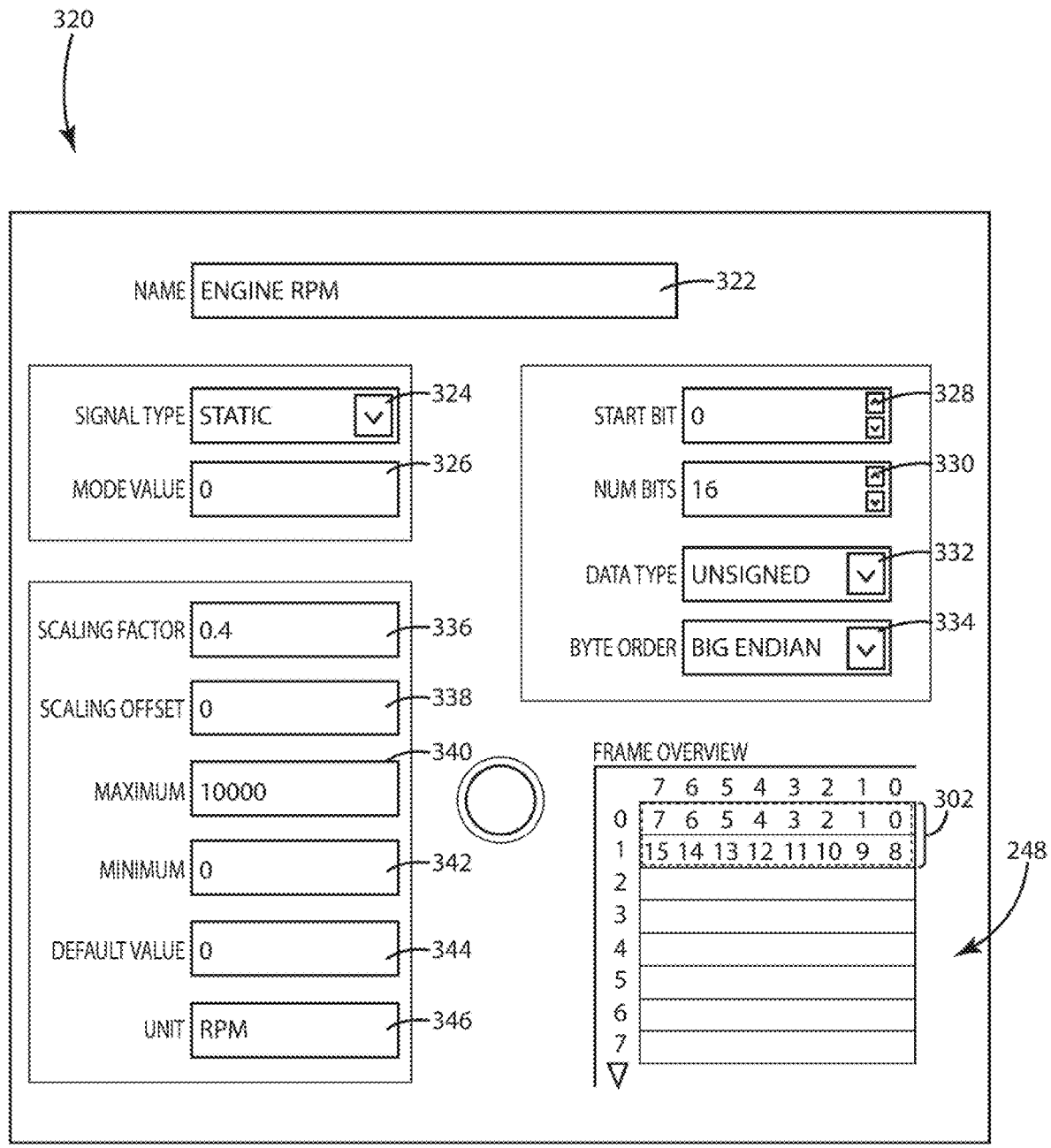
FIG. 3B illustrates a screenshot of a signal properties interface for one signal through a DBC editor graphical user interface.

An exemplary CAN data payload will now be discussed in connection with FIGS. 3A-3B to aid in understanding the various embodiments of the present disclosure. FIG. 3A illustrates a visualization 300 of a DBC file output by an exemplary DBC editor graphical user interface (e.g., CANdb++ Database Editor). The visualization 300 is provided in the form of a screenshot of a signal layout plot 300 that visually represents a CAN Message tokenization with a known or decoded mapping. In particular, seven (7) tokenized signals are depicted for one AID's 64-bit data field. The visualization is provided as an 8 by 8 array containing CAN signal(s). Individual bits are labeled with solid lines and numbered while each signal's constituent bits are grouped together with a different type or border and labeled with a separate reference numeral. This visualization and graphical user interface of FIGS. 3A-3B are merely exemplary ways in which to visualize CAN data and its characteristics. The visualization and underlying software utilized to generate, display, and manipulate the CAN data is not particular to the present disclosure—however, the visualization is helpful to aid in understanding how the various embodiments of the present disclosure operate.

Referring to FIG. 3A, the signal definitions for the EngineRPM signal 302 (bits 0-15), the BatteryVoltage signal 304 (bits 16-23), the CurrentGear signal 306 (bits 16-18), the GPSLatitude signal 308 (bits 24-31 and 38-39), the ABSEnabled signal 310 (bit 37), the GPSLongitude signal 312 (bits 40-47 and 54-55), and the VehicleSpeed signal 314 (56-63) are illustrated graphically, bit by bit with different outlines to group bits belonging to each respective signal. Unused bits are unlabeled and shown without outlines (e.g., bits 32-36 and bits 48-53). In FIG. 3A, the most significant bit (MSB) and least significant bit (LSB) for each signal are labeled.

FIG. 3B illustrates an exemplary graphical user interface that displays signal properties associated with the signal definition of the 16-bit EngineRPM signal 302 shown in FIG. 3A. In particular, the signal properties GUI 320 lists the name of the signal 322, signal type 324, and mode value 326. The signal properties GUI also lists the start bit 328 relative to that AID's CAN data field, length 330 (num bits), datatype 332 (signedness), endianness 334 (byte order or packing), scaling information (including scaling factor 336, scaling offset 338 max 340, min 342, and default 344), and unit 346. The exemplary signal properties GUI also includes a frame overview 248, which shows the position of the 16 bits of the EngineRPM signal 302 within the 8 by 8 array of the CAN data field for the subject arbitration ID. The signal properties GUI can be provided by essentially any DBC editing or viewing software, such as NI-XNET Database Editor or any other editor capable of parsing a DBC file or other CAN data file.

Tokenization and translation of the EngineRPM signal 302 will now be discussed in detail in connection with an embodiment of the present disclosure. To tokenize the signal 302 (i.e., for CAN-D to recognize or identify the appropriate sequence (implying order) of bits), the endianness of the signal is determined. For example, if bytes 1 and 2 are big endian, the bit indices are obtained using MSB-to-LSB bit indices, I=(0, . . . , 15) whereas if they are little endian, the bytes are swapped, obtaining MSB-to-LSB bit indices I=(8, . . . , 15, 0, . . . , 7), notably with bit 15 adjacent in the signal to bit 0 ($B_{15}$->$B_0$). Next, the signal's signedness classification furnishes the translation of that bit sequence to an integer. Finally, the information provided by the interpretation function in this example are the label and unit of the signal (in this case EngineRPM and RPM) and the linear transformation to convert the translated values (a two-byte signal can take $2^{16}-1=65,535$ values) to the appropriate physical value (e.g., in the range 0-10,000 RPM).

Figure 6A:
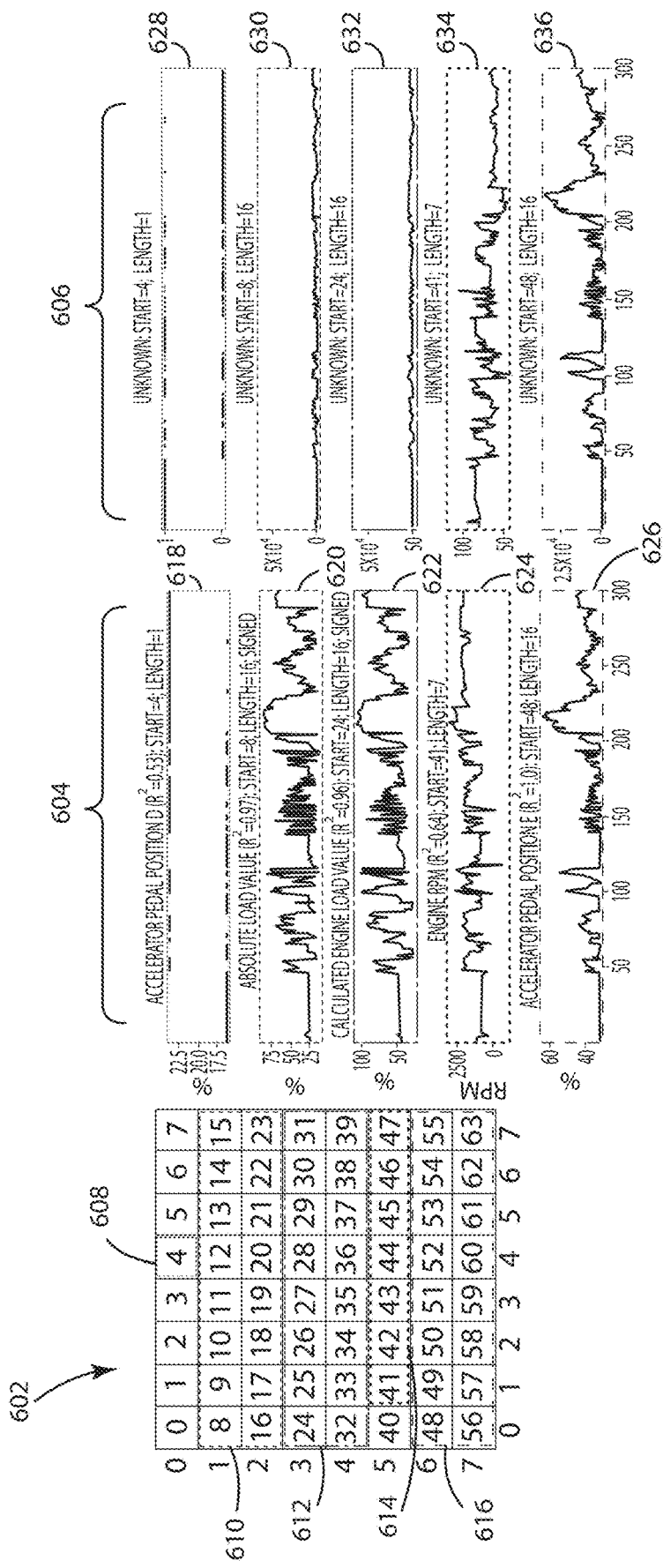
FIG. 6A illustrates a CAN data signal layout plot, CAN data timeseries signal plots correctly tokenized with CAN-D, and CAN data timeseries signal plots incorrectly tokenized with a known CAN decoding methodology.
Figure 6B:
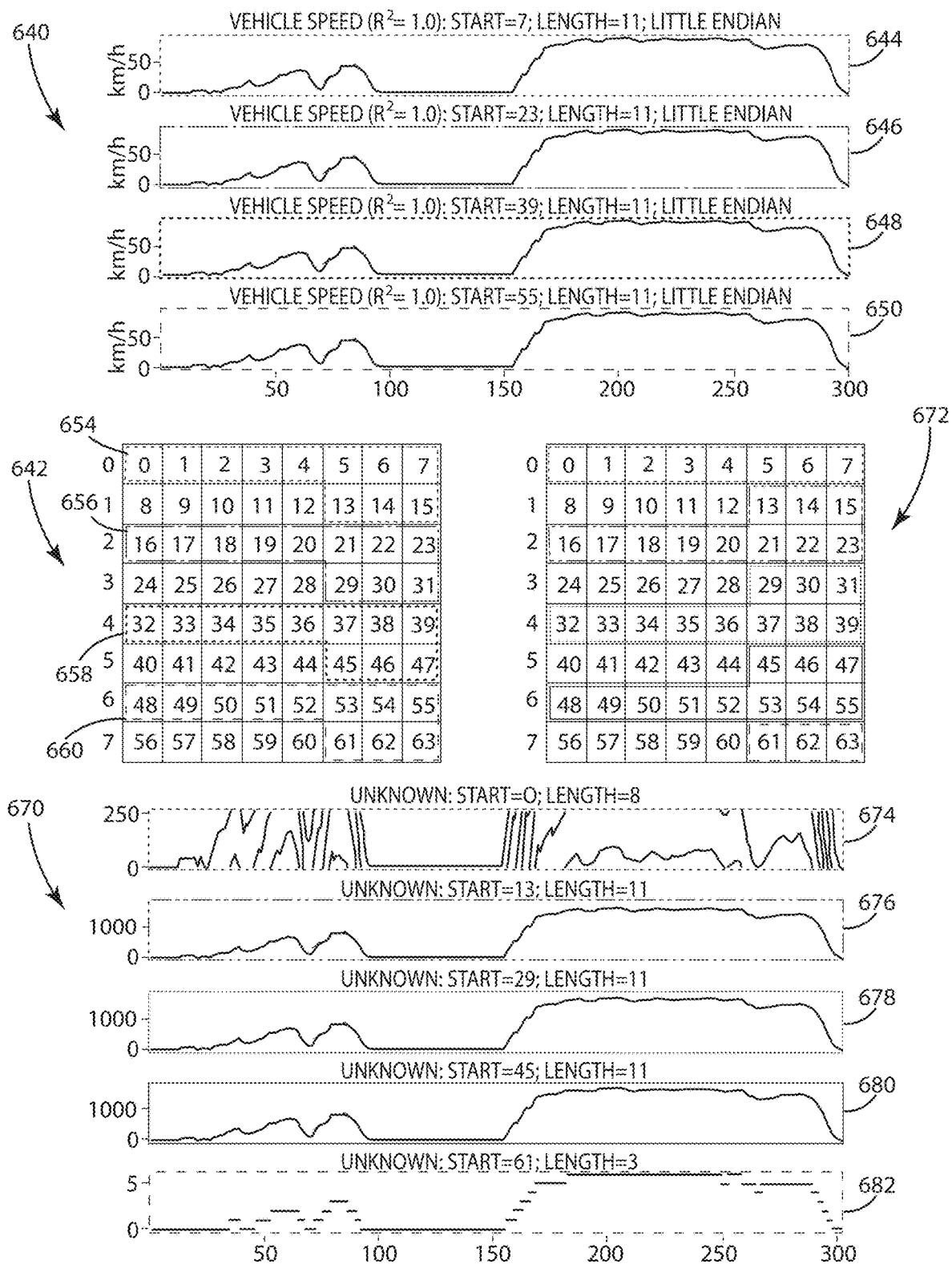
FIG. 6B illustrates CAN data signal layout plots and CAN data timeseries plots with correct tokenization & translation by CAN-D and incorrect tokenization & translation by other known methods.
Figure 6C:
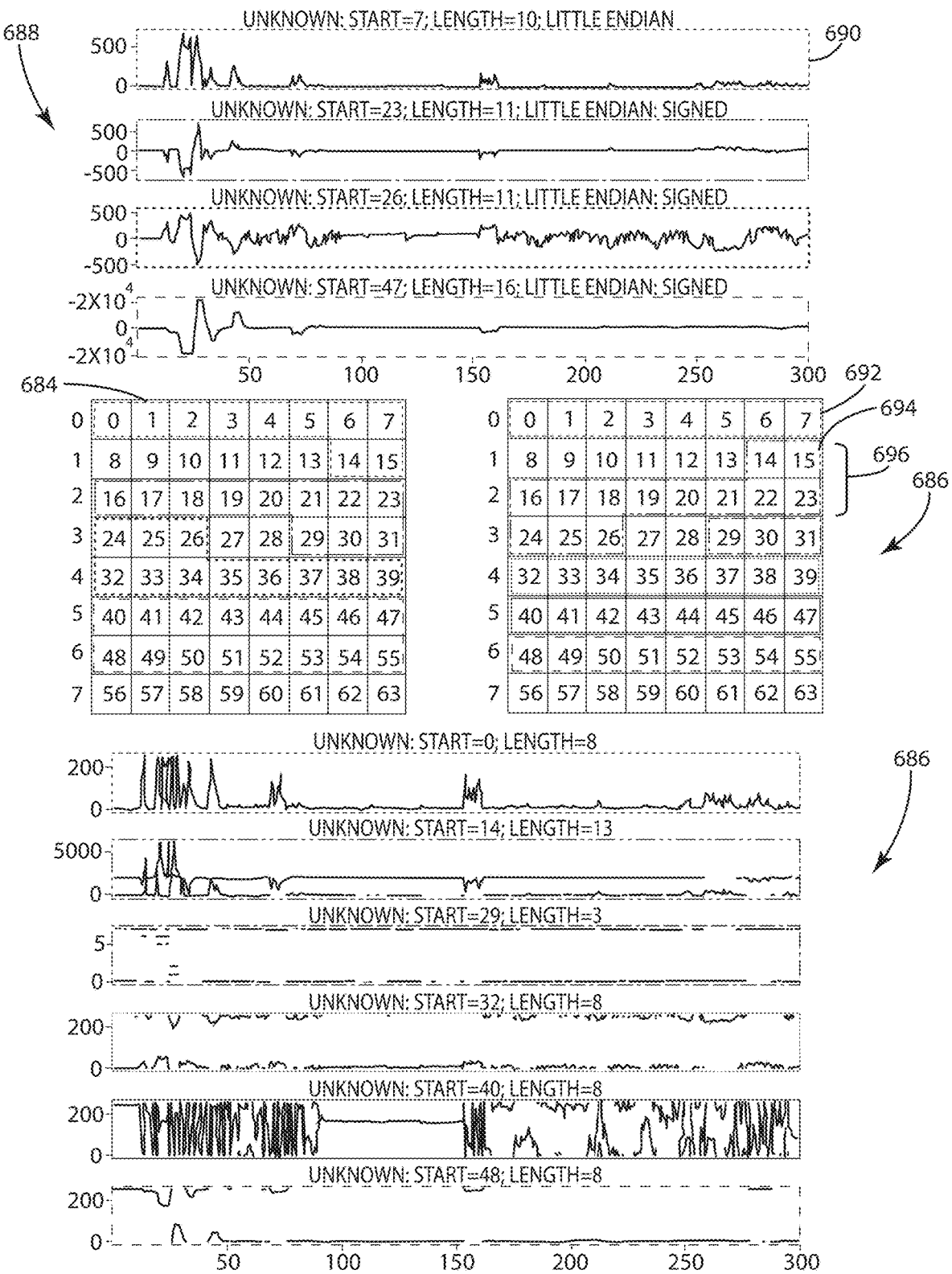
FIG. 6C illustrates CAN data signal layout plots and CAN data timeseries plots with correct tokenization & translation by CAN-D and incorrect tokenization & translation by other known methods.

FIGS. 6A-C illustrate timeseries of CAN data that have been decoded using both correct and incorrect signal definitions. In particular, FIGS. 6A-C illustrate tokenization and translation of three CAN data messages by CAN-D relative to how other known methods, such as READ and LibreCAN, decode them. When interpretation is provided by CAN-D, the label and units of the matched diagnostic is shown with the $R^2$ value ($R^2$ is the coefficient of determination, which measures the fraction of variation of the CAN signal's variation that is explained by the matched diagnostic signal, where $R^2=1$ is best), and the CAN signals are linearly scaled accordingly.

FIG. 6A illustrates a signal layout plot for a CAN data message 602 with a particular AID, CAN data timeseries signal plots tokenized with CAN-D 604 for that AID, and the CAN data timeseries signal plots tokenized with a previous CAN decoding methodology 606. The FIG. 6A subject CAN message includes signed and unsigned engine- and pedal-related signals. The signal layout plot 602 illustrates proper signal boundaries and endianness 608, 610, 612, 614, 616, which in this example were correctly identified by CAN-D as well as a known decoding system. The CAN-D data timeseries signal plots 604 accurately translate and physically interpret all of the CAN data signals in this example with a relatively high $R^2$ score for all five signals. Good matches are found for the Calculated Engine Load Value signal 622 ($R^2=0.96$) (corresponds to bits 612), the Absolute Load Value signal 620 ($R^2=0.97$) (corresponds to bits 610), and the Accelerator Pedal Position E signal 626 ($R^2=1.0$) (corresponds to bits 616), indicated by their high goodness of fit values ($R^2$). The Accelerate Pedal Position D signal 618 (corresponds to bits 608), matches to DID 'Accelerator pedal position D' with low score ($R^2=0.53$), which means CAN-D is not as confident, but still predicts that it is likely an accelerator indicator. This information is not an available DID, accordingly CAN-D has unearthed information that could not be queried. The Engine RPM signal 624 (corresponds to bits 614 (i.e., bits 41-47)) matches to DID with ($R^2=0.64$).

In contrast, other decoding methods have difficulty translating the CAN data field bits to values, as evidenced by the timeseries signal plots 628, 630, 632, 634, and 636. For example, these plots show how other CAN decoding methodologies incorrectly translate the Calculated Engine Load Value signal 634 and the Absolute Load Value signal 632 both as unsigned, resulting in sharp discontinuities where the signals change sign.

FIG. 6B illustrates CAN data signals tokenized with correct vs. incorrect endianness. A CAN message containing four wheel speeds encoded as little endian signals is illustrated in FIG. 6B and designated 642. As shown in the timeseries signal plots 640, the correct tokenization and translation is provided by an embodiment of CAN-D along with the matching diagnostic signal Vehicle Speed with a perfect match score ($R^2=1$). That is, the CAN message is identified as having four signals 654, 656, 658, 660 delineated on the signal layout plot 642, which correspond to the four timeseries signal plots 644, 646, 648, 650. In contrast, known methodology mis-tokenized the same CAN data field for the same AID as having five big endian signals with MSBs (bits 13-15, 29-31, and 45-47) attributed to the wrong signals, as shown in the marked CAN message 672. Despite this, all decoded speed signals 670 appear correct, save some minor discontinuities. However, these signals (674, 676, 678, 680, 682) that encode the wheel speeds are often used by Electronic Stability Control to stimulate anti-lock braking and traction control pending discrepancies in wheel speeds; hence, mixing the MSBs of wheel speeds may go unnoticed in normal conditions but prove consequential in adverse driving conditions! Put simply, because this specific case involved very closely related signals packed into a single data field, when other algorithms wrongly attributed bits to neighboring signals, these mis-tokenized signals resulted in translations that are relatively accurate much of the time, but could prove problematic for the driver's safety.

FIG. 6C illustrates layout plots and timeseries plots related to a CAN message containing four steering-related, little endian signals, three of which are signed. The CAN-D timeseries plots 684 illustrates the correct tokenization and translation by CAN-D (no interpretation), while another method's timeseries plots 686 show incorrect tokenization and translation. The incorrect plots 686 assume big endian signals and are forced to cut on most byte boundaries, resulting in mostly truncated, noisy signals 688. One particular timeseries signal plot 690 is not as noisy, but is noticeably incorrect when comparing the scale and the values for t∈[0-50] to the correct CAN-D translation or ground truth. This is perhaps best seen by comparing the correct 684 and incorrect 686 layout plots, where the two MSBs 694 are misattributed to the next signal 696 instead of signal 692, resulting in errors of at least $2^8$ when the MSB(s) are nonzero.

The clear discontinuities in these mis-tokenized and mis-translated signals exhibit some of the advantages of CAN-D's endianness optimizer and signedness classifier for extracting meaningful timeseries.

In the U.S., all vehicles sold after 1996 include an on-board diagnostic (OBD-II) port, which generally allows for open access to automotive CANs. Emissions-producing vehicles sold after 2007 also include a mandatory, standard interrogation schema for extracting diagnostic data using the J1979 standard. This On-board Diagnostic service (OBD) is an application layer protocol that enables querying of diagnostic data from the vehicle by sending a CAN frame. A CAN response is broadcast with the requested vehicular state information. There are a standard set of queries available via this call-response protocol (e.g., accelerator pedal position, intake air temperature, vehicle speed) along with unit conversions, each corresponding to a unique diagnostic OBD-II PID (DID). It is well understood how to send and receive these call and response messages and therefore will not be discussed in detail. Previous CAN decoders have iteratively sent DID requests and parsed the responses from CAN traffic to capture real-time, labeled vehicle data without using external sensors. These timeseries of diagnostic responses, or DID traces can be denoted D(t). Inherent limitations exist in these queries—the set of available DIDs varies per make, and electric vehicles need not conform to this standard.

One goal of the present disclosure is to recreate a .DBC file with signal definitions for some, most, or all CAN AID's. Put another way, one aim of the present disclosure's CAN-D systems and methods is to accurately predict four properties for each CAN signal for any vehicle from a sufficient capture of a vehicle's CAN data. That is, to reverse engineer CAN signal definitions without having access to the .DBC file or other secret information that maps the CAN data field of common arbitration IDs to physical signals.

The systems and methods of the present disclosure are configured to determine which bits are constant and therefore are considered unused, account for both big and little endian byte orders, account for both endiannesses occurring in a single ID, which is permitted by protocol and DBC syntax. DBC editor GUIs allow per-signal endianness specification with a checkbox or pull down (e.g., as shown in FIG. 3B), which further reinforces that both byte orderings can co-occur in a message. The systems and methods of the present disclosure are also configured to account for the inability of a single byte to have bits used in a little endian signal while also containing bits used in a big endian signal because in such a case the byte orders indicated by the signals would be contradictory. Further, the systems and methods are configured to handle signed signals, for example using a 2's complement encoding.

In practice, it can be difficult for a CAN decoding system and method to exercise the MSBs of a signal, resulting in errors in determining signal boundaries. For example, consider the two-byte (16-bit) Engine RPM signal in the example above with translated values between 0-10,000. As 5,000 RPMs is rarely reached during practical driving, the MSB of this signal is likely to be observed as a constant 0 bit, causing the signal start bit to be mislabeled. Though this is easily surmountable for RPMs (e.g., by revving the engine in neutral during collection), this issue can be more difficult to address for latent sensors, e.g., engine temperature.

Secondly, since continuous signals are sampled periodically, those with high resolution signals (e.g., a two-byte signal has $2^{16}$>65,000 values) have LSBs flipping seemingly randomly. The TANG algorithm, one known algorithm utilized to classify signal boundaries, suffers from the overly strict assumption that flip frequencies are monotonically decreasing with bit significance.

Thirdly, considering both big and little endianness greatly enhances complexity of decoding CAN data because bits on byte boundaries have unknown neighbors (albeit in a fixed set of possibilities); e.g., simply comparing the bit flip probabilities of neighboring bits would involve custom rules for incorporating all possible neighbors according to both endianness, removing impossibilities imposed by the fact that a single byte cannot have bits used in both little and big endian byte ordering.

Fourthly, considering both signed and unsigned encodings adds another hurdle; in particular, the order of bit representations mod $2^n$ is the same for both signed and unsigned, half the bit strings represent different integers.

Finally, many CAN signals communicate sensor values that are hard to measure with external sensors; hence, identifying the physical meaning, unit and linear mapping (scale and offset) can be difficult.

Below, the disclosure covers six CAN-D aspects for automotive CAN signal reverse engineering. Embodiments of the present disclosure can incorporate any number of these different aspects in essentially any combination.

Comprehensive Signal Reverse Engineering Pipeline

One aspect of CAN-D is that it provides a modular, four-part pipeline. A flowchart 100 representing the modular pipeline is depicted in FIG. 1. The pipeline illustrates how CAN-D is configured to learn four components of CAN signal definition, respectively. The pipeline is modular in that: Step 1 102 can accommodate any signal boundary classification method; Step 3 106 can accommodate any signedness classification algorithm; and Step 4 108 can accommodate any signal-to-timeseries matching algorithm for physical interpretation. Instantiating the pipeline with a signal-boundary classification heuristic and (separately) a trained machine learning classifier for Step 1 and known diagnostic sensor matching (e.g., that of Verma, M. E. et al. (2018) ACTT: Automotive CAN Tokenization & Translation. CSCI IEEE, which is hereby incorporated by reference in its entirety) for Step 4. Overall, CAN-D accommodates signals as defined in automotive DBC files, and can accurately predict CAN data signals. Further, it provides a framework for improving different aspects of CAN decoding.

Signal Boundary Classification Algorithms

Two exemplary state-of-the-art signal boundary classification algorithms are described herein: a signal boundary classifier based on a supervised machine learning model and a signal boundary classifier based on a heuristic. Essentially any signal boundary classification algorithm can be utilized. For example, a heuristic signal boundary classification algorithm can be implemented in the CAN-D pipeline or a supervised or unsupervised machine learning signal boundary classification algorithm can be implemented in the CAN-D pipeline. Such classifiers can provide increased accuracy of signal boundary classification relative to previous known methods, superior in both recall and precision.

Endianness Optimization Formulation and Solution

Known CAN decoders are based on an assumption of big endian byte ordering (to perform tokenization and/or signal-to-timeseries matching) and there is no known, simple remediation for adapting the previous algorithms to perform correctly in the presence of both big and little (reverse byte order) endian signals. The second step of the CAN-D pipeline includes a sub-process configured to use the predictions from any signal-boundary classification algorithm from Step 1 as input to determine an optimal set of endiannesses and signal boundaries from all possible or practical tokenizations. CAN-D includes an objective function that can reduce the search space to a tractable grid search algorithm for optimization. Overall, this allows all signal-boundary classification algorithms to be leveraged for extracting both little and big endian signals—which has thus far been ignored and/or insurmountable in known CAN decoding systems.

Signedness Classification

CAN-D provides a sub-process for determining signal signedness (bit-to-integer encoding), allowing translation of signals to timeseries. Testing shows this heuristic can achieve greater than 97% F-Score. Essentially any signedness classification algorithm can be utilized. For example, a signedness heuristic can be implemented in the CAN-D pipeline or a supervised or unsupervised signedness machine learning algorithm can be implemented in the CAN-D pipeline.

OBD-II Plugin for In-Situ or Offline Use

CAN-D can be run offline for post-drive analysis or during operation/driving e.g., to feed online analytics such as a CAN intrusion detection system (IDS) with translated CAN data. A lightweight on-board diagnostic (OBD-II) port plugin device can provide CAN-D in any vehicle where a CAN is accessible via the OBD-II port (most vehicles). In a signal learning phase, the device can automatically log CAN data while periodically querying supported DIDs. In the learning mode, CAN-D can operate the algorithmic pipeline to learn signal definitions and write a DBC or partial DBC. This allows real-time decoding of CAN signals on future drives, e.g., to feed a novel analytic technology leveraging the vehicle's signals online, or offline uses, e.g., to analyze CAN captures in post-collection analysis. This device can bridge the gap between algorithmic research and actual practical online use with any vehicle.

Unveiling CAN signals can provide real-time measurements of vehicle subsystems, a rich stream of data that can fuel many vehicle technologies and put development and analytics in the hands of the consumers (in addition to OEMs).

A vehicle-agnostic CAN signal reverse engineering tool, such as CAN-D, promises to remove hurdles imposed by obscured CAN data and provide rich, online, time-series data for advancements in detection and other security technologies. Further, this CAN signal decoding can promote universally applicable technologies to address vehicles currently on the road and remove reliance on the vehicle OEMs for CAN security.

CAN-D can provide access to the decoded CAN data in order to allow further development of driver fingerprinting, where drivers are identified based on their driving characteristics, such as braking, accelerating, and steering. CAN-D can allow applications in this subfield to be ported to plugin technologies for nearly any vehicle, impacting at a minimum driver privacy and insurance strategies, and potentially forensic (e.g., criminal) investigations, and vehicle security to name a few areas.

In addition, access to CAN signals can potentially assist development of after-market tuning tools for enhanced efficiency and performance, fuel efficiency monitoring and guidance, fleet management, vehicle fault diagnosis, cyber security technologies forensics technologies, and after-market vehicle-to-vehicle capabilities.

Further, as after-market technologies to provide autonomous driving capabilities to current vehicles appear in particular, applications such as Open Pilot (https://comma.ai/), the ability to provide latitudinal and longitudinal control for many vehicles on the road can be provided using a few manually reverse engineered CAN signals. Automated, accurate, and universally applicable CAN de-obfuscation promotes and expedite such vehicle technologies, especially, after-market solutions for many vehicles currently in use CAN-D can avoids pitfalls of previous CAN decoders by not assuming big endian byte order and unsigned encodings. To identify signedness, a binary classifier can be utilized. Accounting for different endianness can be difficult because (1) signal boundary algorithms generally depend on flip counts of "neighboring" bits, but bit orderings change with endianness, so neighboring bits cannot be determined; and (2) without considering both endiannesses, the locality of predictions makes signal boundary identification computationally simple (the same binary classification is independently repeated 64 times per ID), but considering all byte orderings grows the search space combinatorially ($2^{64}$ boundary options $2^8$ byte orders>4.72E21 tokenizations per ID!) with a web of changing dependencies.

CAN-D Algorithm

The CAN-D (CAN-Decoder) algorithm will now be described in further detail. As discussed in connection with FIG. 1, CAN-D is generally directed to a four-step modular pipeline that provides a vehicle-agnostic CAN signal reverse engineering solution. Examples of the inputs and outputs for the modular components, along with a description of the sub-processes that makeup the CAN-D algorithm are described herein. In particular the sub-processes include—a signal boundary classifier (Step 1), a signedness classifier (Step 3) and a signal-to-timeseries matcher (Step 4)—as well as an endianness optimizer (Step 2), which provides the glue for the other interchangeable components.

Step 1: Signal Boundary Classification

In the current embodiment, given an ID trace as input, a signal boundary classifier can make up to 64 binary classification decisions—for each of the 64 bits (if the CAN signal is shorter, it can be padded with zeroes or the algorithm can be adapted to accommodate variable size inputs). The current embodiment of the classifier predicts if each bit is the least significant bit (LSB) of a signal (or not), effectively deciding if a signal boundary or "cut" occurs between each bit and one of its neighbors. In general, signal boundary classifiers have typically focused on use of hand-crafted heuristics that leverage only one feature, the probability of each bit flipping. One aspect of the present disclosure pursues that goal, but utilizes a wider set of features. While one embodiment of the signal boundary classifier employs a heuristic, other embodiments employ a machine learning algorithm to determine signal boundaries. For example, the present disclosure can leverage a machine learning (ML) algorithm (supervised or unsupervised) to provide a signal boundary classifier. In the current disclosure several types of signal boundary classifiers are described including a signal boundary heuristic and a supervised machine learning algorithm, but other types of signal boundary classifiers can be implemented in the modular CAN-D pipeline that replace or augment these types of signal boundary classifiers.

For the CAN-D reverse engineering pipeline, outputs of the signal boundary classifier in Step 1 are provided as inputs to an endianness optimizer in Step 2. While signal boundary identification can be framed as a set of binary classifications, the input for Step 2 of the CAN-D pipeline is the estimated probability—in $\{0, 1\}$ for binary heuristics or in $[0, 1]$ for ML—of a signal boundary for each bit. Other signal boundary classification algorithms could be used as the signal boundary classifier for this step, which generally produce binary label outputs.

For example, one such exemplary signal boundary classification algorithm is the Transition Aggregated N-Grams (TANG) signal boundary classification algorithm. TANG uses a computationally efficient way to obtain the bit flip count; hence, if an n-bit signal's subsequent values change by unit increments, the LSB will exhibit $T_i = 2^n + 1$, and each next significant bit will have TANG values decreasing by a factor of 2. This can be utilized to calculate signal boundaries by computing the TANG vector from an ID trace, identifying the bit with maximal TANG value as a signal's LSB, and walk left absorbing bits into the signal until the TANG value increases. The next stage in the CAN-D pipeline can take the signal boundaries determined by TANG as an input and use other CAN-D modules to determine endianness, signedness, and interpret some signals. Specifically, CAN-D can account for byte (as opposed to bit order considered by some) order, without assuming big endian, unsigned, and continuous signals like other decoding methods.

As further examples, heuristics and unsupervised and supervised machine learning predictions can be utilized for signal boundary classification. They can be based on statistics describing how a particular bit and its neighboring bits flip. A ground truth DBC can be utilized to create a target vector, providing a 0/1 label for each bit indicating if it is a signal's LSB (boundary). In order to deal with the issue that neighboring bits at byte boundaries that are conditioned on endianness, little endian signals are split on byte boundaries for training (the supervised models) and testing (all) models. In use, the classifier (heuristic or ML) can be applied to ID traces under both byte orderings (see Eq. 1), creating two sets of predictions. One set of prediction assumes big endian byte order and one set of prediction assumes little endian byte ordering. Both sets of predictions can be input to Step 2, which can determine endianness by determining which predictions are accurate and represent the signal boundary and endianness of the various signals.

This disclosure describes two views of data used for training then scoring/tuning the ML. Both can also be used for testing all methods. For training, constant bits can be removed (obvious boundaries) forming a "condensed trace". The motivation for this is at least threefold:

(1) Observed constant bits delimit signals, so a simple rule suffices to identify obvious signal boundaries;

(2) CAN-D features encode neighboring bits' values and flips, so when nearby bits are constant, features are either trivial or undefined. Removing the constant bits prior to feature building yields a better feature set; and (3) Classes are biased towards the negative class—that is most bits are not a LSB and not on a signal boundary. By removing constant bits, better features are developed, the number of non-obvious signal boundaries increases, and class bias is reduced, in particular for the nonobvious examples, which is precisely the instances for which a classifier is needed.

Using this condensed trace, a feature array with shape m non-constant bits by $n_f$ features (features described below for each method) can be built.

For tuning the ML classifiers related to this, performance of just the non-obvious boundaries in the original data can be considered—those boundaries not abutting constant bits in the non-condensed ID traces. The supervised model can be tuned based on this set of features because ultimately the model can be applied to the full 64-bit traces and this can help to optimize performance for this situation.

Supervised Classification

To describe features conceptually, $i \pm 1$ is utilized to denote bit i's neighbors, notationally neglecting the varying neighbors based on endianness (ref. Eq. 1) when it only presents unnecessary complications. For each bit i, a set of (e.g., 15) features can be generated:

five local features to bit i and its relationship to bit i+1, which can be denoted by $v_i^{id} \in \mathbb{R}^5$. These features represent estimated probabilities of a "bit flip" based on observations in data over time. The flip of a bit i—alternating value in subsequent messages, $B_i(t_j) \neq B_i(t_{j+1})$—can be denoted $F_i$ Table I shows local bit-flip features: $F_i$ denotes a flip of bit i.

TABLE I $P(F_i)$
$P(F_i | F_{i+1})$
$P(F_{i+1} | F_i)$
$P(\neg F_i | \neg F_{i+1})$
$P(\neg F_{i+1} | \neg F_i)$ Due to the nature of vehicle CAN data signals, a signal's LSB generally alternates its value much more often than an adjacent signal's MSB; hence, the bit-flip features provide good indicators for boundaries. Specifically, the first feature should identify LSBs ($P(F_i) \approx 1$) and MSBs ($P(F_i) \approx 0$). The next four conditional bit flip features are expected to differ significantly for adjacent bits contained in the same signal versus those that are part of separate signals, as the former are likely dependent while the latter are likely independent.

The algorithm analyzes the neighboring bit on the right, bit i+1, and adds the five local features for this bit $v_{i+1}^{id}$, to a feature set for bit i. In addition, the algorithm includes adding five difference features $\delta(v_{i+1}^{id}, v_i^{id})$, yielding a total 15-length feature vector for bit i.

A wider variety of features based on bit values, two-bit distributions, and entropy, as well as more left/right neighboring features can be added to the feature vector in alternative embodiments. However, in the current embodiment, this feature vector makeup provides reasonable classification performance while avoiding overfitting.

A variety of different binary classifiers can be utilized: Naive Bayes, Logistic Regression, Support Vector Classifiers, Decision Trees, Random Forests, K-Nearest Neighbors, Multi-Layer Perceptrons, and AdaBoost to name a few examples. Different weighting schemes can be utilized to combat the bias class issue as well as the fact that the algorithm only scores the non-obvious boundaries. In some embodiments, a sample weighting scheme of nonobvious-positive:negative:obvious-positive labels of 8:4:1 provides satisfactory results. The accuracy of the classifier can be verified with Leave-One-Out-Cross-Validation (LOOCV), holding out one CAN log per fold and aggregating the results, only scoring nonobvious boundaries.

Classification metrics can be aggregated using LOOCV by CAN log, only scoring non-obvious boundary decisions. Optimal parameters can be chosen using a grid search and LOOCV in order to provide a tuned model. For example, a tuned random forest classifier is utilized in some embodiments as the step 1 binary classifier and provides about an 88% precision and 95% recall for an F-Score of 91%. Table II below lists aggregated Classification Metrics using LOOCV by CAN log, only scoring non-obvious boundary decisions. Metrics are shown for classifiers with default Scikit-learn parameters as well as the top-performing Random Forest Model with optimal parameters chosen using a grid search.

TABLE II

| Classifier | F-Score | Precision | Recall |
|---|---|---|---|
| Naive Bayes | 71.6 | 57.6 | 94.7 |
| Logistic Regression | 86.9 | 82.1 | 92.3 |
| SVC Linear | 85.5 | 78.6 | 93.8 |
| SVC Poly | 88.7 | 85.3 | 92.3 |
| SVC RBF | 89.0 | 84.8 | 93.8 |
| SVC Sigmoid | 46.4 | 42.3 | 51.4 |

TABLE II-continued

| Classifier | F-Score | Precision | Recall |
|---|---|---|---|
| KNN | 88.1 | 81.3 | 96.2 |
| MLP | 88.4 | 82.5 | 95.2 |
| AdaBoost | 87.6 | 82.6 | 93.3 |
| Decision Tree | 78.5 | 67.8 | 93.3 |
| Random Forest | 90.2 | 85.4 | 95.7 |
| Random Forest (Tuned)[1] | 91.2 | 87.6 | 95.2 |

[1] max_features = $\sqrt{n_f}$, min_samples_Leaf = 3, n_estimators = 200, max_depth = 5

The output of the classifier can be provided to Step 2 (discussed below). Alternatively, the output provided can be the classifier's predicted probability of a bit i being a signal's LSB. As discussed above, the output can be provided in the form of two sets of bit predictions (one for little endian and one for big endian), e.g., two separate bit arrays of predictions of bit gaps (i.e., the position between two bits where a signal begins or ends) in the CAN data. Before discussing Step 2 in further detail, another signal classification subprocess is discussed, a CAN-D signal boundary classification heuristic.

Signal Boundary Classification Heuristic

Another exemplary signal boundary classification algorithm that can be utilized in CAN-D is a heuristic, e.g., that utilizes bit-flip probabilities. In particular, the conditional bit-flip probability $P(F_{i+1}|F_i)$ and the difference between successive conditional bit flip probabilities $P(F_{i+2}|F_{i+1}) - P(F_{i+1}|F_i)$ can provide a practical indicator of whether a signal ends at bit i. This heuristic, based on both of these features, is generally more accurate than those based on the difference of unconditional bit flip probabilities $P(F_{i+1}) - P(F_i)$ used by other CAN decoding systems.

Figure 4:
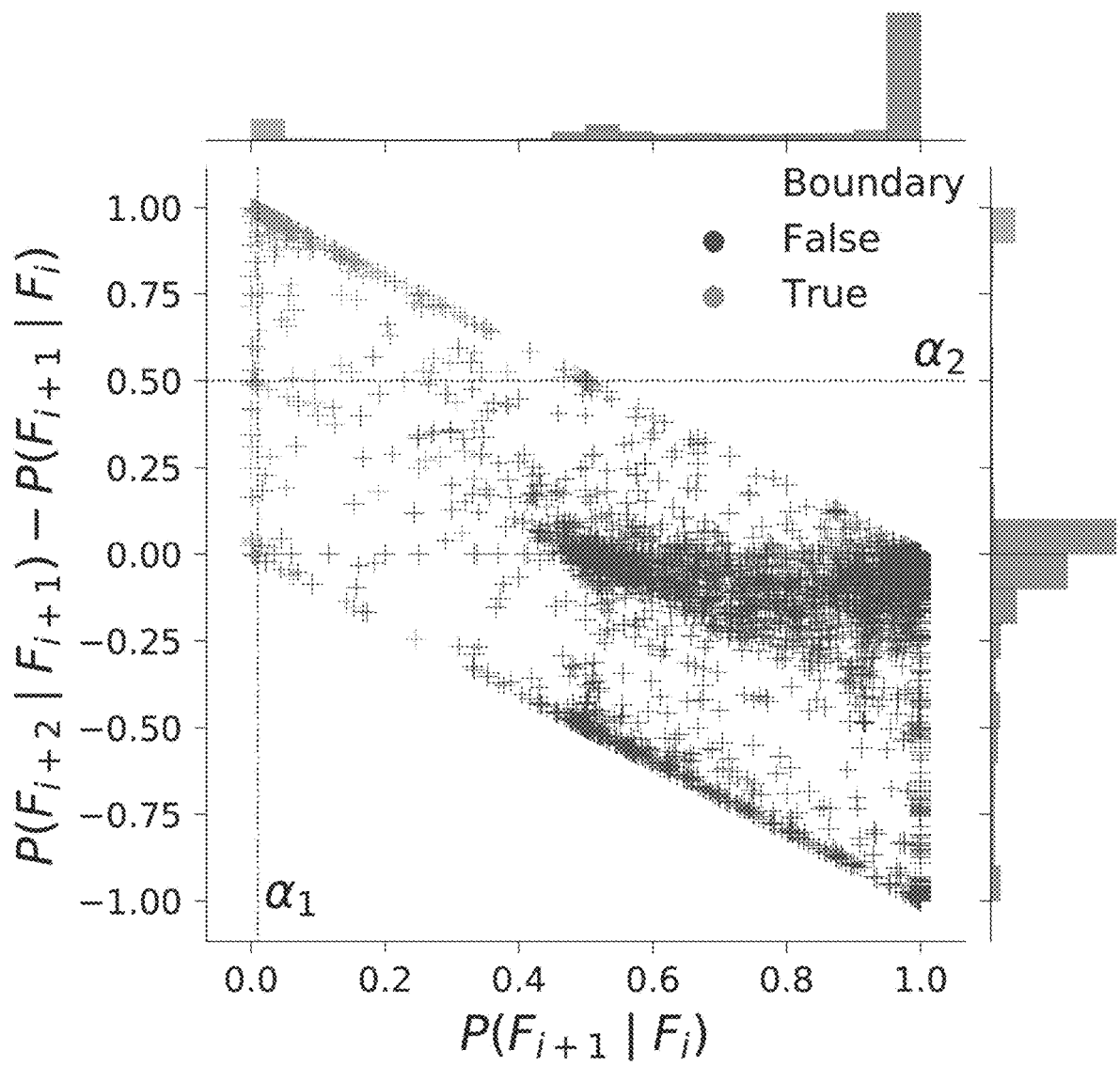
FIG. 4 illustrates a visualization of a heuristic CAN data signal boundary classifier based on conditional bit flip probabilities.

An illustration of one embodiment of a signal boundary classifier in the form of a heuristic is shown in FIG. 4 and the algorithm for the heuristic signal boundary classifier is defined in Algorithm 1 below. The graph in FIG. 4 shows the difference between successive conditional bit flip probabilities $P(F_{i+2}|F_{i+1}) - P(F_{i+1}|F_i)$ on the Y axis and the conditional bit-flip probability $P(F_{i+1}|F_i)$ on the X axis.

---

Algorithm 1: Heuristic Signal Boundary Classifier

Inputs: $P(f_{i+1} | F_i)$, $P(F_{i+2} | F_{i+1})$, $\alpha_1$, $a_2$
if $P(F_{i+1}) | F_i) < \alpha_1$ or $P(F_{i+2} | F_{i+1}) - P(F_{i+1} | F_i) > a_2$
  then
  | return TRUE
else
  | return FALSE

---

In the current embodiment, the heuristic parameters $\alpha_1$, $\alpha_2$ are set to split the feature space. In particular, in the current embodiment depicted in FIG. 4, the heuristic parameters are set as $\alpha_1 = 0.01$, $\alpha_2 = 0.5$ and yield a 90% F-Score and Precision and 89% Recall (also scoring only nonobvious boundaries). These heuristic parameters can be used generally for CAN-D signal boundary classification, but the parameters can also be adjusted depending on the dataset. This heuristic does not require any training and can achieve similar accuracy to some supervised machine learning algorithms. The heuristic is simple, intuitive, and computationally efficient.

Step 2: Endianness Optimization

Armed with the probabilities of bit gaps (i.e., the signal boundaries or cuts between adjacent bits of CAN messages or signals in the CAN data payload), an endianness optimization problem emerges. That is, the optimization problem is how to simultaneously determine the most likely packing of signals into the 64-bit data-field and most likely endiannesses of each of the eight bytes.

1) Valid Tokenizations

Denote a candidate signal I, as the list of bit indices ordered from MSB to LSB. Given a signal I, let LSB(I) (or simply LSB if no ambiguity is present) denote the least significant bit. Constant bits can be considered as 1-bit signals. Each CAN ID has eight bytes indexed j=0, . . . , 7 with byte j comprised of bits 8j, . . . , 8(j+1)−1. Let E(j)∈ {B, L} denote that byte j is big endian, little endian, respectively.

Definition 1 (Valid Tokenizations). For a given ID trace, define a valid tokenization, T, as a tuple of candidate signals $\{I_k\}_k$ and $\{E(j)\}_{j=0}^{7}$ such that:

(1) $\cup I_k = [0, \ldots, 63]$ (all 64 bits are used), (2) $I_k \cap I_l = \emptyset$ for all k≠l (signals do not overlap), (3) CAN only allows one type of endianness per byte, and is implicit in the notation E(j).

FIG. 5 illustrates a signal plot layout 506 depicting a valid, ground truth, tokenization of a CAN data field for one AID. Similar to FIG. 3A, each bit is depicted as a square with a solid border while different types of outlines are utilized to group bits for each signal. Constant bits 508 (bits 8-13, 27-28, and 56-63 are shown without an outline. The 10-bit little endian signal 510 starting at bit 0, is denoted I=(14, 15, 0, . . . , 7). Since, $B_{15} \rightarrow B_0$, necessarily the endianness of the two bytes involved are little endian (E(0)=E(1)=L).

This example shows that if a signal I crosses a byte boundary, the endianness of both bytes is determined by the order of the indices according Eq. 1 (i.e., either little endian or big endian). Accounting for this plays a role in the CAN-D configuration providing a computational tractable solution to the endianness optimization problem.

Definition 2 (Byte Boundaries). For j=0, . . . , 7 let $v(j) \in \{J_B, J_L, C\}$ denote if byte boundary j is:

a cut (C): bit 8(j+1)−1 ends a signal or is constant, a big endian join ($J_B$): 8(j+1)−1→8(j+1), or a little endian join ($J_L$): 8(j+1)−1→8(j−1) and V:={v∈ {$J_B$, $J_L$, C}$^8$ is a valid byte boundary set}.

For bits not on a byte boundary, $i \notin S:=\{8j-1\}_{j=0}^{7}$, there are only two options: cut or join ($B_1 \rightarrow B_{i+1}$), and both are valid possibilities regardless of endianness.

Accordingly, a valid tokenization T has v satisfying:

| | |
|---|---|
| 1) | v (j) = $J_B$ ⇒ E (j) = E (j + 1) = B |
| 2) | v (j) = $J_L$ ⇒ E (j − 1) = E (j) = L |
| 3) | v (0) ≠ $J_L$ |
| 4) | v (7) ≠ $J_B$ |
| 5) | v (j) = $J_B$ ⇒ v (j + 1) ≠ $J_L$, v (j + 2) ≠ $J_L$ |

(1) and (2) follow directly from the endianness definition (See Eq. 1) and the valid assumption of only one endianness per byte.

For (3) v(0)≠$J_L$ else 0→−8∉ [0, 63]. Similarly, for (4).

For (5), if v(j)=$J_B$ and either v(j+1)=$J_L$ or v(j+2)=$J_L$ then (1) and (2) imply E (j+1) is both big and little endian, a violation of one endianness per byte.

This can be summarized by $\{J_B, C\} \times \{J_B, J_L, C\} \times \{J_L, C\}$ with no consecutive subsequences of the form ($J_B$, $J_L$) or ($J_B$, *, $J_L$)}

Definition 3 ($\mathcal{T}$ & $\mathcal{T}_v$)

Let $\mathcal{T}$ denote the set of valid tokenizations. For v∈ V let $\mathcal{T}_v \subset \mathcal{T}$ be the tokenizations with byte boundaries defined by v.

There are $|\mathcal{T}|=|V| \times |\mathcal{T}_v|=577 \times 2^{64-8} \approx 4.16E19$ valid tokenizations.

This is evidenced by the following: $|\{J_B, C\} \times \{J_B, J_L, C\}^6 \times \{J_L, C\}|=2^2 \times 3^6$ and removing subsequences of the form ($J_B$, $J_L$) or ($J_B$, *, $J_L$) leaves 577 possibilities. $|\mathcal{T}_v|=2^{64-8}$, as the remaining 64-8 bit gaps have two valid options, cut or join.

2) Optimization Formulation

Step 1 provisions $f(i|E(j_i))$=P (cut to the right of bit i for endianness E($j_i$)), with $j_i$=[i/8] the corresponding byte index for bit i. By setting f (i,e)=∞ if bit i is to the left of a mandatory cut, e.g., the next bit is a constant bit. For the following, consider f (i|E($j_i$)) as a penalty for not cutting, and β as a fixed cut penalty parameter.

CAN-D endianness optimization implements a cost function. The idea for the cost function is to let signals accrue a join penalty, the sum of the probabilities f (i|E($j_i$)) for each bit that is not cut in order to form the signal. Since the candidate signal entails a cut to the right of its LSB, the term f (LSB, E($j_i$)) can be swapped for the cut penalty β. Thus, the cut penalty β controls how liberal the CAN-D system and method is configured to be with cuts.

CAN-D is configured to strike a balance between partitioning the CAN message into too many signals and joining multiple disparate signals. That is, a balance can be struck by balancing the cut penalty β with the likelihood of a cut (join penalty f). Setting β=1 will lead to only cutting where f(i|•)=∞ (signals demarcated by constant bits), and β=0 will lead to a cut at every gap, resulting in 64 1-bit signals.

Definition 4 (Costs)

The CAN-D Endianness Signal Cost can be defined as $$\phi(I, E) := \underbrace{\sum_{i \notin I \{LSB\}} f(i \mid E(j_i))}_{\text{join penalty}} + \underbrace{\beta}_{\text{cut penalty}}$$

In view of the above, the Signal Cost can be extended or reframed as a Tokenization Cost:

$$\Phi(T) := \sum_{I \in T} \phi(I, E)$$

$$= \sum_{\substack{X_T(i)=0 \\ 63}} f(i \mid E(j_i)) + \sum_{X_T(i)=1} \beta$$

$$= \sum_{i=0} (1 - X_T(i)) f(i \mid E(j_i)) + X_T(i)\beta$$

with $X_T(i)$=1 if i is an LSB of a token in T, else 0.

The above definition sets the endianness optimization problem, identify the optimal tokenization $T_0$.

$$T_0 := \arg\min_{t \in \mathcal{T}} \Phi(T). \quad (2)$$

A concrete example of using the cost function will now be described in detail. The two 8 by 8 bit arrays illustrated in FIG. 5 depict the big endian probabilities f (•|E=B) 502 and the little endian probabilities f (•|E=L) 504 respectively. These two visualizations represent potential input passed from a signal boundary classifier to an endianness optimizer in accordance with one embodiment of the present disclosure. That is, the input the endianness optimizer can be two 8×8 bit arrays with each bit representing the probability of a bit gap between a bit and its adjacent bit. The convention used in this example is that the bit value represents the probability of a bit gap between that bit and its neighbor to the right. As an example, the neighbor to the right convention means that the neighbor to the right of the LSB of the second byte (i.e., bit 15) is the MSB of the first byte (i.e., bit 0). A different convention, such as the neighbor to the left could be used instead. Two overlapping 11-bit candidate signals that both contain byte 4 (i.e., bits 32 to 39 numbered on the layout plot 506) can be evaluated by the CAN-D endianness optimizer:

a big endian signal $I_0$=[29, . . . , 31, 32, . . . , 39]

a little endian signal $I_1$=[32, . . . , 39, 24, . . . , 26].

The penalties for these candidate signals are $\phi_{\beta,f}$ ($I_0$, B)=1.73−0.76+β=0.97+β, and $\phi_{\beta,f}$ ($I_1$, L)=0+β=β, respectively. Since 0.97+β>β, then ($I_1$, L) has a lower penalty, which means that the cost function predicts that the 11-bit candidate signal that contains byte 4 is little endian. In this case, this is true regardless of the choice of β. In fact, ($I_1$, L) turns out to be in the globally optimal $T_0$, which is shown in the layout plot 506 of FIG. 5 as CAN signal 512.

3) Finding an Optimum: Given a cut penalty B∈ [0, 1] and pre-computed cut probabilities f (i|E($j_i$)) for all i∈ {0, . . . , 63} and both endiannesses E ($j_i$) (see Step 1)—an optimal tokenization can be selected from the 4.2E19 valid options.

Fixing v∈ V, where v gives cuts/joins at byte boundaries (bits in S={8(j+1)−1}$_{j=0}^7$), the subproblem:

$$\arg\min_{T\in\mathcal{T}} \Phi_{\beta,f}(T)$$

is realized by $T_{0,v}$, the tokenization: for all i∈ [0, 63]\S, bit i is an LSB (cut to the right of bit i) if and only if β<(f (i|E($J_i$)).

This is evidenced where $T_{0,v}$ is as above and T∈ $\mathcal{T}_v$. By definition, for i∉ S, T will accrue cost $\min_i$ (f (i|E($j_i$)), β. Since T, $T_{0,v}$∈ $\mathcal{T}_v$ both accrue the same cost for bits i∈ S. It follows that $\Phi(T)-\Phi(T_{0,v})=\Sigma_{i\notin S}$ [(1−$X_T$(i)) f (i|E($j_i$))+$X_T$(i)) β−min (f (i|E($j_i$)), β)]≥0.

This exemplary embodiment provides an efficient, constant-time search algorithm (689 operations), namely, (1) storing in memory the optimal cut/join choice for each bit i∈ [0, 63]\S under each endianness (56×2 operations), then (2) applying above to realize both $T_{0,v}$, and cost $\Phi(T_{0,v})$ for each of 577 v∈ V and maintaining the minimum. In the case that there are multiple optimal tokenizations, ties can be broken in essentially any suitable way or ways. For example, in the current embodiment, the CAN-D endianness classification is configured to break ties by choosing the tokenization with the maximum number of cuts, followed by the minimum number of little endian signals, which provides a unique solution according to one set of criteria. It should be understood that optimal classification may be different under a different set of criteria and that the present disclosure is not limited to the particular criteria utilized to arrive at an optimal tokenization as described above.

Tuning parameter β, can be tuned to essentially any value to provide different CAN-D tokenizations. In practice, setting the tuning parameter between 0.5-0.7 yielded fairly consistent and correct tokenizations, though the tuning parameter need not be limited to those values. In some embodiments, a tuning parameter of 0.6 is preferred. It is worth noting that if the heuristic classifiers of Step 1 are used, they provide probabilities in {0,1} meaning all choices of β yield identical results. Further, with binary inputs, a tiebreaker scheme is often necessary, whereas with high precision probability inputs, multiple optimal tokenizations with the same cost are virtually impossible.

The outputs of the endianness optimizer described in this step are tokenized signals, which can be referred to as signals or tokens. CAN-D systems and methods generally include this or a variant of the endianness optimizer described herein.

C. Step 3: Signedness Classification

The CAN-D signedness classifier takes a tokenized signal (e.g., a signal defined by start bit, length, and endianness) and makes a binary decision about signedness (e.g., whether each signal of length greater than two is signed (using two's complement encoding) or unsigned).

The classifier can be implemented as a heuristic or machine learning algorithm. For example, supervised machine learning algorithm or a heuristic can be utilized to determine signedness. Since each signal is tokenized, and thus the LSBs and MSBs are defined, features can be developed per signal rather than per bit.

In one embodiment, CAN-D implements a heuristic based on the distribution of the two most significant bits of the signal. One example of such a heuristic is presented as Algorithm 2 below. This heuristic can obtain almost perfect classification (97:3% F-Score). In alternative embodiments, a classifier based on a learned model or another algorithm can be implemented in the CAN-D pipeline instead.

The CAN-D signedness heuristic is based on how the two most significant bits behave if the signal is signed or unsigned. The MSB and next-most significant bit of a signal I can be represented by $B_{i_0}$, $B_{i_1}$.

First, consider the probabilities of the center values, $P[(B_{i_0}, B_{i_1})=(1,0)]$, $P[(B_{i_0}, B_{i_1})=(0,1)]$. If a signal is signed, for values close to zero ($B_{i_0}$, $B_{i_1}$) will be (0, 0) (small positives) or (1, 1) (small negatives), whereas values near extremes will be (1, 0) (near min) or (0, 1) (near max). A signal with a small probability of these values is therefore likely signed. Second, consider the probability of a jump between extreme values, $P[(B_{i_0}(t_j)B_{i_1}(t_j))=(0,0)\wedge(B_{i_0}(t_{j+1}), B_{i_1}(t_{j+1}))=(1, 1)]$. If a signal is signed, when changing from small positive to small negative values, the two MSBs must flip from (0, 0) to (1, 1). However, if it is unsigned, this is unlikely to ever happen since this would entail flipping from a very small value to a large one resulting in a significant discontinuity. If this probability is 0, the signal is likely unsigned. These two logical conclusions form the basis for the CAN-D heuristic signedness classifier described in Algorithm 2. The heuristic parameter gamma γ can be set based on observations of data. For example, in the current embodiment of the CAN-D system and method, the CAN-D heuristic signedness classifier has the tuning parameter gamma γ set to 0.2.

Algorithm 2: Heuristic Signedness Classifier

Inputs: $\{B_{i_0}(t), B_{i_1}(t)\}_{t, \gamma}$
if $P[(B_{i_0}, B_{i_1}) = (1,0)] + P[(B_{i_0}, B_{i_1}) = (0, 1)] = 0$ then
| return TRUE
if $P[(B_{i_0}(t_j), B_{i_1}(t_j)) = (0, 0)\wedge$
$(B_{i_0}(t_{j+1}), B_{i_1}(t_{j+1})) = (1,1)] = 0$ then
| return FALSE
if $P[(B_{i_0}, B_{i_1}) = (1, 0)] + P[(B_{i_0}, B_{i_1}) = (0, 1)] < \gamma$ then
  return True
return False Accordingly, the CAN-D heuristic signedness classifier of Algorithm 2 evaluates whether a signal is signed or unsigned, returning true if the heuristic signedness classifier predicts the signal is signed and returning false if not.

After step 3, signedness classification, each CAN ID's 64-bit message is partitioned into signals. For each signal, the CAN-D system and method can predict the start bits, lengths, endianness, and signedness for each signal in the 64 bit message. Consequently, each signal can be translated into a timeseries of integers, denoted s(t).

D. Step 4: Physical Interpretation

The CAN-D physical interpretation 108 includes a signal-to-timeseries matcher 130. A number of different matchers are known. In the current embodiment of the CAN-D system and method, a portion of the methodology from the Verma Automotive CAN Tokenization & Translation (ACTT) (which was previously incorporated by reference in its entirety) is implemented in CAN-D. In particular, CAN-D adapts and integrates Verma ACTT's methodology for matching a subset of the translated signals with diagnostic data. This augments matched signals with information, allowing for them to be interpreted as actual vehicle measurements.

In general, the physical interpretation algorithm (a sub-process of CAN-D) operates by comparing each signal timeseries, s(t) to each DID trace D(t') and making a determination as to whether they are linearly related. Because DID traces are generally sampled at a lower rate than normal CAN traffic, interpolation is utilized to estimate the signal values over the diagnostic timepoints, obtaining s(t'). The algorithm includes a regression function that regresses D(t') onto s(t') and finds the best linear fit, furnishing the coefficients a, b so that $\bar{s}(t):=as(t')+b \approx D(t')$. To score the model's fit, the matcher 130 uses a coefficient of determination, $R^2$. The coefficient of determination measures the fraction of total variation in timeseries D(t') that is explained by $\bar{s}(t')$; thus, $R^2=1$ exhibits a perfect fit, while $R^2=0$ exhibits the fit of a horizontal line (assuming D(t') is not the horizontal line). For each signal s, the matcher function 130 is configured to find the diagnostic D that matches with the highest $R^2$ value. A tuning parameter delta δ allows the physical interpretation signal-to-timeseries matcher to be tuned. If $R^2 > \delta$ where $\delta \in [0, 1]$ is a tuning threshold, s is matched to D. Setting δ=1 will return only perfectly correlated signals, while setting δ to be small will allow for signals with a lower score to be matched. In the current embodiment and implementation of CAN-D, the tuning parameter delta δ is set to 0.5.

Signals that match a diagnostic according to the matcher 130 can be properly interpreted. That is, by matching the translated signals with the external labeled timeseries, the translated signals can be identified/labeled appropriately and have proper units associated with the value of the translated signal accounting for any scaling and offset with a scale parameter α and offset parameter b.

Other signal-to-time-series matchers, e.g., such as Libre-CAN, could be used interchangeably (or combined) with the CAN-D matcher component. See Pesè, M. D. et al. (2019) LibreCAN: Automated CAN Message Translator. In SIGSAC CCS ACM, which is hereby incorporated by reference in its entirety.

Further, translated signals that are not augmented with labels by the physical interpretation step may still be valuable, as there are many applications in which unlabeled translated timeseries are as or more useful than binary data.

CAN-D Hardware

CAN-D may be implemented utilizing a variety of different computing systems. These computing systems are now increasingly taking a wide variety of forms. Computing systems may, for example, be mobile phones, laptop computers, tablet computers, embedded systems, and the like. A "computing system" is intended to include any device, system, or combination thereof that includes at least one processor, and a physical and tangible computer-readable memory capable of having thereon computer-executable instructions that are executable by the processor. A computing system may be distributed over a network environment and may include multiple constituent computing systems.

A computing system typically includes at least one processing unit and memory. The memory may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

The various algorithms and processes of a computing system can include executable modules or executable components that can refer to software objects, routines, methods, or similar computer-executable instructions that may be executed on the computing system. For example, CAN-D can be implemented on a computing system with separate executable modules or executable components that makeup the different modular components of the CAN-D pipeline. Alternatively, the entire CAN-D pipeline may be implemented as a single executable component or module, or in some other number of components or modules. The different components, modules, engines, and services described herein may be implemented as objects or processes that execute on the computing system (e.g., as separate threads).

As described herein, a computing system may also contain communication channels that allow the computing system to communicate with other message processors over a wired or wireless network. Such communication channels may include hardware-based receivers, transmitters or transceivers, which are configured to receive data, transmit data or perform both. For example, the CAN-D application can communicate over the OBD-II port of a vehicle.

Embodiments described herein also include physical computer-readable media for carrying or storing computer-executable instructions and/or data structures. Such computer-readable media can be any available physical media that can be accessed by a general-purpose or special-purpose computing system.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the embodiments described herein. The data structures may include primitive types (e.g., character, double, floating-point), composite types (e.g., array, record, union, etc.), abstract data types (e.g., container, list, set, stack, tree, etc.), hashes, graphs or other any other types of data structures.

As used herein, computer-executable instructions comprise instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or source code.

Those skilled in the art will appreciate that the principles described herein may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The embodiments herein may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the embodiments herein may be practiced in a cloud computing environment. Cloud computing environments may be distributed, although not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Preprocessing

Figure 9:
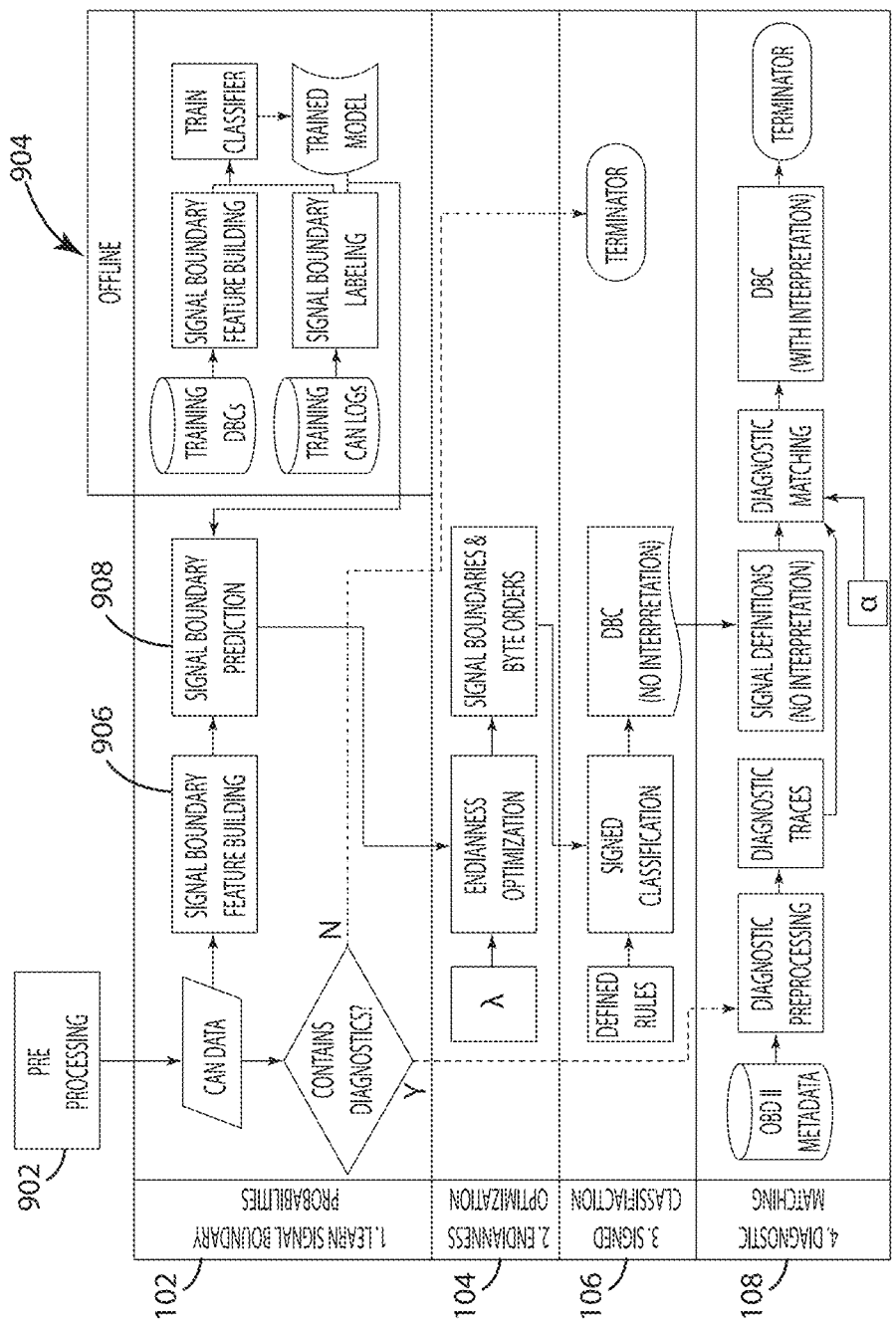
FIG. 9 illustrates an alternative embodiment of a CAN-Decoder Pipeline.

Some steps may be appropriate, such as preprocessing, prior to operating the CAN-D pipeline in some embodiments. For example, CAN log data may be collected prior to operation of the pipeline (while in other embodiments the pipeline can be operated in real time with collection of CAN data for reverse engineering the signal definition s). FIG. 9 illustrates an embodiment of the CAN-D pipeline that includes some preprocessing steps 902, 904. For example, received CAN data can be preprocessed 902 from a CAN log or a stream of real-time CAN data, a CAN data database, or some other source of CAN data and formatted into a suitable form for use in the CAN-D pipeline to decode CAN signal definitions. The CAN-D pipeline can also include some processing of the CAN data (e.g., signal boundary feature building 906) to prepare the data for the signal boundary prediction 908. As another example, if any supervised machine learning algorithms are being utilized in the CAN-D pipeline, they can be trained in a preprocessing training step 904. In the depicted embodiment of FIG. 9, a supervised machine learning algorithm is utilized for the signal boundary prediction. The training 904 includes obtaining training DBCs and training CAN data that can be utilized to build signal boundary features and signal boundary labels, which can be utilized to train the signal boundary machine learning algorithm (i.e., classifier) into a trained model that can be deployed in the CAN-D system. A similar approach can be utilized for any other machine learning modules, e.g., if the signedness classification is configured as a supervised machine learning algorithm.

Preprocessing steps may be performed offline or remote to the CAN-D operation. For example, processing 902 or training 904 can be done essentially any time prior to executing the CAN-D pipeline. The results of either preprocessing step can be saved in memory in the CAN-D apparatus for use during execution of the process.

Figure 10:
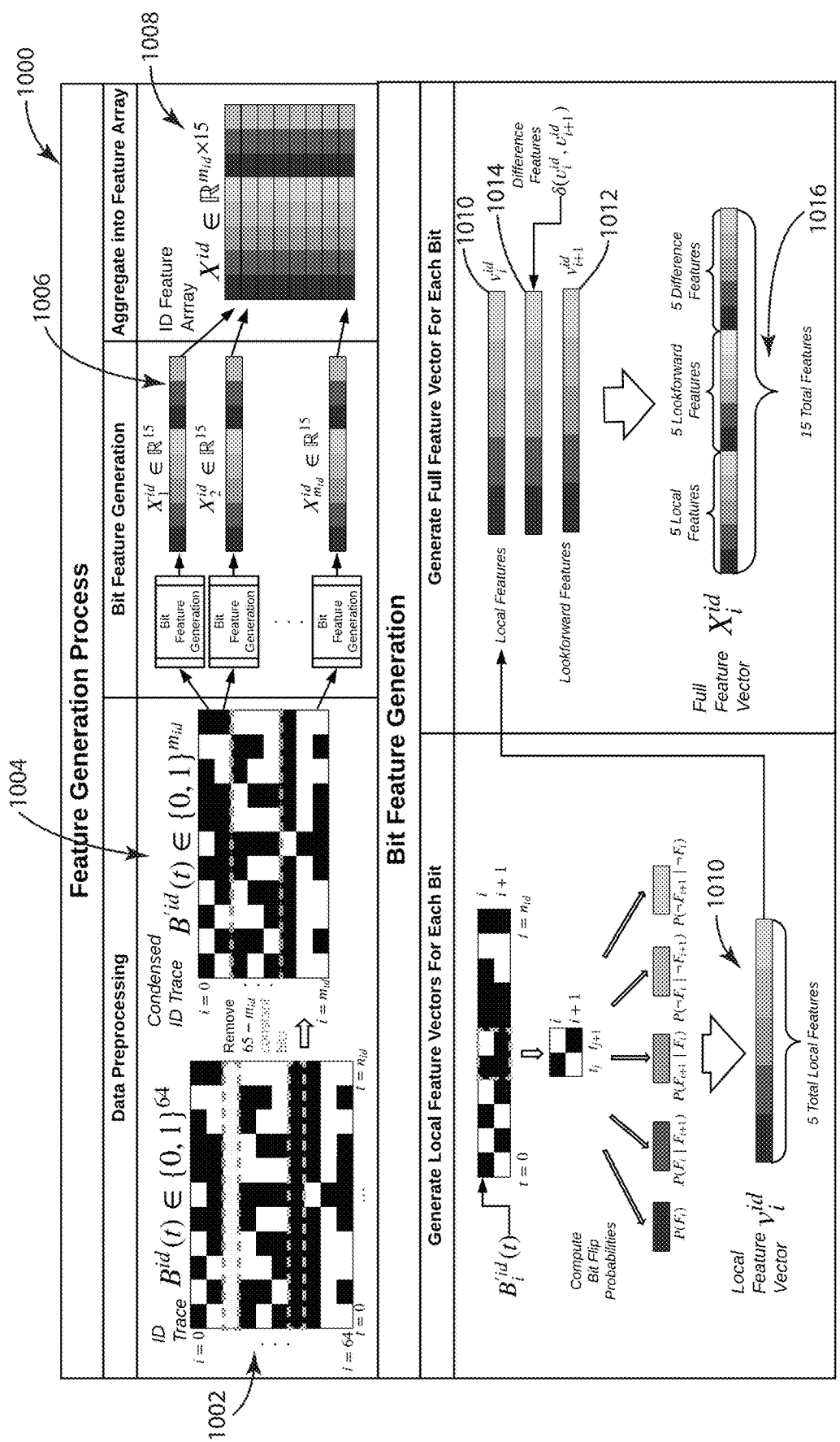
FIG. 10 illustrates a feature generation process.

FIG. 10 depicts an exemplary preprocessing feature generation and bit feature generation processes that can be utilized to train a signal boundary classifier. In particular, FIG. 10 illustrates an exemplary feature generation process 1000 for an AID trace 1002 and for each gap. To build features from an AID trace, the constant bits are removed resulting in a condensed AID trace 1004, which can be denoted $B^{id}(t) \in \{0, 1\} \, m_{id}$ where $m_{id}$ refers to the number of non-constant bits for a given arbitration ID. For each remaining $m_{id}$. A set of features 1006 can be generated from the condensed AID trace 1004 and aggregated into an ID feature array 1008.

Local features vectors for each bit can also be generated. A set of 5 exemplary local features 1010 are denoted $v_i^{id}$. The local feature generation of the current embodiment includes generation of fie bit flip probabilities. The LSBs generally flip much more often than an adjacent signal's MSB; hence, the bit flip features provide good indicators for boundaries. In alternative embodiments, different local features can be generated.

Forward and/or backward neighboring bits can be analyzed and the same feature computed for bits i+1 or i−1. For example, five look forward features 1012 can be computed for i+1. In addition, difference features 1014 can also be evaluated. The local 1010, look forward 1012, and difference 1014 features can be combined into a full feature vector 1016.

Dataset

CAN-D aims to provide vehicle-agnostic CAN data signal extraction capability. CAN-D can be trained and evaluated based on data collected from a variety of different vehicle makes and years ranging from 2010 to 2017. Table IV lists details of defined signals for CAN logs from an exemplary training dataset.

TABLE IV

| Log | IDs[1] | Def. IDs | Unsigned, B.E. | Signed | L.E. | Total |
|---|---|---|---|---|---|---|
| #1[2] | 54 | 17 | 61 | 3 | 25 | 89 |
| #2 | 66 | 14 | 143 | 21 | 0 | 164 |
| #3 | 35 | 7 | 50 | 18 | 0 | 68 |
| #4 | 79 | 28 | 181 | 0 | 0 | 181 |
| #5 | 63 | 21 | 111 | 5 | 0 | 116 |
| #6 | 22 | 19 | 72 | 2 | 14 | 87 |
| #7 | 26 | 8 | 53 | 3 | 0 | 56 |
| #8 | 40 | 8 | 98 | 10 | 1 | 108 |
| #9 | 27 | 17 | 56 | 7 | 18 | 75 |
| #10 | 55 | 14 | 136 | 21 | 0 | 157 |

[1]Non-constant IDs: IDs with more than one non-constant bit
[2]Vehicle adheres to J1939 Standard protocol [35], and signal definitions are derived from this open standard.

A training dataset, such as that described in Table IV can be utilized to test generalizability of the methods.

In short, the training dataset includes statistics on ten CAN logs, each collected from a vehicle of a different make. This training dataset does not include any duplicate makes because different models of the same make (e.g., Toyota Camry and Corolla) typically have similar characteristics. However, alternative training datasets need not be constructed in this fashion. For each log, the CAN-D training system enumerates non-constant IDs (IDs), non-constant IDs defined by CommaAI (Def. IDs), and each of the encodings of defined signals (big/little endian, signed/unsigned) resulting from a ground-truth labeling process. In this exemplary training set, three logs contain a high percentage of little endian signals, and all but one contain signed signals.

Training dataset(s) for training CAN-D to configure the CAN signal reverse engineering process (accounting for bit position, endianness, and signedness), can be obtained from DBC files or other sources. Some CAN logs can be obtained from vehicles that use the J1939 standard, a protocol for heavy trucks that provides signal definitions that are publicly available. Accordingly, datasets obtained in this way provide absolute ground-truth labels for the signals in these logs. Further, J1939 logs contain every type of signal (little endian, big endian, signed, unsigned), and thus provide a comprehensive set for the CAN-D system to be confidently trained and evaluated on.

Additional logs can be generated or obtained in other ways. For example, logs can be obtained utilizing CommaAI's OpenDBC project. See Comma AI: Open DBC available at https://github.com/commaai/opendbc. This is an open, crowdsourced set of DBCs constructed by individuals using a CommaAI Panda device (an OBD-II plugin) along with the CommaAI Cabana interface to hand label data for their vehicle through trial, error, and visual inspection. OpenDBC only includes DBCs for a limited number of vehicles and only a subset of IDs/signals for vehicle are defined. In particular, unobservable signals are often missing since they cannot be determined by visual inspection.

The exemplary training dataset of Table IV includes CAN data collected data from vehicles that had a closely matching CommaAI DBC (i.e., same manufacturer, similar model/year/trim). Due to the crowd-sourced nature of the data, the data may contain mislabeled signals.

The CAN-D training process can include a quality control process. For example, the quality control process can include partitioning each non-constant ID trace into sequences of contiguous, non-constant bits and labeling each as an unsigned, big endian signal. This provides a set of baseline signal definitions. Next, the training process can include parsing the data according to the DBC, trimming off any signal MSBs that are constant, likely due to extreme values not being reached and redefine the signal to have the trimmed start bit and length. For IDs defined by CommaAI, the baseline and trimmed CommaAI signal definitions can be compared. If the definitions for the ID agree (and optionally also pass a visual check), the CAN-D training system can automatically add them to the ground-truth DBC. If they disagree, they can be disregarded or further investigated. To give an example of visual inspection, the signal tokenization layout and signal timeseries' plots can be displayed side by side in a CAN-D training interface for the user to identify the discrepancies. FIGS. 6A-C illustrate a representation of such an exemplary CAN-D training interface with these types of visualizations. If easily resolvable by experimentation and visual inspection (e.g., adding an obvious signal definition missing from CommaAI DBC, identifying an unsigned signal mislabeled as signed, etc.), the correct signal definitions can be added to the CAN-D training DBC with the minor errors fixed. If the discrepancy cannot be resolved easily, CAN-D can ignore that ID or signal and not create a corresponding entry in the CAN-D ground-truth DBC used for training. For IDs that do not appear in the CommaAI DBC or other training dataset source, a similar process of visual inspection of the baseline plots can be conducted, adding any easily resolvable definitions to the CAN-D ground-truth, and discarding them if not.

This visual inspection method is quite effective due to the fact that legitimate signals and misclassified encodings (e.g., signed signals translated incorrectly as unsigned) are recognizable from the timeseries plots.

Evaluation

Using a CAN-D training dataset the overall CAN-D process and its individual modular components can be effectively evaluated. For example, the signal boundary classification methods can be quantitatively compared by comparing the number of correctly and incorrectly labeled bits. As another example, the full tokenization and translation efforts of CAN-D can be evaluated by computing the $l^1$ error between the translated signals and their corresponding ground-truth signals. This evaluation can be useful because it shows how effective CAN-D is at extracting timeseries that can be used as actual real-time measurements from systems in the vehicle.

FIGS. 6A-C provide three examples of messages decoded by CAN-D. These examples illustrate message layout plots with signed and unsigned signals, little endian unsigned signals and little endian (signed and unsigned) signals. CAN-D correctly tokenizes and translates the examples and overall furnishes interpretable timeseries. Where available, CAN-D's physical interpretation is provided in annotations above signals, showing $R^2$ value to gauge goodness-of-match. Overall, mis-tokenization and mistranslation by other methods result in rampant discontinuities and dramatic error in most timeseries, exhibiting the advantage of correctly identifying each signal's endianness and signedness.

OBD-II Plugin

Figure 7:
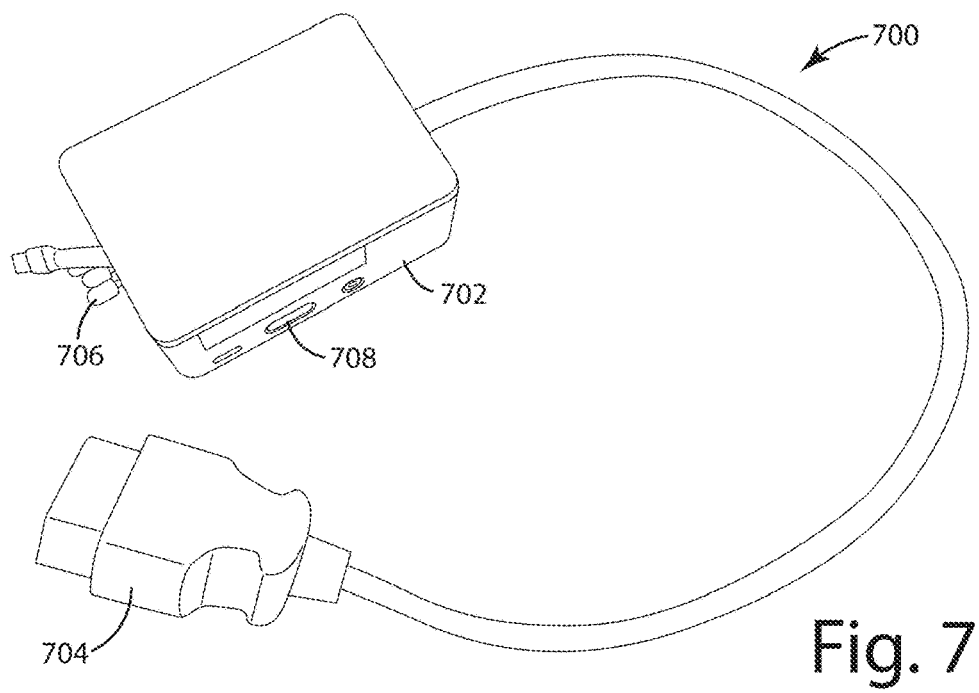
FIG. 7 illustrates one embodiment of a CAN-D apparatus configured to decode vehicle CAN data.

FIG. 7 illustrates a CAN-D device implemented utilizing a Raspberry Pi and CANBerry Dual 2.1 boards. The CAN-D device 700 includes a housing 702, processor, memory, power input and CAN interface 704. The CAN-D processor is configured to provide a vehicle agnostic, OBD-II (on-board_diagnostic) plugin that collects CAN data from the vehicle OBD-II port to which the CAN-D device is installed. Further, the current embodiment of the CAN-D device is configured to operate the CAN-D pipeline (depicted in FIG. 1) either on a single-board computer (depicted in FIG. 7) or on a standard computer.

The CAN-D device includes a Linux-based, single-board computer. Specifically, the CAN-D device includes a Raspberry Pi 3B+ with Raspbian Buster in conjunction with an Industrial Berry's CANBerry Dual 2.1. The Raspberry Pi 3B+ provides 1 GB of RAM and a 1.4 GHz ARMv8 processor. The device can be powered either from battery or using on-board power from a vehicle's 12-volt system.

One challenge of building a vehicle-agnostic CAN-D device is that the bitrate for the CAN is generally unknown and variable per vehicle, and improper bitrate selection can cause adverse functionality. In order to address this issue, the CAN-D device is configured to iterate through common bitrates, identifying the bitrate that results in only expected packets. This renders the CAN-D device compatible with most CANs regardless of bitrate. Another complication is that automobiles typically have multiple CAN buses, and often more than one is accessible from the OBD-II interface. The CAN-D device can analyze two or more unique networks by allocating a dedicated CAN controller for each using CANBerry Dual 2.1.

Once in communication with the vehicle CAN (e.g., via the OBD-II port or otherwise), the CAN-D device can automatically determine each network bitrate, identify the VIN (e.g., by using the unified diagnostic services (UDS) query-response protocol), and begin logging CAN data. The CAN-D device can include a physical or software switch that can be flipped to augment the network traffic with available diagnostic queries. The CAN traffic can be collected by the CAN-D device, for example using SocketCAN can-utils (See CAN Utils. https://github.com/linux-can/can-utils). The CAN traffic can be logged in local memory located on the CAN-D device or remote memory located on the Internet (e.g., using a wireless cellular Internet connection or other type of Internet connection). Further, the CAN traffic can be stored to an ASCII-encoded text CAN log file or other format. The file can be named or include identifying information such as timestamp and vehicle identification number (VIN), which can be automatically identified via a diagnostic query. The CAN-D device can include light emitting diodes (LEDs) 706 or other types of indicators that can be flashed or activated to indicate status and/or progress throughout CAN-D collection/training and/or the CAN-D normal operation of real-time tokenization and translation. The CAN-D device can run the CAN data captured or logged through the CAN-D pipeline, outputting a DBC file (or other signal definition file) which can be used for real-time decoding and/or visualization of signals, either on a GUI provided on the device or via communication to a vehicle display on the CAN or a remote device, such as a smartphone or computer via a display out port 708, such as an HDMI port.

The heuristic signal boundary classifier (Step 1) can be utilized to benchmark the device running the CAN-D pipeline. For example, one benchmark was run on collected CAN traffic augmented with diagnostic data from a passenger vehicle for 70 seconds, logging 170,000 frames. Running the CAN-D pipeline on this logged CAN traffic averaged about 129 seconds: 55 s for preprocessing, 14 s for tokenization & translation (Steps 1-3), 50 s for interpretation (Step 4), and 10 s for writing the output to the DBC, over about 6 runs with negligible variance. Alternative embodiments may have increased efficiency. Accordingly, the CAN-D pipeline can be implemented in a portable, lightweight, edge computing device.

CAN-D provides a vehicle-agnostic system and method for extracting the hidden signals in automotive CAN data. The current embodiment of CAN-D is a four-step, modular, pipeline that implements a combination of machine learning, optimization processes, and heuristics, to identify and correctly translate signals in CAN data to their numerical timeseries. In particular, CAN-D can extract big and little endian signals as well as signed and unsigned signals. While accounting for endianness and signedness increases complexity, CAN-D can decode a larger range of CAN signal definitions. When endianness and signedness are ignored, the resulting translations are incorrect and overly noisy. CAN-D achieves less error (in some embodiments up to less than 20% of the average error of other CAN decoding methods) and can handle any standard CAN signal.

CAN-D can be incorporated into a lightweight hardware implementation. It can be implemented in-situ via an OBD-II connection to learn a vehicle's CAN signals, and in future drives convert raw CAN data to multivariate timeseries in real time. CAN signals provide a rich source of real-time data that is currently unrealized, the decoding functionality of CAN-D will facilitate vehicle technology developments.

Figure 8:
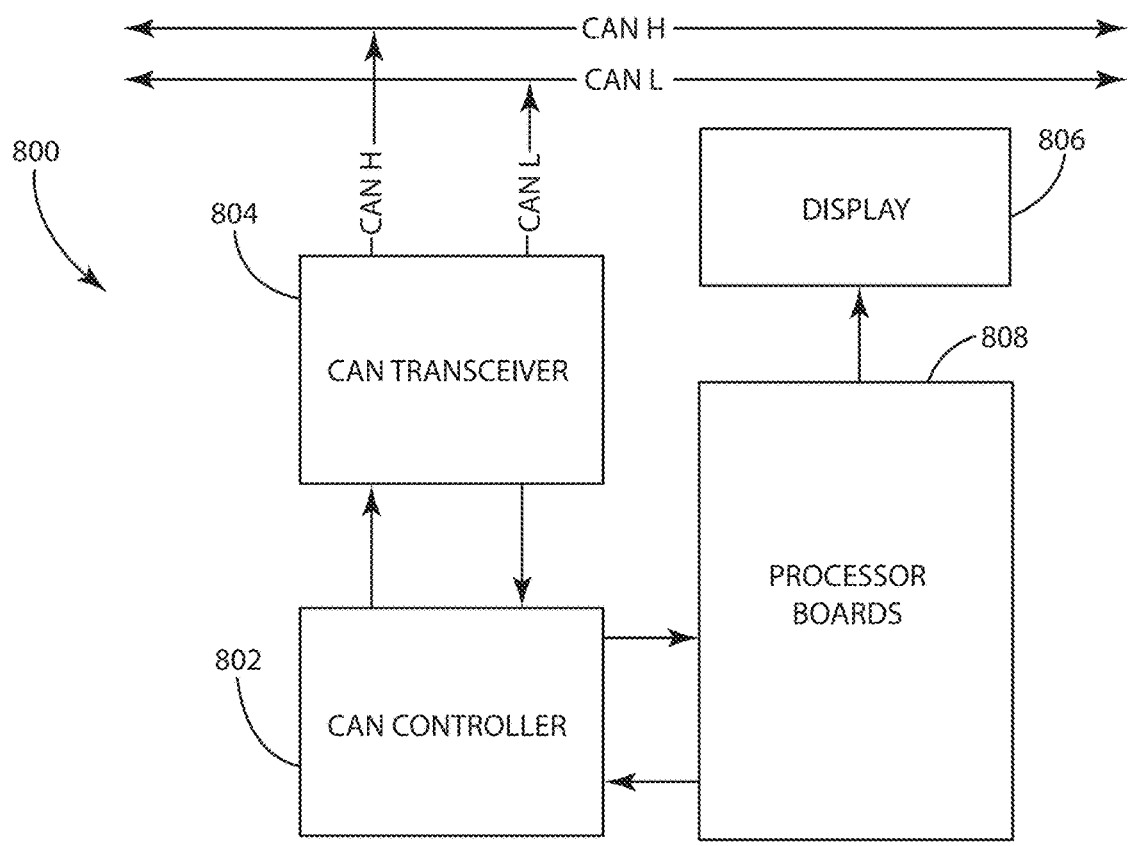
FIG. 8 illustrates one embodiment of a functional block diagram of the CAN-D apparatus of FIG. 7.

FIG. 8 illustrates a representative block diagram of an alternative embodiment of the CAN-D apparatus of FIG. 7. The CAN-D apparatus 800 of FIG. 8 includes a CAN Controller 802, CAN transceiver 804 for transmitting and receiving CAN signals, one or more processor board(s) 808, and a display 806. The CAN-D apparatus of FIG. 8 can be an all-in-one device like that of FIG. 7, or alternatively the CAN-D device can have functionality separated into multiple devices. For example, the display and a processor board may be housed in a separate graphing and visualization tool connected by way of an HDMI or other cable to a CAN extraction device that includes the CAN transceiver, CAN controller, and a processor board. The CAN-D apparatus 800 can communicate with multiple vehicle CANs, such as CAN H and CAN L.

Operation

Exemplary operation of the CAN data collection and signal definition reverse engineering mode of the CAN-D apparatus will now be described in detail. First, the CAN-D apparatus is plugged into the OBD port of the vehicle so that the vehicle can power the device. The device comes on and a flashing green light indicates it is determining the preconfigured CAN bit rate, i.e., the speed of communication for that CAN. After the CAN bit rate has been determined, the indicators flash red and green indicating request of a vehicle identification number. Once the VIN is received, the indicator turns solid green and begins collection of raw data from the CAN. At this time, the operator can continue to operate the vehicle, which will result in various different CAN frames being sent and therefore collected by the CAN-D apparatus.

The CAN-D apparatus includes a button, which when pressed changes the indicator to a flashing blue light, which indicates the CAN-D apparatus is now augmenting the ambient raw CAN data being collected with diagnostic queries from the on-board diagnostic service. In essence, the CAN-D apparatus is cataloging and determining the responses of these diagnostic queries that the vehicle will reply to. The queries can be sent on a fast loop such that the CAN-D apparatus receives a lot of sensor information such as wheel speed, coolant temperature, engine speed, etc. By augmenting the raw CAN data collected by the CAN-D apparatus with the diagnostic responses, it does not take long for the CAN-D apparatus to collect sufficient data for useful analytics. That is, a great volume of CAN data can be collected in just a few minutes—though much more can be collected and utilized in analytics.

The CAN-D apparatus or a device in communication with the CAN-D apparatus can be configured as a CAN signal extraction and graphing tool. While plugged into the OBD port of a vehicle the CAN-D apparatus can read the raw CAN messages that are being communicated throughout the vehicle between ECUs. For this example, the CAN-D apparatus has already run the CAN-D pipeline to generate a CAN database DBC file and to extract some signals from the vehicle.

The collected CAN data can be automatically or semi-automatically processed in order to reverse engineer CAN signal definitions as discussed above in detail, which, in turn, can then be utilized by the CAN-D apparatus to decode received CAN signals in real time. The decoded CAN data signals can be provided to the user via a user interface on the CAN-D apparatus or a user interface on a device that the CAN-D interface is in communication with. Alternatively, the CAN-D reverse engineered signal definitions can be provided to a separate device for real-time decoding of CAN signals. Further, alternatively or in addition CAN signals can be decoded in real time by the CAN-D apparatus and communicated to another device, such as a cloud server, smart phone, or laptop.

A graphing tool can be used in order to visualize and understand some of the CAN signals from the vehicle. The graphing tool can enumerate the available arbitration IDs within the vehicle that the CAN-D apparatus was able to tokenize and also provides the translation, if available, for the signals. Even where no physical interpretation is available, the graphing tool can still provide visualization of signals by graphing the un-interpreted timeseries. As an example, one AID may contain engine rpm and coolant among others in an electric hybrid car. Accordingly, no RPM signal may be associated with the combustion engine at certain times, such as while idling. However, by popping the hood latch in some electric hybrid cars the combustion engine is forced awake resulting in about 1600 RPMs, which can be seen graphically in real-time on the graphing tool interface. As another example, combustion engine coolant temperature can be dynamically read from raw data on the CAN without use of diagnostic queries or diagnostic values. Finally, unknown signals (i.e., signals without physical interpretation) can be graphed in an effort to help determine what they refer to.

Figure 11:
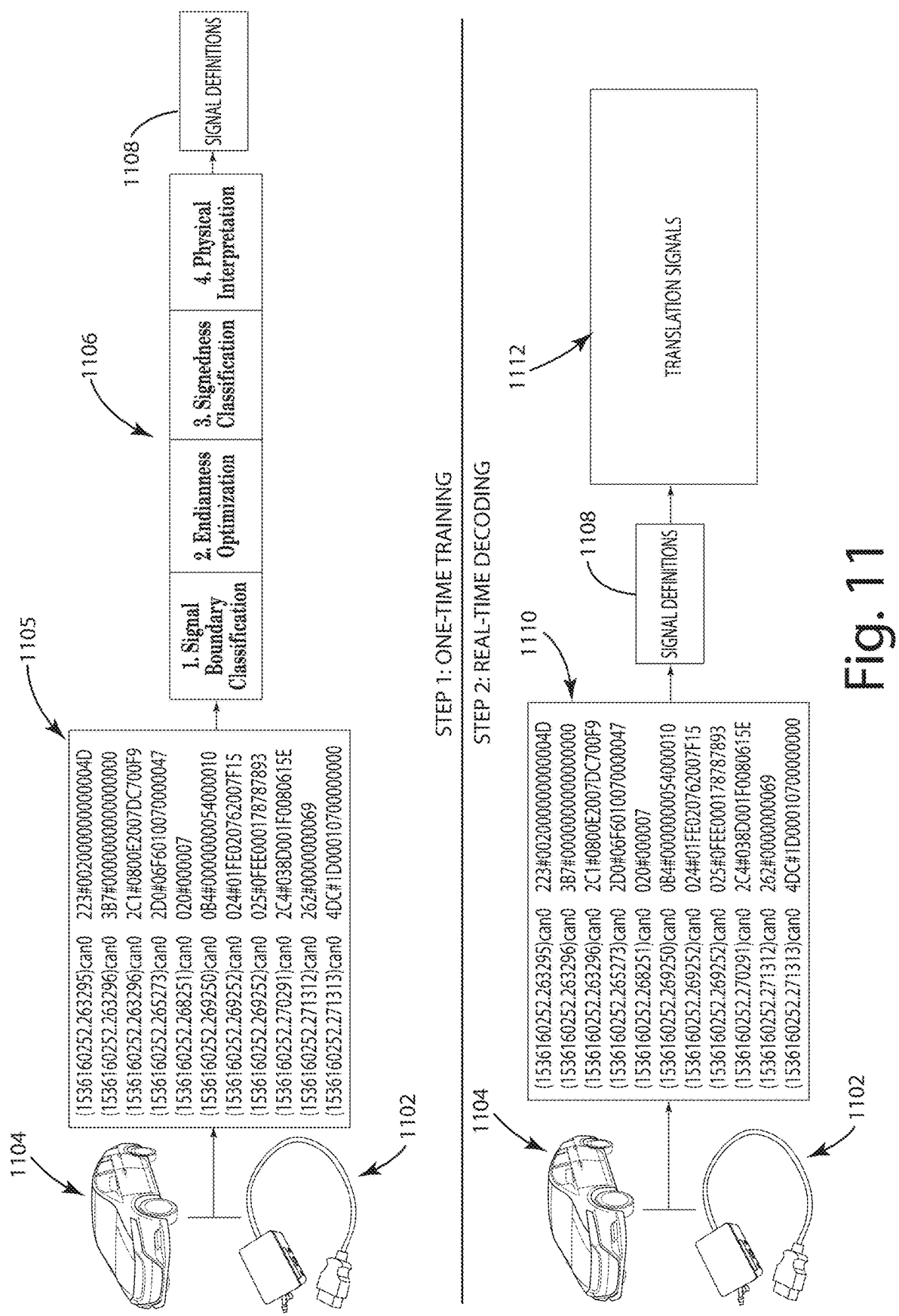
FIG. 11 illustrates a CAN-D system for automated reverse engineering of CAN data signal definitions and real-time decoding of CAN data according to those reverse engineered signal definitions.

The dichotomy between the two modes of operation (i.e., step 1: one time training; and step 2: real-time decoding) is perhaps best illustrated in the representative diagram of FIG. 11. FIG. 11 illustrates that the CAN-D apparatus 1102 is in communication with the vehicle CAN 1104 and receives CAN data 1105 during a one-time training session (though multiple training sessions or retraining can be done), which is fed into the CAN-D pipeline 1106 to reverse engineer signal definitions 1108. That is, essentially CAN log data can be utilized to train the CAN-D apparatus to decode CAN frames by arbitration ID. Once the signals are mapped for the desired arbitration IDs that the user wishes to decode, the CAN-D can be switched into real-time decoding mode where instead of the CAN data being fed into the CAN-D pipeline to reverse engineer the signal definition for that CAN ID, the stored signal definitions 1108 (e.g., stored in a DBC file) can be utilized to tokenize and translate fresh CAN data 1110 and provide the translated signals 1112 to the user or a "downstream" system, such as a CAN time-series-based intrusion detector. The mode switching may be done automatically by way of a logic check on collected CAN frames. That is, the arbitration ID of collected CAN data can be referenced against the DBC file and decoded if the AID is present. If it is not present, the CAN data frame can be analyzed by the CAN-D pipeline for signal definition reverse engineering.

CAN-D Intrusion Detection System

Figure 12:
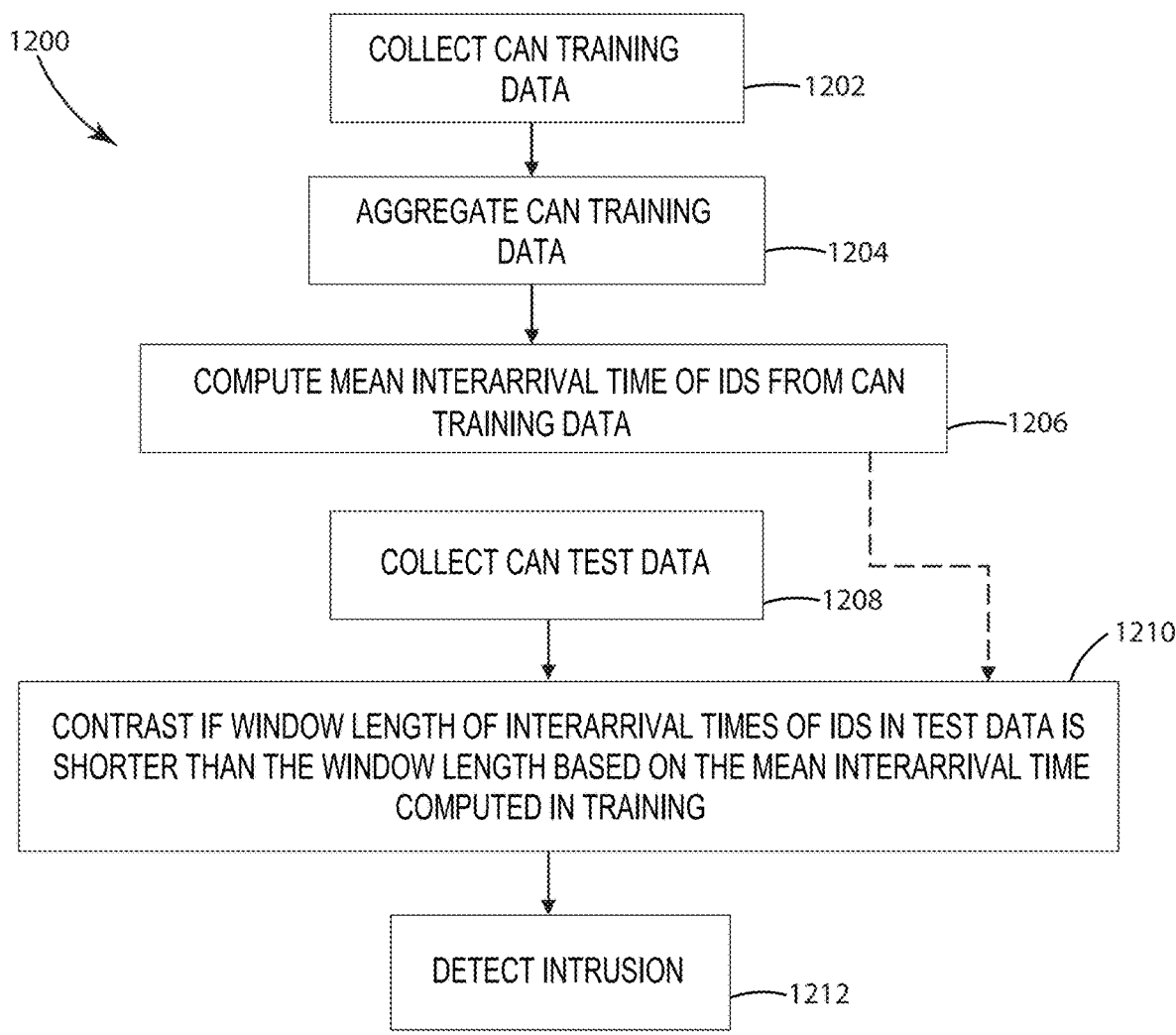
FIG. 12 illustrates a conventional CAN intrusion detection system based on interarrival time of IDs from CAN training data, i.e., CAN signal timing not decoded CAN signals.

A flowchart illustrating training and operating methods of a conventional CAN-based intrusion detection system 1200 is illustrated in FIG. 12. This system is described briefly to provide context for the intrusion detection systems of the present disclosure based upon decoded CAN signals (e.g., decoded using CAN-D, as described above). This conventional CAN-based intrusion detection system described below is one example of a conventional time-based detector. As mentioned early in the disclosure, there are other conventional IDSs that either use the untranslated payloads, or, e.g., cooperate with an original equipment manufacturer that knows and can share the CAN signal translations, sometimes referred to as a CAN mapping.

One conventional CAN intrusion detection system includes collection of CAN training data 1202, aggregation of that data 1204, and computing a mean inter-arrival time of IDs from CAN training data 1206. That is, the depicted CAN intrusion detection system of FIG. 12 does not decode or understand the messages contained in the payload of the CAN training data. In operation, a conventional time-based CAN intrusion detection system collects CAN test data 1208. Then, the system compares a window based on the mean inter-arrival time of IDs from the CAN data to the inter-arrival times of IDs in the test data 1210. If CAN test data has an inter-arrival time shorter than the window length based on the mean inter-arrival time computed in training, then the system flags an intrusion 1212. The conventional CAN intrusion detection system is essentially blind to the content of the signals on the controller area network (CAN). Because of this, a conventional time-based CAN intrusion detection system cannot detect sophisticated attacks such as masquerade attacks.

Figure 13:
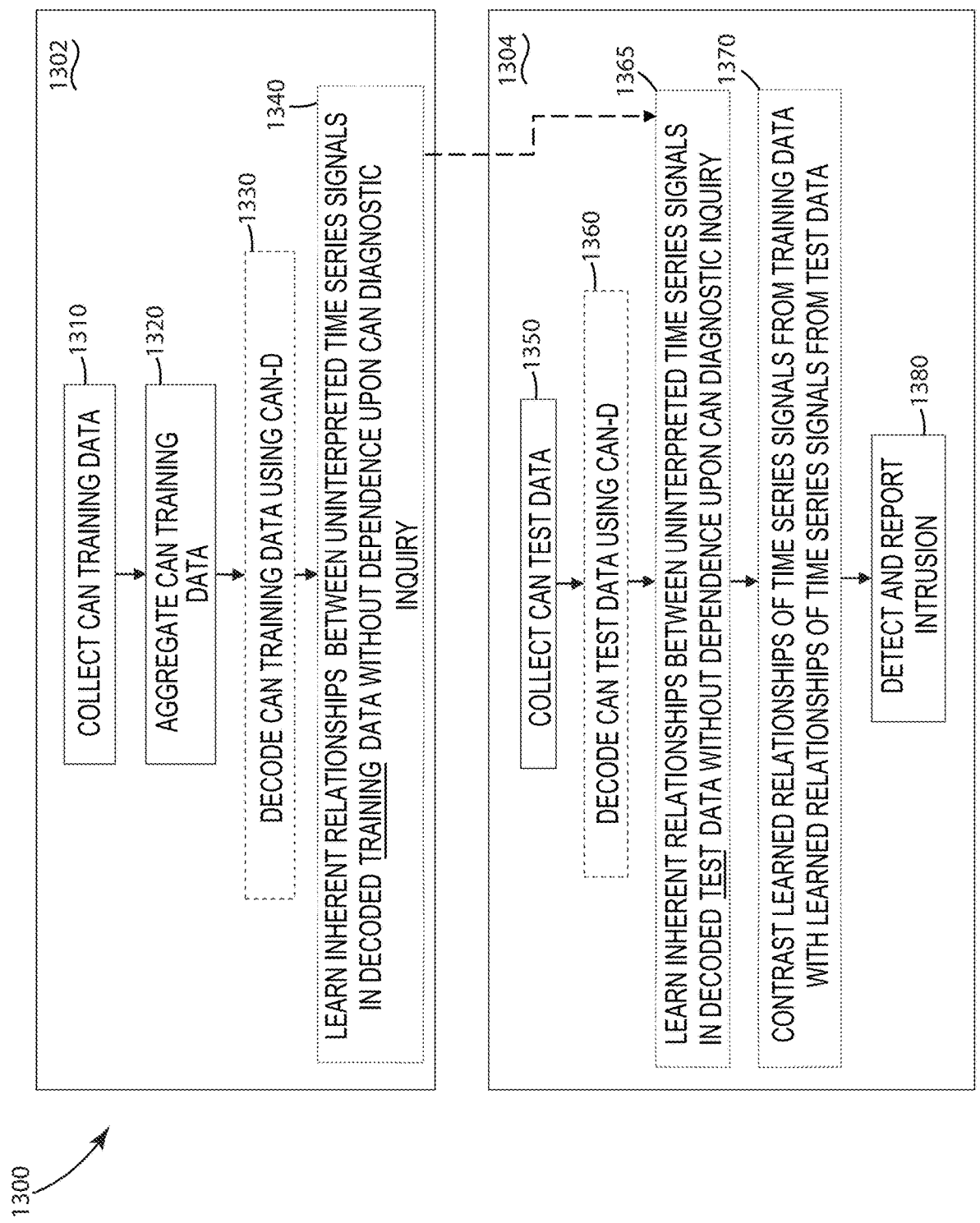
FIG. 13 illustrates a flowchart of a CAN-D intrusion detection method including training and testing in accordance with the present disclosure.

FIG. 13 illustrates a flowchart of training and operating methods of a decoded CAN intrusion detection system 1300 in accordance with the present disclosure. While CAN-D, as described above, can be utilized to decode the CAN signals, the CAN-D intrusion detection systems of the present disclosure are not limited to CAN-D decoding and can work in conjunction with essentially any CAN decoding methodology. Essentially, any decoding methodology that is not reliant on CAN diagnostic inquiries or a known CAN mapping can be utilized to decode the CAN training and test data to obtain respective timeseries signals from the CAN message payload. Throughout the disclosure, CAN-D intrusion detection system and decoded CAN intrusion detection system are used interchangeably to refer to an intrusion detection system that leverages decoded CAN messages achieved obtained without CAN diagnostics and without being provided the CAN signal mapping by a third party.

The exemplary CAN-D intrusion detection method in accordance with the present disclosure depicted in FIG. 13 includes two main sub-methods: CAN-D intrusion detection training 1302 and CAN-D intrusion detection operation 1304. CAN-D training 1302 can include collecting CAN training data 1310, aggregating that data 1320, and decoding the CAN training data 1330 using CAN-D, discussed above, or another decoding algorithm. As discussed in more detail below, the decoded CAN training data can be utilized to learn inherent relationships between the timeseries signals 1340, e.g. by clustering timeseries signals decoded from CAN training data and a training distribution of clustering similarities, which can be utilized during operation for the intrusion detection.

During operation, the CAN-D intrusion detection system can collect CAN test data 1350. CAN test data generally refers to CAN messages that are filtered through the intrusion detection system to predict whether or not they contain an attack. The CAN test data collection, analysis, and intrusion detection can be performed in near real-time (e.g., after a sufficient preset time window to ascertain whether a time series has substantially changed) or in data analysis post-drive/post-collection. The analysis can include decoding the CAN test data 1360 utilizing a CAN decoding methodology, such as CAN-D discussed above. The inherent relationships between uninterpreted timeseries signals in the CAN decoded test data can be analyzed and identified 1365, e.g., by clustering, as discussed in more detail below.

The intrusion detection 1304 can be carried out by contrasting the learned relationships of the timeseries signals from the training data with the learned relationships of the timeseries signals from the CAN test data 1370. For example, based on a comparison between the similarities between clustering in testing and training CAN data, the system can decide whether a particular CAN data signal is anomalous and report it as a detected intrusion 1380. Put simply, upon detecting one or more anomalies of the monitored timeseries, the CAN-D intrusion detection system can be configured to transmit corresponding anomaly-notifications, messages, and/or log information relating to the detected anomalies in local or remote memory.

In short, intrusion detection systems in accordance with the present disclosure can be trained to identify patterns in the relationships between decoded CAN training data and recognize significant departures from those relationship patterns in decoded CAN test data. Because the clustering of the training and test data is performed on decoded CAN timeseries signals from multiple CAN packets, the clustering algorithm can cluster based upon not only the timing or ordering of the timeseries, but can also cluster based upon the content of the timeseries signals, the relationships between the timeseries, or any combination thereof. A time-based conventional IDS that does not know how to decode a CAN payload would not be able to cluster based upon the content of the timeseries signals or the relationships between the timeseries.

In essence, intrusion detection in accordance with the present disclosure based on CAN-D (or another automated CAN decoding methodology) utilizes uninterpreted content of CAN messages to discover inherent relationships and leverages not only the sequential relationships or timings of the CAN messages, but the underlying content of the CAN messages, i.e., the CAN signals, and the relationships between these timeseries in order to identify patterns, e.g., dependencies between various different CAN signals, and ascertain whether or not a particular CAN message is an attack or benign. Accordingly, embodiments of the present disclosure provide a decoded CAN signal based intrusion detection system that enables detection of sophisticated attacks such as masquerade attacks.

Learning the inherent relationships between timeseries signals in decoded CAN training data will now be discussed in more detail. In essence, an artificial intelligence (e.g., clustering) algorithm can be utilized to learn the inherent relationships between uninterpreted timeseries signals in decoded CAN training data. For example, by clustering CAN training data signals and computing similarity between hierarchical clusterings of CAN training data signals, dependencies between the decoded CAN signals can be recognized and utilized as part of the larger intrusion detection algorithm. It is worth noting that these inherent relationships can be ascertained without running a CAN diagnostic inquiry.

FIG. 23 illustrates a representative system diagram of a CAN-D intrusion detection system pipeline 2300. As illustrated in this system diagram, a universally applicable signal-based detector is configured to operate in conjunction with technologies described and claimed in U.S. patent application Ser. No. 17/117,535, entitled Controller Area Network Decoder (CAN-D), to Verma et al, filed on Dec. 10, 2020, which is incorporated by reference in its entirety. The technologies described herein include an automotive CAN tokenization & translation (ACTT) component coupled with an intrusion detection system (IDS) component that together can perform the following on any CAN:

(1) The ACCT component 2302, also referred to as CAN decoder, reverse engineers the obfuscated signal definitions from raw CAN data. This involves an initial CAN data capture during a training stage. It can be performed once-per-CAN.

(2) Once the signal definitions are learned, the ACCT component can convert raw CAN data into their signals in near real time (2310, 2320, 2330, 2340). The system can continue to learn and improve throughout this process.

(3) The decoded signal values can be input from the ACCT component 2302 into the IDS 2304 component, which performs time-series anomaly detection 2350, as discussed in more detail below.

(4) The system can include a method of logging or alerting 2370 upon detected events 2360, for example if an attack is detected.

Figure 14:
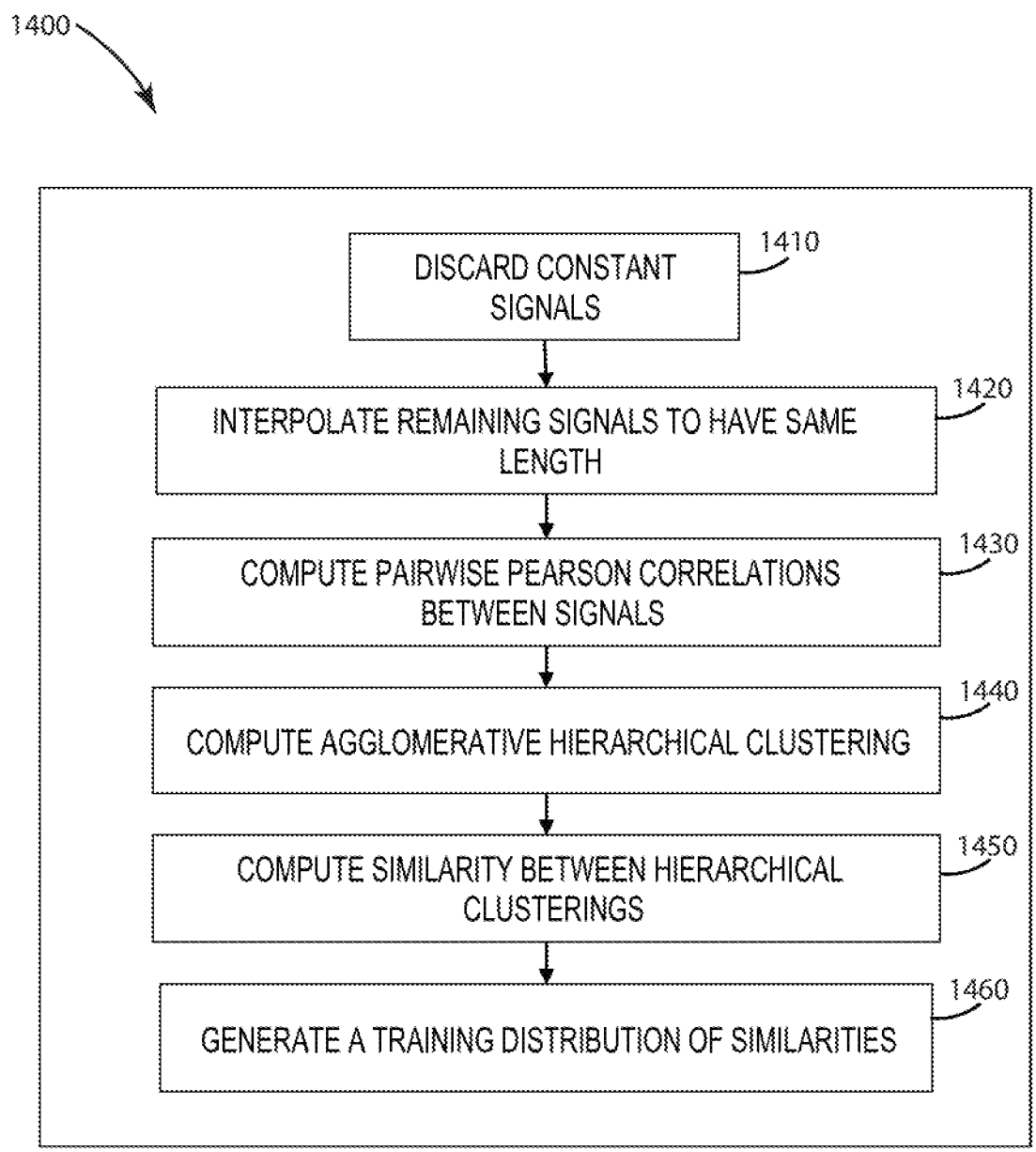
FIG. 14 illustrates a flowchart of one CAN-D IDS training method in accordance with the present disclosure.

FIG. 14 illustrates a representative flowchart of exemplary pattern recognition of step 1340. The learning of inherent relationships between uninterpreted timeseries signals in decoded CAN data in this exemplary embodiment include the following steps: discarding constant signals 1410, interpolating remaining signals to have the same length 1420, computing pairwise Pearson correlations between the CAN training data signals 1430, computing agglomerative hierarchical clustering 1440, computing similarity between hierarchical clusterings 1450, and generating a training distribution of similarities 1460.

Pearson correlations between signals can be calculated correlations (e.g., using standard Python packages, such as Numpy or Pandas). However, other correlation and similarity computational methodologies can be utilized instead. The CluSim paper, entitled CluSim: a Python package for calculating similarity, to Gates and Ahn, dated Mar. 21, 2019, which is herein incorporated by reference in its entirety. describes a collection of different clustering similarity measures for various clustering types.

Pearson correlations, sometimes referred to as Pearson correlation coefficients or Pearson product-moment correlation coefficients are generally a measure of linear correlation between two sets of data. Specifically, Pearson correlations refer to the ratio between the covariance of two variables and the product of their standard deviations. Covariance generally refers to the measure of how two random variables in a data set will change together. A positive covariance means that the two variables are positively related, and they move in the same direction and a negative covariance means the two variables are negatively related, and they move in the opposite direction. Pearson correlations are essentially normalized measurements of the covariance, such that the result has a value between −1 and 1. The measure reflects a linear correlation of variables.

Figure 15:
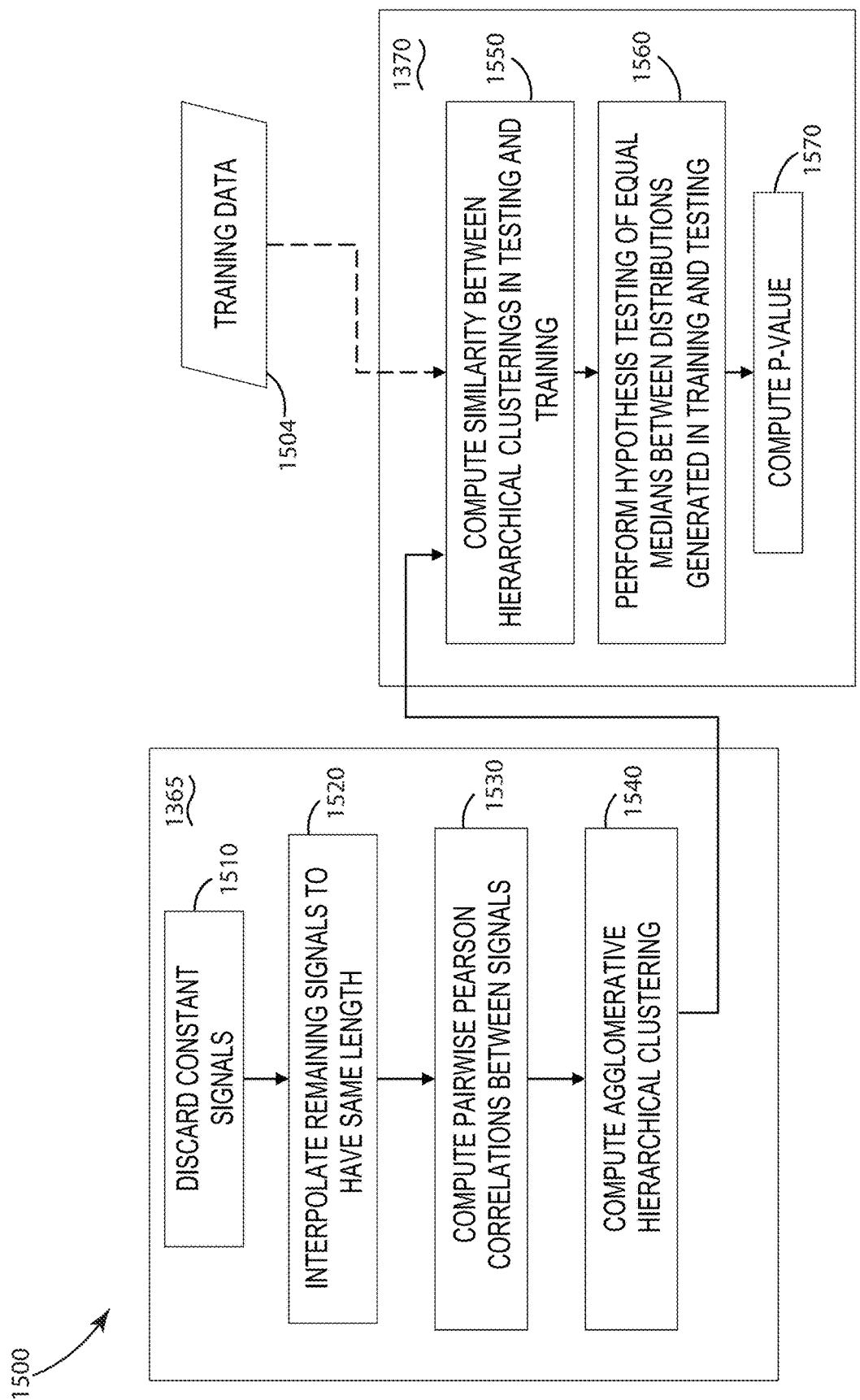
FIG. 15 illustrates a flowchart of a portion of the CAN-D intrusion detection method of FIG. 13 with additional exemplary detail.

FIG. 15 illustrates a representative flowchart of a portion of a CAN-D based intrusion detection method 1500. During operation, CAN test data is collected 1350 and decoded 1360, as shown in FIG. 13. In order to obtain hierarchical clustering of the CAN test data for comparison to the clustered training data, the CAN test data can be processed in a variety of different ways.

One exemplary embodiment in accordance with the present disclosure for learning inherent relationships between timeseries signals in decoded test data 1365 will now be described in detail. Suffice it to say, the same or similar steps as performed with the training data can be performed with the CAN test data. In one embodiment, constant signals from the decoded CAN test data are discarded 1510, the remaining CAN test data signals can be interpolated to have the same length 1520, pairwise Pearson correlations between the CAN test data signals can be computed 1530, and then agglomerative hierarchical clustering can be computed on the CAN test data 1540.

After CAN data is decoded into timeseries, the intrusion detection system and method can be configured to utilize one or more different artificial intelligence algorithms, depending on the embodiment, for intrusion detection. Essentially any suitable machine learning algorithm (e.g., supervised or unsupervised) can be utilized to provide the hierarchical clustering of the CAN test and training data. Examples of the intrusion detection systems and methods are discussed within the context of comparing clusterings from agglomerative hierarchical clustering of signals. However, other machine learning algorithms that exploit the information encoded in hierarchies of clusters, such as machine learning algorithms within the family of hierarchical clustering algorithms can be substitute for AHC.

The CAN test data hierarchical clustering and CAN training data hierarchical clustering 1504 can be contrasted by computing similarity between hierarchical clusterings in the testing and training data 1550. This can involve computing similarity between the hierarchical clusterings of the CAN test data and the CAN training data by utilizing the training distribution of similarities (See 1460). (See 1460). In essence, in one embodiment, during training you have a sample of benign log files. In other embodiments, the training may be performed on a window of CAN data. The system is configured to compute, for each file, an agglomerative hierarchical clustering 1440 (or dendrogram). Each of the computed AHCs can be used to compute a distribution of similarities 1460 based on pairwise similarity computations 1450.

Hypothesis testing of equal medians between distributions can be generated in the CAN training data and CAN testing data 1560 and a p-value or other statistical measurements can be calculated 1570, which can inform or trigger an intrusion detection. The system can be configured to perform hypothesis testing after being able to compute a similarity distribution between the testing logs and the benign training logs. That is, two similarity distributions can be computed (benign exclusively and attack-benign) and the system can be configured to test if their medians are approximately equal. The p-value can be used by the system as a threshold to conclude whether they are equal (e.g., p-value>0.05) or not equal (e.g., p-value<=0.05). Examples of the system and method for CAN-D intrusion detection will now be discussed in more detail.

In essence, the CAN-D intrusion detection system focuses on processing a set of N signals, e.g., timeseries, $S=\{X^1, X^2, \ldots, X^N\}$, obtained from a CAN log or a stream of CAN signals captured during a vehicle's drive. Below, the mathematical details of each step of an exemplary CAN-D intrusion detection system and method are described. In short, the CAN-D intrusion detection system or framework applies agglomerative hierarchal clustering to produce a clustering representation, which can be depicted as a dendrogram of clusters of S. Given two captures, each producing its corresponding clustering, the system can compute a similarity between the clusterings using the CluSim or another clustering similarity determination method. Finally, the pairwise similarities from each capture's clusterings can undergo hypothesis testing to distinguish between a benign CAN capture and an attack CAN capture.

Clustering

Figures 16A, 16B, 16C:
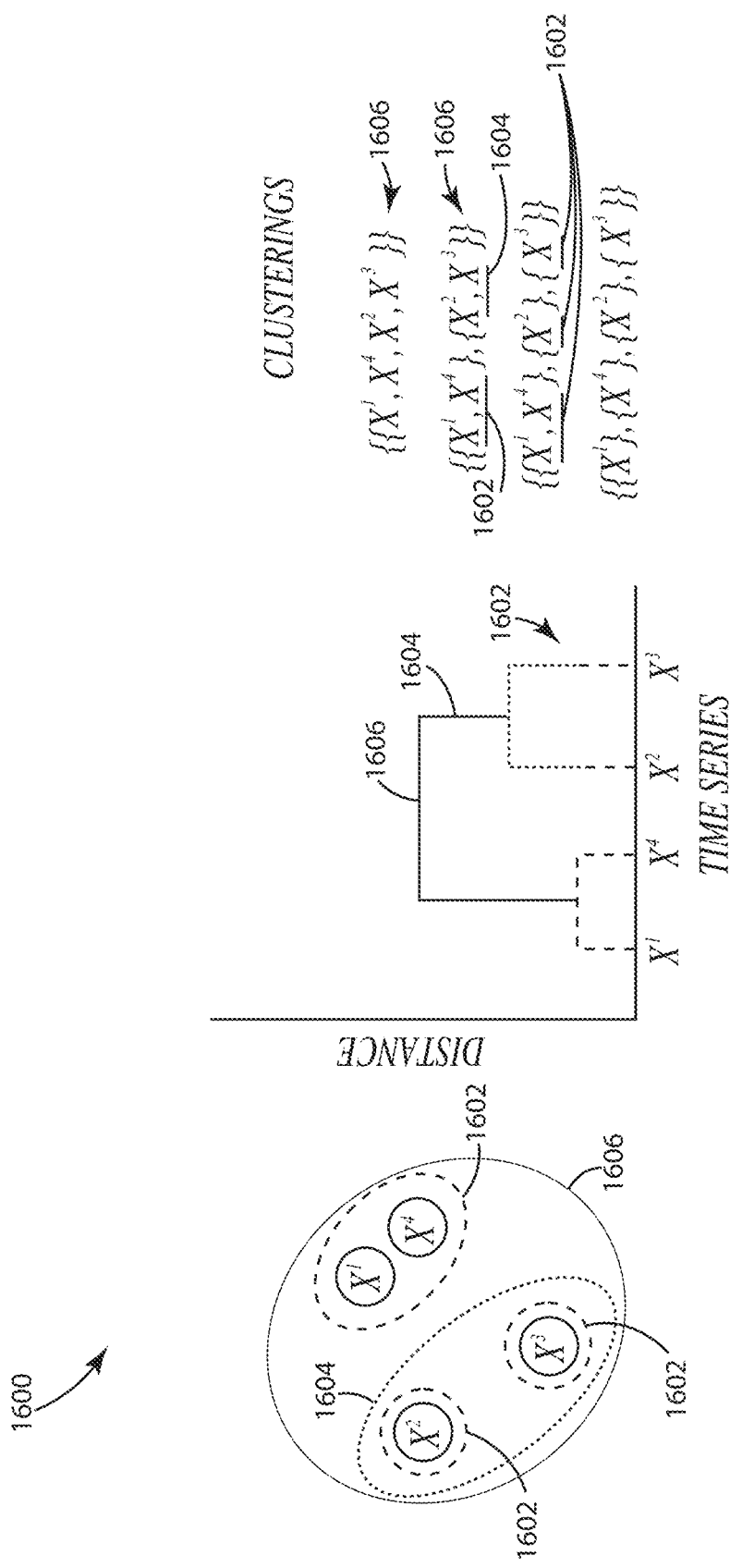
FIG. 16A illustrates a graphical representation of an exemplary CAN timeseries hierarchical clustering.
FIG. 16B illustrates a dendrogram of the exemplary CAN timeseries hierarchical clustering of FIG. 16A.
FIG. 16C illustrates a textual representation of the exemplary CAN timeseries hierarchical clusterings of FIG. 16A.

CAN timeseries clustering is an unsupervised technique for organizing CAN data timeseries into groups based on their similarity. By grouping similar timeseries within clusters insights (e.g., inherent relationships) can be automatically extracted from the CAN data. CAN hierarchical clustering is one form of CAN timeseries clustering and refers essentially to any CAN timeseries clustering method that outputs a hierarchy of CAN timeseries clusters (i.e., a set of nested clusters of CAN timeseries data that can be organized in a tree-like diagram known as dendrogram). A CAN timeseries hierarchical clustering can be generated by transforming a proximity matrix of CAN timeseries into a sequence of nested partitions. A proximity matrix refers to a square matrix in which the entry in a particular cell (j, k) provides a similarity measurement between the items (CAN timeseries, in this case) to which row j and column k correspond. FIGS. 16A-C depict exemplary details of a simplistic CAN timeseries hierarchical clustering to aid in explanation along with a corresponding dendrogram.

FIGS. 16A-C depict a hierarchical clustering 1600 using an agglomerative approach. FIG. 16A shows an example of a hierarchical clustering where: $\{X^1, X^2, X^3, X^4\}$ is a set of decoded CAN timeseries to be clustered. In this example, the CAN timeseries are grouped in a hierarchy of three clusters (i.e., 1602, 1604, and 1606). The thickness of the cluster lines represent how the hierarchy is built: close timeseries (1602), more distant timeseries (1604), and most distant timeseries (1606). Distance and similarity terminology can be utilized interchangeably when referring to comparisons between CAN timeseries. FIG. 16B illustrates a corresponding dendrogram of the hierarchical clustering depicted in FIG. 16A and FIG. 16C. Timeseries are placed in the x-axis, and their relative distance (similarity) is shown in the y-axis. Like reference numerals in FIG. 16B refer to like reference numerals in FIG. 16A and FIG. 16C. FIG. 16C shows different clusters at each level of the hierarchy written explicitly. It is worth noting that cutting the dendrogram horizontally creates clusterings.

At the outset of agglomerative hierarchical clustering, each CAN timeseries is in a cluster of its own. The clusters are then sequentially combined into larger clusters, until all elements are in the same cluster. In general, at each step, the two clusters having the highest similarity (smallest distance) are combined. Different functions can be utilized to determine the similarity (or dissimilarity) between two CAN timeseries, which can be referred to as the CAN timeseries linkage function. The specific CAN timeseries linkage function differentiates different agglomerative clustering methods and will produce different clusterings.

There are a variety of different linkage functions. Some of most popular linkages are the (a) single linkage, which is the smallest dissimilarity between two points in opposite clusters; (b) complete linkage, which is the largest dissimilarity between two points in opposite clusters; (c) average linkage, which is the average dissimilarity over all points in opposite groups; and (d) Ward's linkage, which focuses on how the sum of squares will increase when opposite groups are merged (or on the analysis of cluster variance). Ward's linkage tends to produce similar clusters as the k-means method.

Given a CAN capture that has been translated into its constituent signal timeseries, $S=\{X^1, X^2, \ldots, X^N\}$, the CAN-D intrusive detection system can be configured to cluster the timeseries to produce a dendrogram (or representation thereof) that represents the hierarchical structure of the timeseries. Each linkage choice (a)-(d) can produce a potentially different clustering (and dendrogram representing that clustering).

Clustering Similarity

Figures 17A, 17B, 17C:
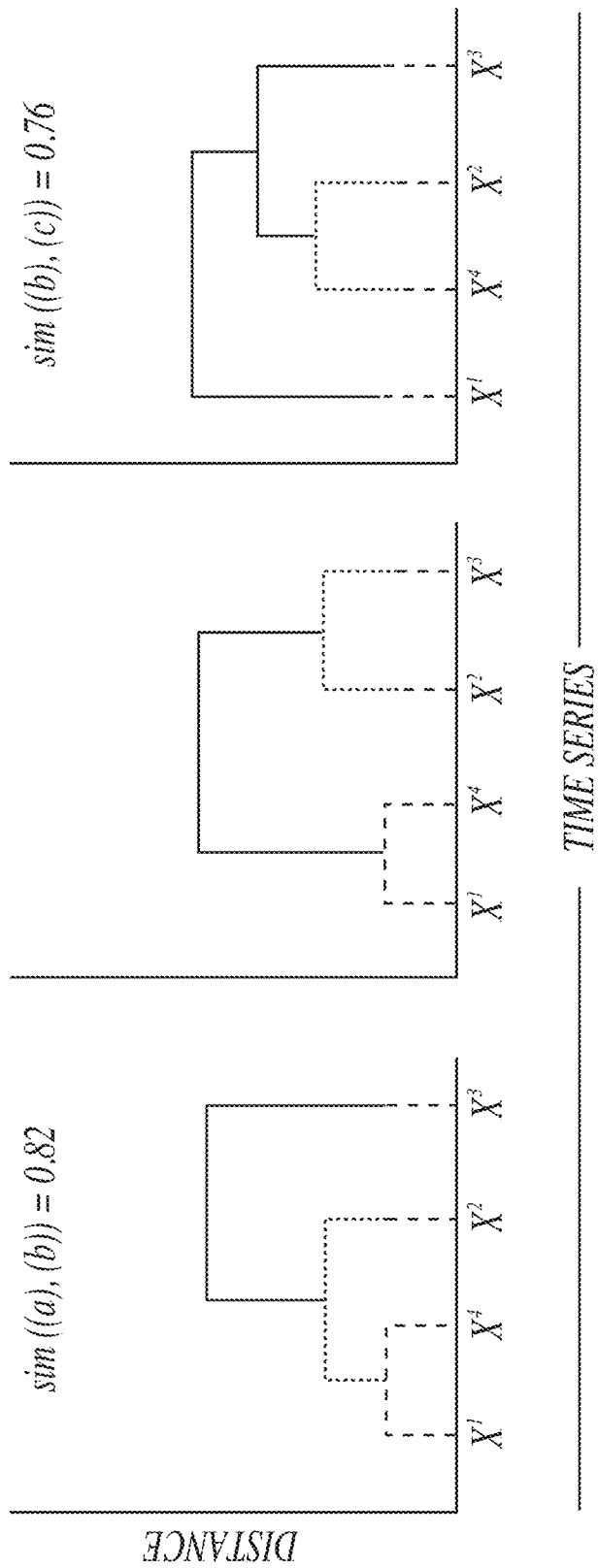
FIGS. 17A-C illustrates three exemplary dendrograms, each based on different modified CAN timeseries signals.

Given two hierarchical clusterings (e.g., represented by dendrograms) of a set S, a clustering similarity quantifies a distance between them. The similarity between clusterings can be calculated in a variety of different ways. One way to obtain a clustering similarity is by using the open-source CluSim method, which was previously incorporated by reference in its entirety. The similarity value provided by this method provides a clustering similarity in the range [0, 1], where 0 implies maximally dissimilar clusters, and 1 corresponds to identical clusterings. The clustering similarity method can be parameterized by letting r=−5.0 and α=0.9. FIGS. 17A-C show a comparison between similarity scores of three clusterings using CluSim.

Specifically, FIGS. 17A and 17C depict slightly modified clusterings from that of FIG. 17B, due to having different underlying CAN timeseries signal data. The similarity between the hierarchical clusterings of FIGS. 17A and 17B is 0.82, whereas the similarity between the hierarchical clusterings of FIGS. 17B and 17C is 0.76. This reflects that according to the CluSim clustering similarity, the hierarchical clusterings of FIGS. 17A and 17B are more similar than the hierarchical clusterings of FIGS. 17B and 17C.

The CluSim clustering similarity methodology does not suffer from critical biases found in previous clustering similarity methods (e.g., normalized mutual information) and it works for hierarchical clusterings, including in conditions of skew cluster sizes and a different number of clusters. Although the CluSim clustering similarity methodology is utilized in the examples above, the present disclosure is not so restricted and other clustering similarity methodologies can be utilized in connection with the decoded CAN intrusion detection systems of the present disclosure.

The decoded CAN intrusion detection systems of the present disclosure can be tested using a known dataset. For example, the ROAD dataset is an open set of CAN data collected from a real vehicle with fabrication attacks and a few advanced attacks (e.g., masquerade attacks). All of the attacks were physically verified (i.e., the effect of the CAN manipulation is observed and documented). Masquerade attacks are also included but are simulated from the targeted ID fabrication attacks by removing the benign frames of the target ID. The ROAD dataset provides translated CAN timeseries following a similar schema used in literature. The ROAD dataset contains realistic, verified, and labeled attacks, which allows effective evaluation, comparison, and validation of CAN signal-based intrusion detection system methods in accordance with the present disclosure under realistic conditions.

A CAN-D intrusion detection system in accordance with the present disclosure can detect which CAN signals are benign and which are attacks, including detecting the subset of masquerade attacks within the ROAD dataset. Each masquerade attack file in the ROAD dataset contains timeseries from hundreds of IDs that have a few to dozens of signals each. CAN-D intrusion detection systems in accordance with the present disclosure can detect a multitude of different attacks, including correlated signal, max speedometer, max engine coolant temperature, reverse light on, and reverse light off CAN signals. In the correlated signal attack, the correlation of the four-wheel speed values is altered by manipulating their individual values. In the max speedometer and max engine coolant attacks, the speedometer and coolant temperature values are modified to their maximum. In the reverse light attacks, the state of the reverse lights is altered to not match what gear the car is using (i.e., the reverse light is on when the vehicle is not in reverse, and the reverse light is off when the vehicle is in reverse).

CAN-D Intrusion Detection Pipeline Details

Steps of the CAN-D intrusion detection system pipeline in accordance with the present disclosure will now be described in more detail.

Same Length Timeseries Transformation. Each CAN identifier (ID) generally has a characteristic frequency that is unique in most cases. The CAN-D intrusion detection system modifies the timeseries to have the same frequency by linearly interpolating them in common timestamps (see step 1420 for training data and 1520 for test data). One embodiment utilizes a base-line frequency of 10 Hz (or the lowest frequency of the CAN IDs in dataset). In alternative embodiments, a different base-line frequency can be utilized. The 10 Hz baseline frequency ensures that $\forall X^i \in S$, $|X^i|=T$. In general, interpolating each CAN timeseries to have the same length can enable easier computation of similarity. In order to reduce system load, constant CAN timeseries can be discarded and then the system can normalize each remaining series to the unit norm (See step 1410 for training data and 1510 for test data).

Timeseries Correlation Computation. The CAN-D intrusion detection system can be configured to compute timeseries correlations among timeseries (e.g., pairwise Pearson). (See steps 1430 for training CAN data and 1530 for test CAN data). Timeseries that have a positive correlation are expected to move in tandem (i.e., when one measurement increases or decreases, the other measurement also increases or decreases). Pearson correlation values that are close to ±1.0 indicate strong positive or negative correlation. As vehicle subsystems are dependent, the CAN-D intrusion detection system generally leverages there being (1) clusters of correlated signals (e.g., increasing speed of the vehicle matches increases in the speedometer reading and the speed of all four wheels), and (2) such relationships are broken or significantly changed upon a cyber attack.

Hierarchical Clustering Computation. Pairwise correlations populate a correlation matrix, which is used as the input for agglomerative hierarchical clustering. (See steps 1440 for training CAN data and 1540 for test CAN data). The output is a hierarchical clustering (e.g., a clustering that can be represented by a dendrogram depicting hierarchies between clusters). Different embodiments can have different linkage selection (i.e., single, complete, average, Ward), which can impact the resultant intrusion detection.

A brief discussion and definition of hierarchical clustering will be provided now. A partition P of S breaks S into non-overlapping subsets $\{\{C^1, C^2, \ldots, C^m\}$, i.e., $S=U_{i \in \{1, 2, \ldots, m\}} C^i$. A clustering is a partition, so the elements of the partition are called clusters. A partition B of S is nested in a partition A of S if every subset of B is a subset of a subset of A, i.e., $\forall C^i \in B \; \exists j: C^i \subseteq C^j \in A$. A hierarchical clustering is then a sequence of partitions in which each partition is nested into the next partition in the sequence.

Similarity Distribution Computation. Once each hierarchical clustering has been computed for the CAN training and test data (e.g., for each CAN log training and test file), the CAN-D intrusion detection system can be configured to compute empirical distributions of similarity between pairs of hierarchical clusterings. (See step 1450 for generation of a training distribution of similarities and step 1550 for computing similarity between testing and training clusters).

A similarity distribution computation among hierarchical clusterings can be computed in a variety of different ways. CluSim is one way to calculate a similarity distribution computation among hierarchical clusterings. See A. J. Gates, I. B. Wood, W. P. Hetrick, and Y.-Y. Ahn, "Element-centric clustering comparison unifies overlaps and hierarchy," Scientific Reports, vol. 9, no. 1, pp. 1-13, 2019, which was previously incorporated by reference in its entirety. The CluSim methodology will now be described briefly. Given $S=\{X^1, X^2, \ldots, X^N\}$ and a clustering $A=\{C^1, C^2, \ldots, C^m\}$, first make the bipartite graph with elements of S on the left, clustering assignments from A on the right, and edges denoting containment, e.g., $(X^i, C^j)$ is an edge if and only if $X^i$ is in cluster $C^j$. Note that this can be naturally extended to a dendrogram representing a hierarchical clustering A by using a weighted bipartite graph, where the weight of the edges is given by a hierarchy weighting function based on the level of the cluster assignment within the hierarchical clustering. Next, the bipartite graph is projected into the S elements producing a weighted, directed graph that captures the inter-element relationships induced by common cluster memberships. Now equipped with a weighted, directed graph on S, the CluSim method captures high-order co-occurrences of elements by taking into account their paths to obtain an equilibrium distribution of a personalized diffusion process on the graph, or personalized PageRank (PPR), e.g., for each $X^i$ in S, a PageRank version with restart to $X^i$ given by probability $1-\alpha$ is used to produced stationary distribution $p_i$. The element-wise similarity of an element $X^i$ in two different clusterings A and B is found by comparing the stationary distributions $p_i^A$ and $p_i^B$ using a variation of the $\ell^1$ metric for probability distributions. Finally, the similarity score of two clusterings A, B is the average of element-wise similarities. CluSim is parametrized by specifying r and $\alpha$. The scaling parameter r defines the relative importance of memberships at different levels of the hierarchy. That is, the larger r, the more emphasis on comparing lower levels of the clustering (zoom in). The shared lineages parameter $\alpha$ controls the influence of hierarchical clusterings with shared lineages. That is, the larger $\alpha$, the further the process will explore from the focus data element, so more of the cluster structure is taken into account into the comparison.

The ROAD dataset is used in this disclosure as a case study to illustrate verification, i.e., with the ROAD dataset the result (attack vs. benign) is known and thus can be verified by the CAN-D IDS. In an applied setting, the system has a training period to capture some logs in benign conditions to create a baseline distribution of similarities. Then, based on upcoming resulting logs, the system computes a similarity distribution from new (i.e., test) logs to see how much they differ, e.g., via hypothesis testing.

Similarity distribution computation within the context of the ROAD dataset will now be discussed in more detail. In this exemplary case, the intrusion detection system is configured to focus on two distinct groups. The first group is composed of all clusters derived from files in known benign conditions (e.g., 12 files of the ROAD dataset). The system can compute pairwise similarities of clusterings in this group; that is $$\binom{12}{2} = 66$$

possible combinations. In this application, the distribution of the 66 CluSim similarities is the result of training the intrusion detector on known benign datasets. In order to validate or test the method, a second of translated signals from the ROAD dataset with known attacks is used to create a second group of CluSim similarities. The second group comes from the similarity between clusterings in each category of attack (e.g., correlated, max speedometer, max engine coolant, reverse light on, reverse light off) and each of the files in benign conditions. This produces a varying number of combinations based on the number of files in each of the attack categories. The distribution of similarities from the first group and from the second group sets up a hypothesis test to determine if they are sufficiently, that is, statistically-significantly different.

Hypothesis Testing. A hypothesis test can be utilized. In one embodiment, the intrusion detection system is configured to utilized the Mann-Whitney U test and set the significance level to 0.05 to test the null hypothesis that the distribution underlying benign conditions is the same as the distribution underlying attack conditions. The Mann-Whitney U test is a nonparametric test often used as a test of difference in location between distributions. Alternative hypothesis tests can be utilized to perform hypothesis testing.

Exemplary results relating to the efficacy of the described decoded CAN intrusion detection system for detecting masquerade attacks in the CAN bus will now be discussed. FIGS. 18-22 plot probability density functions for each scenario (benign and attack) using the Gaussian kernel density estimate implementation from Seaborn (a Python plotting package) with a default bandwidth. The plots illustrate the effect of the linkage selection (in the hierarchical clustering) for distinguishing between benign and attack conditions: (a) single, (b) complete, (c) average, and (d) Ward. The plots also indicate the associated p-value, using three decimals, of the associated Mann-Whitney U test to compare the two distributions in the inset; statistically significant values (i.e., p-value<0.05) are printed in bold. For these exemplary plots, the scaling parameter is fixed at r=−5 for comparing hierarchical clusterings. This captures differences at higher levels of the clusterings, in which the focus is on groups of correlated signals, instead of fine-grained grouping of individual signals, in which not much emphasis is on their correlations.

In general, detecting attacks depends on (1) the linkage function used to compute the hierarchical clusterings and (2) the severity of the attack in terms of the number of correlations perturbed. The various exemplary attack scenarios are discussed in more detail below.

Correlated Attack

Figure 18:
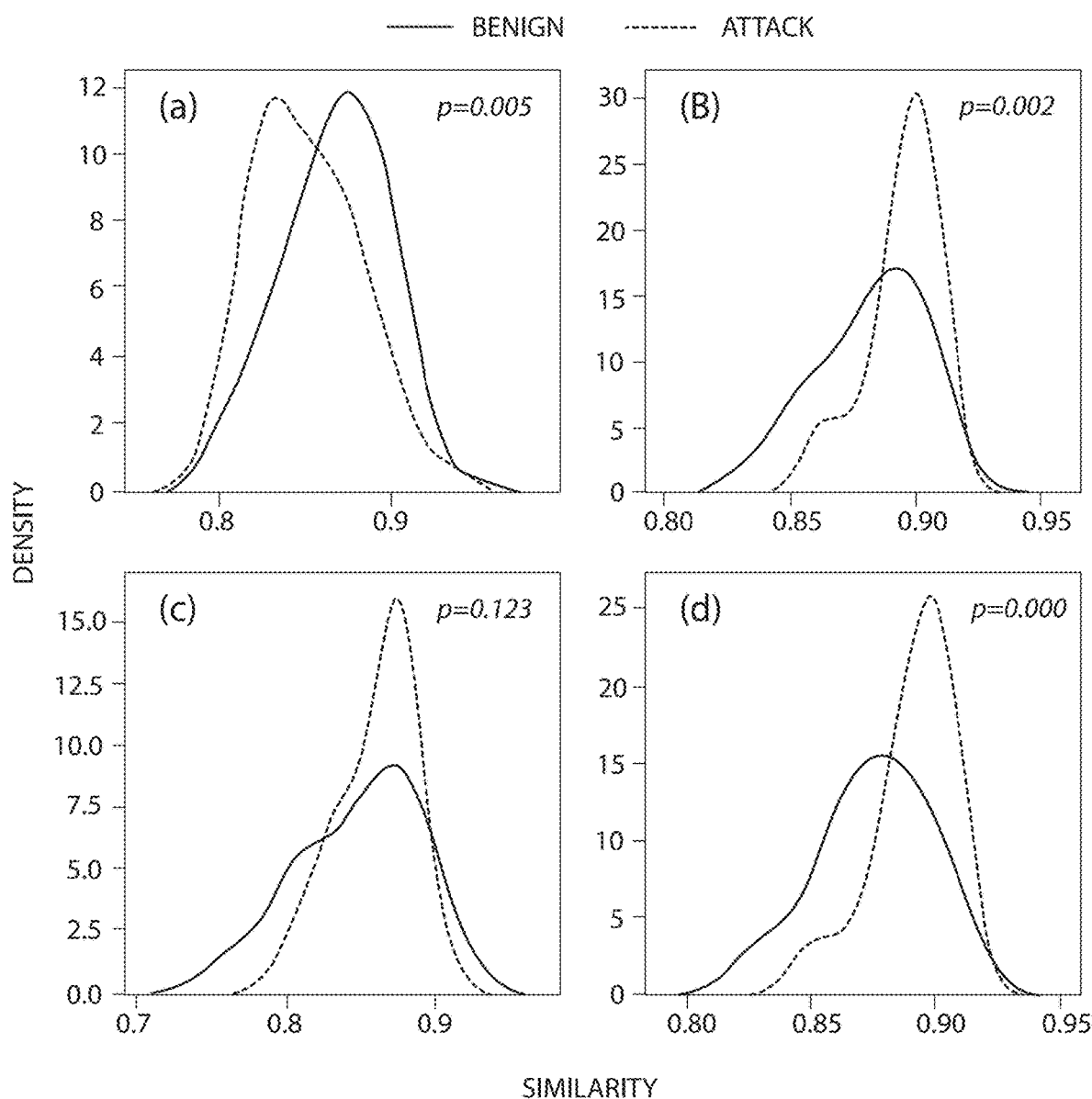
FIG. 18 illustrates four density similarity plots showing an empirical distribution comparison of a correlated attack for four different linkage function selections.

FIG. 18 shows four exemplary comparisons of similarity distributions between CAN test and training data clusterings where the CAN test data includes a correlated attack and the CAN training data is benign. Specifically, FIG. 18 illustrates an empirical distribution comparison of the correlated attack for each linkage selection: plot (a) of FIG. 18 shows a single linkage function, plot (b) of FIG. 18 shows a complete linkage function, plot (c) of FIG. 18 shows an average linking function, and plot (d) shows a Ward linking function. The single, complete, and Ward linking functions all provided a statistically significant p-value indicating the ability to distinguish between benign and attack conditions.

Speedometer Attack

Figure 19:
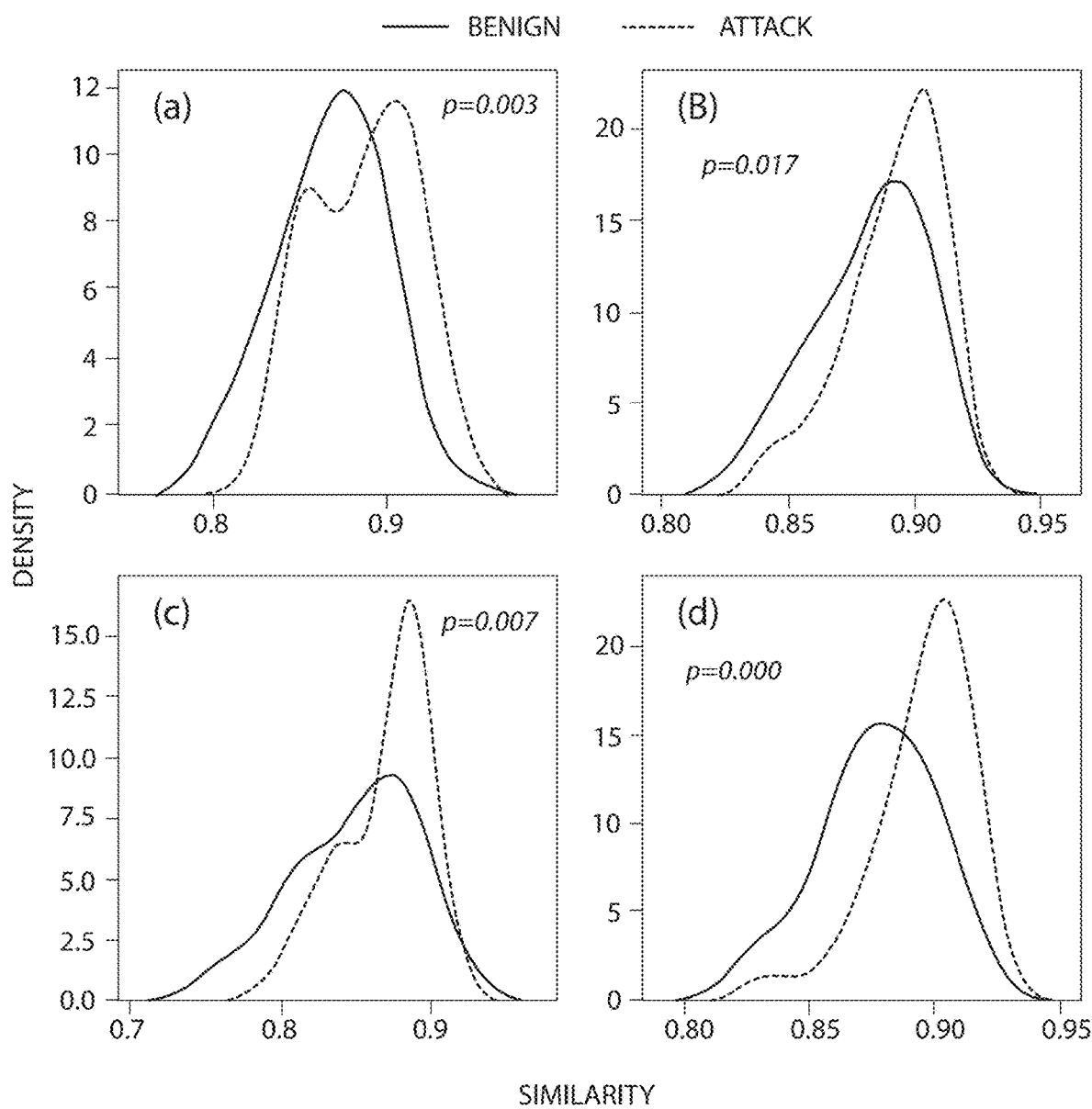
FIG. 19 illustrates four density similarity plots showing an empirical distribution comparison of a speedometer attack for four different linkage function selections.

FIG. 19 shows four exemplary comparisons of similarity distributions between CAN test and training data clusterings where the CAN test data includes a max speedometer attack and the CAN training data is benign. Each linkage option produces statistically significant differences. FIG. 19 illustrates an empirical distribution comparison of the max speedometer attack for each linkage selection: (a) single, (b) complete, (c) average, and (d) Ward. Speedometer reading correlates closely with wheel speed and engine readings, so when the speedometer value is set to maximum, correlations broken with these signals can be captured by the similarity distributions and flagged as an intrusion.

Engine Coolant Attack

Figure 20:
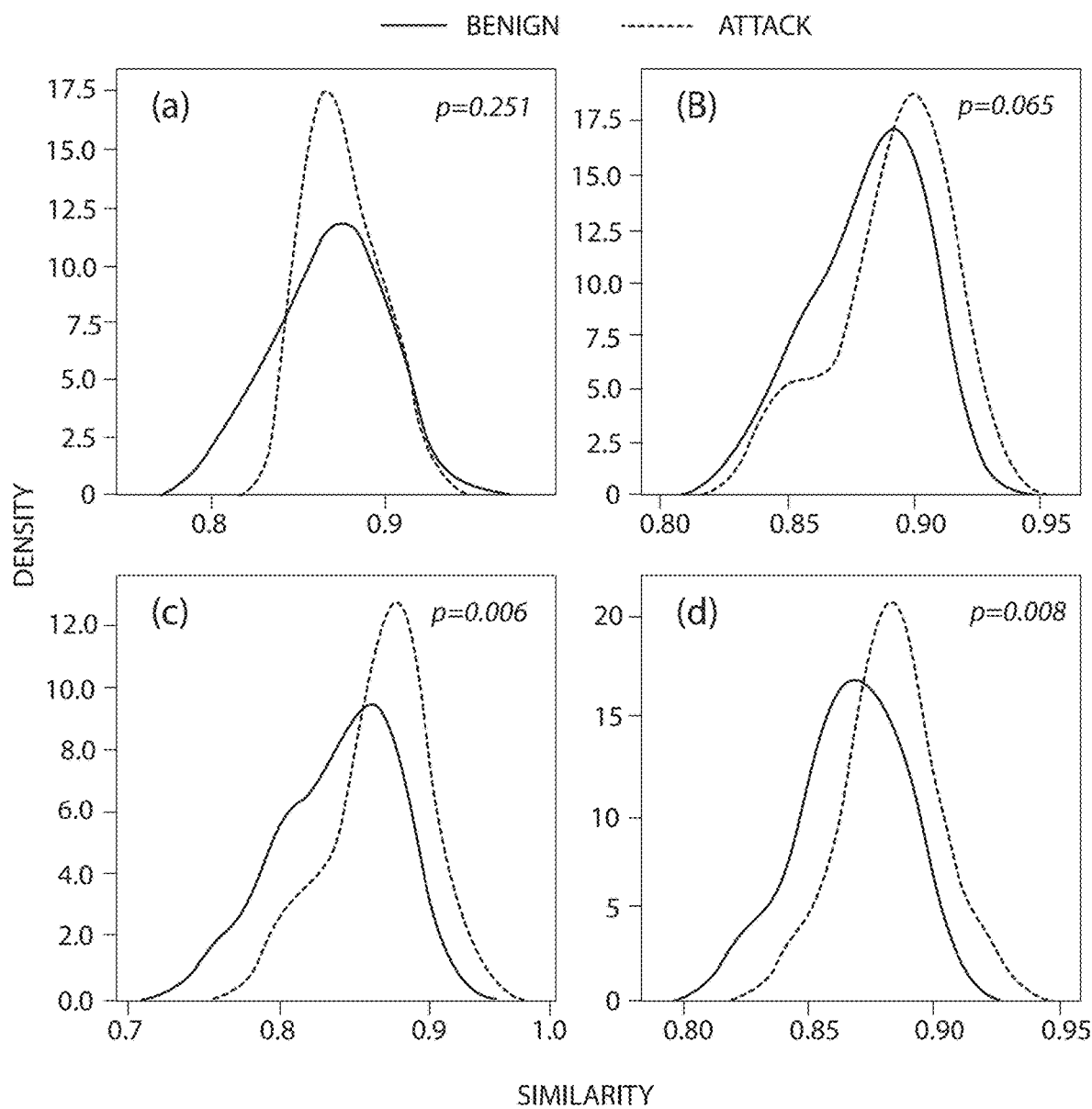
FIG. 20 illustrates four density similarity plots showing an empirical distribution comparison of an engine coolant attack for four different linkage function selections.

FIG. 20 shows four exemplary comparisons of similarity distributions between CAN test and training data clusterings where the CAN test data includes a max engine coolant temperature attack and the CAN training data is benign. FIG. 20 illustrates an empirical distribution comparison of the max engine coolant attack for each linkage selection: (a) single, (b) complete, (c) average, and (d) Ward.

Reverse Light On Attack

Figure 21:
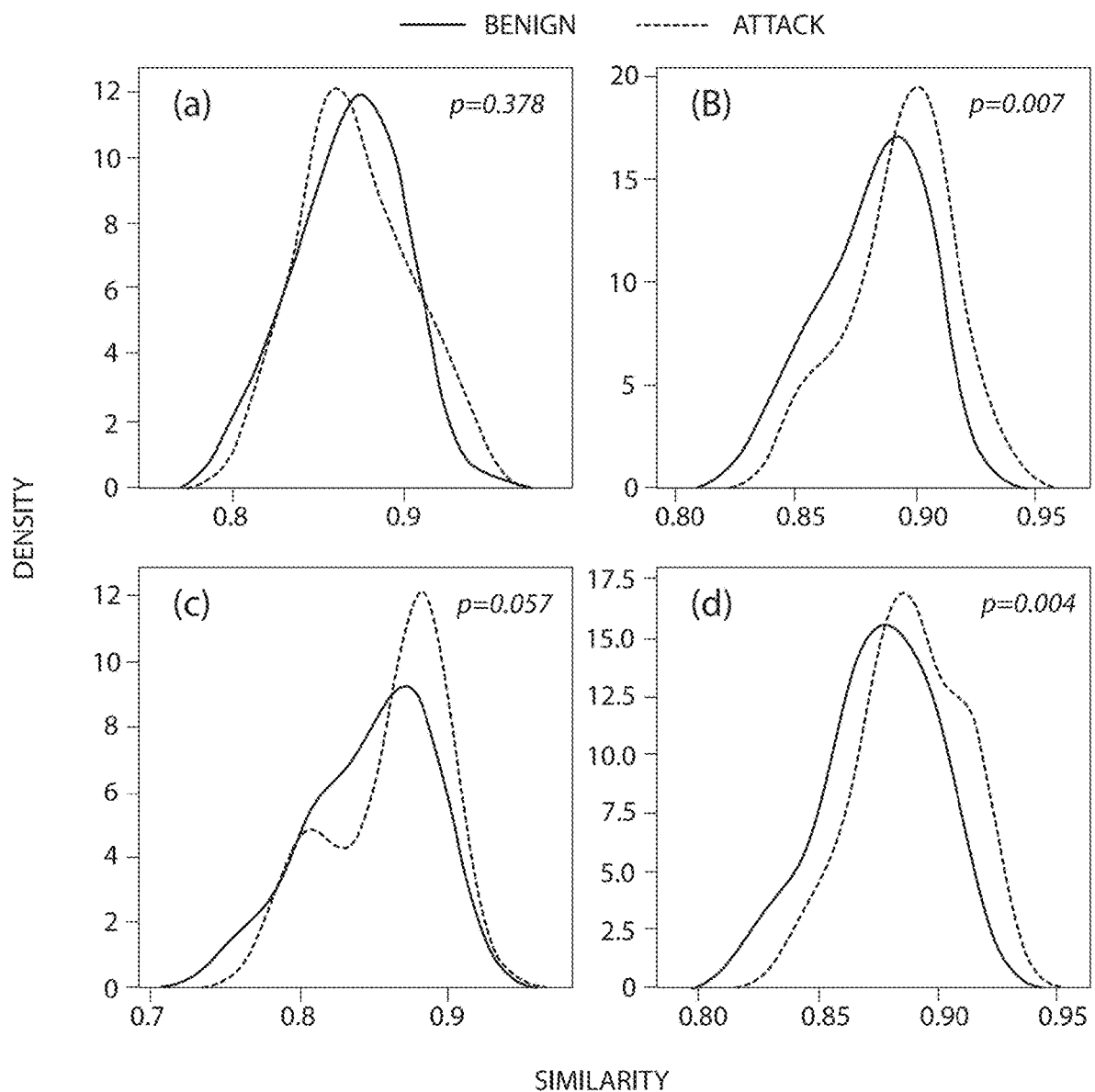
FIG. 21 illustrates four density similarity plots showing an empirical distribution comparison of a reverse light on attack for four different linkage function selections.

FIG. 21 shows four exemplary comparisons of similarity distributions between CAN test and training data clusterings where the CAN test data includes a reverse light on attack and the CAN training data is benign. FIG. 21 illustrates an empirical distribution comparison of the reverse light on attack for each linkage selection: (a) single, (b) complete, (c) average, and (d) Ward. Although statistically significant, these p-values are not as small as in the correlated attack (FIG. 18). The reverse light on attack is more difficult to detect likely because fewer correlated signals are affected under this attack, (e.g., only a binary [1 bit] signal may be targeted by the attack).

Reverse Light Off Attack

Figure 22:
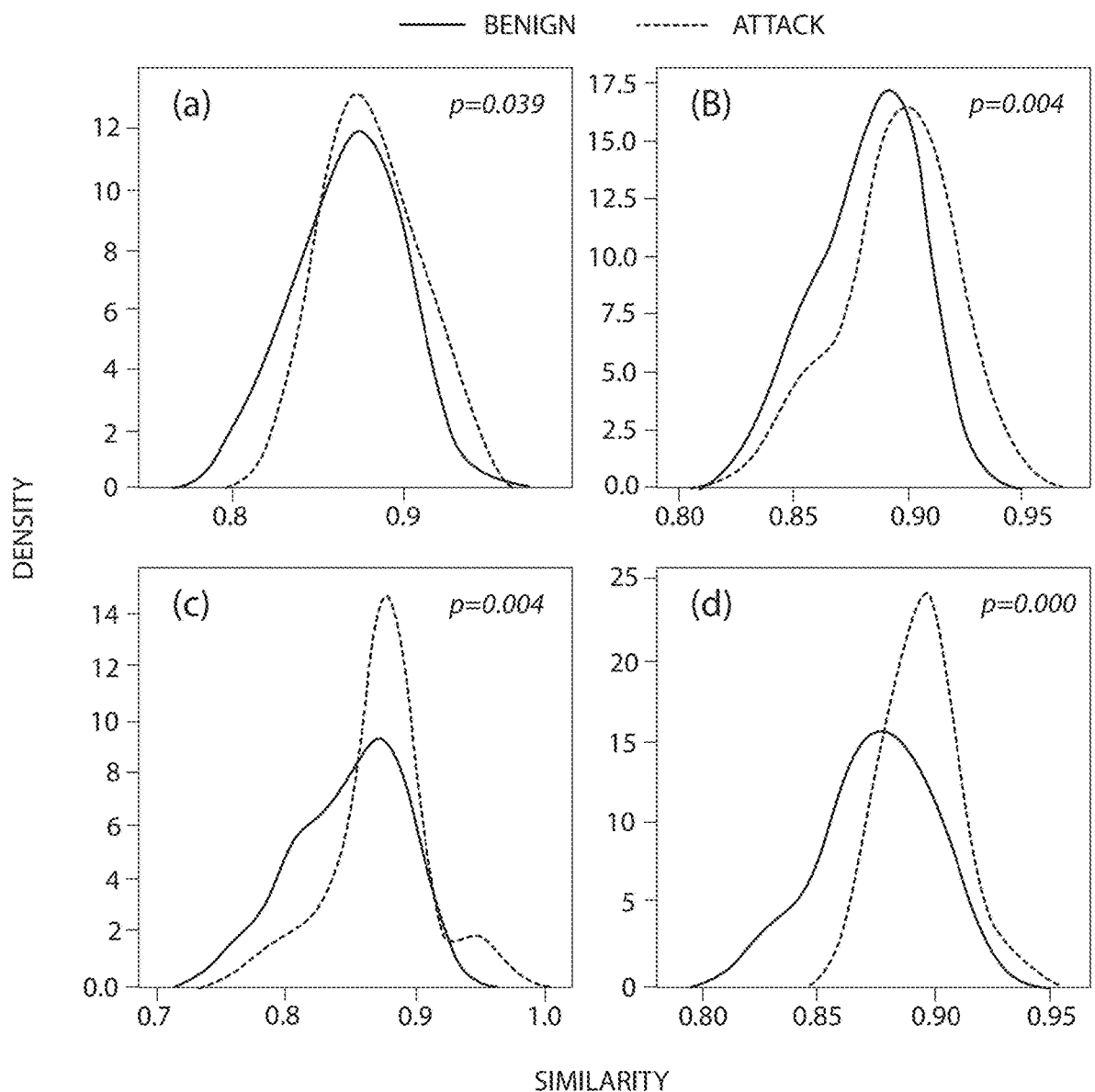
FIG. 22 illustrates four density similarity plots showing an empirical distribution comparison of a reverse light off attack for four different linkage function selections.

FIG. 22 shows four exemplary comparisons of similarity distributions between CAN test and training data clusterings where the CAN test data includes a reverse light off attack and the CAN training data is benign. FIG. 22 illustrates an empirical distribution comparison of the reverse light off attack for each linkage selection: (a) single, (b) complete, (c) average, and (d) Ward.

The p-value for flagging a particular CAN data signal as an attack or intrusion can vary depending on the implementation and particular embodiment. Changing the p-value changes the threshold for alerting and therefore the sensitivity of the detector.

The CAN-D intrusion detection systems of the current disclosure provide a statistical forensic framework to detect masquerade attacks in the CAN bus. The system can quantify the empirical distribution of similarities of timeseries captures in benign and attack conditions. To accomplish this, the system clusters decoded CAN timeseries using agglomerative hierarchical clustering (AHC) and computes the similarity between their corresponding clusterings (i.e., dendrograms). Masquerade attacks can be detected effectively using the described framework, and its discriminatory power generally depends on the linkage function being used in the AHC as well as the impact of the attacks on correlated signals.

While many linkage functions can be selected for the clustering, the Ward's linkage function is a suitable choice because it tends to produce dense-enough clusters and enables the capture of meaningful changes in clustering assignations when attacks occur. Other linkage functions can also be advantageous in certain scenarios.

Detection performance can vary on a number of factors including on specific attack features. Detection difficulty is generally based on the potential number of correlated signals that are affected by the attack. Thus, an attack scenario in which wheel speed signals are modified, such as in the correlated attack, has a more noticeable effect of disrupting correlation with other signals than an attack that modifies the reverse lights because the wheel speed correlation attack manipulates four highly correlated signals (and seemingly strong correlations to many other signals), whereas the reverse light attacks modify a single signal that has correlation with gear selection but not many other signals.

Regarding parameter tuning, the described CAN-D intrusion detection system allows for flexible election of linkage functions, e.g., single, complete, average, Ward, for computing the hierarchical clusterings and the scaling parameter $r$ and $\alpha$ to control the influence of hierarchical clusterings with shared lineages. While the examples discussed throughout the disclosure utilized fixed values of $r$ and $\alpha$ to focus on differences at higher levels of the clusterings or in groups of correlated signals, different parameter values can be utilized in accordance with the present disclosure. A suitable selection of parameters may depend on the type of attack, driving conditions, and/or other factors.

In many embodiments discussed above, the intrusion detection system operates based on a post-drive log file to identify attacks that occurred in that log file. However, it is worth noting the CAN-D intrusion detection system can be implemented as a near real-time intrusion detector. Such a near real-time IDS can be implemented on edge computing devices that can be operated under real-world vehicle conditions. For example, a near-real time CAN-D IDS can utilize time windows (e.g., last few seconds) to compute the pairwise correlation of all signals that clustered together in training. If that correlation is too big/small, then the system can be configured to alert. This process can be iterated, e.g. every second to provide a detector that produces an alert/benign label for every second.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. An intrusion detection system for detecting masquerade attacks on CAN data communicated over a vehicle controller area network (CAN) of a vehicle, the intrusion detection system comprising: a CAN transceiver configured to receive CAN frames from the vehicle CAN, wherein each CAN frame includes an arbitration identifier (AID) and an up to 64-bit data payload; a CAN controller in communication with the CAN transceiver;

a processor in communication with the CAN controller, wherein the processor is configured to generate a signal definition for each AID mapping the up to 64-bit data payloads of CAN frames with that AID to a plurality of tokenized and translated signals defined by one or more sequences of bits of the up to 64-bit data payload, wherein the mapping accounts for start bit, length, endianness, and signedness of the signals; wherein the processor is configured to (1) learn inherent relationships between uninterpreted timeseries signals in decoded CAN training payload data without dependence upon CAN diagnostic inquiry; (2) learn inherent relationships between uninterpreted timeseries signals in decoded CAN test payload data without dependence upon CAN diagnostic inquiry; (3) detect masquerade attacks on CAN test payload data based on a contrast of the learned inherent relationships of timeseries signals in the decoded CAN training payload data and the learned inherent relationships of timeseries signals in the decoded CAN test payload data; and (4) upon detecting a masquerade attack on CAN test payload data, at least one of transmit an anomaly-notification message and log information relating to the detected masquerade attack.

2. The intrusion detection system of claim 1 wherein the processor is configured to store the signal definition for each AID together with the AID in a CAN database file (DBC) in memory.

3. The intrusion detection system of claim 1, wherein the payload of the CAN frames from the vehicle CAN are encoded based on unknown signal definitions established by a third party, each signal definition including information to tokenize, translate, and interpret the CAN data, where the information to tokenize includes information to demarcate sequences of bits corresponding to signals in the CAN data and byte ordering, wherein the information to translate includes information about how the sequences of bits were converted to integers.

4. The intrusion detection system of claim 1, wherein the processor is configured to monitor, during operation of the vehicle, the timeseries signals in the decoded CAN test payload data for anomalies to detect masquerade attacks in the CAN test payload data, wherein the processor is configured to: compute correlations between timeseries signals in the decoded CAN test payload data; and compute agglomerative hierarchical clusterings for the computed correlations between the timeseries signals for the CAN test payload data; compute similarity between hierarchical clusterings for the computed correlations between the timeseries signals for the CAN test payload data; generate a CAN test data distribution of similarities between hierarchical clusterings for the correlations between the timeseries signals for CAN test payload data; compare the CAN test data distribution of similarities between hierarchical clusterings for the correlations between the timeseries signals for the CAN test payload data and CAN training payload data distribution of similarities between hierarchical clusters based on the CAN training payload data stored in memory; and
    identify one or more anomalies of the timeseries signals for the CAN test payload data based on the comparison of the CAN test payload data distribution of similarities and the CAN training payload data distribution of similarities.

5. The intrusion detection system of claim 4 wherein the processor is configured to compute the agglomerative hierarchical clusterings based on at least one of a single linkage function, complete linkage function, average linkage function, and a Ward's linkage function.

6. The intrusion detection system of claim 4 wherein the processor is configured to interpolate the timeseries signals in the decoded CAN test payload data according to a selected base-line frequency to an equivalent length.

7. The intrusion detection system of claim 4, wherein at least one of the respective timeseries for each of the CAN test payload data signals includes a correlated attack, speedometer attack, engine coolant attack, reverse light on attack, and reverse light off attack.

\* \* \* \* \*